US008943940B2

(12) United States Patent
Hedtke, Jr. et al.

(10) Patent No.: US 8,943,940 B2
(45) Date of Patent: Feb. 3, 2015

(54) WEIGHT MATERIAL DISPENSING, CUTTING, AND APPLYING SYSTEM

(75) Inventors: Louis R. Hedtke, Jr., Gross Pointe Woods, MI (US); Matthew W. King, Mt. Clemens, MI (US); Scott R. Claxton, Ortonville, MI (US); Mark A. Compton, Lake Orion, MI (US); David L. McDole, Westfield, IN (US); John K. Funcheon, Noblesville, IN (US); Mark R. Gabel, Cottage Grove, MN (US); Ben D. Belknap, Northville, MI (US)

(73) Assignees: Esys Corporation, Auburn Hills, MI (US); 3M Innovative Properties Company, Saint Paul, MN (US)

( * ) Notice: Subject to any disclaimer, the term of this patent is extended or adjusted under 35 U.S.C. 154(b) by 606 days.

(21) Appl. No.: 13/175,413

(22) Filed: Jul. 1, 2011

(65) Prior Publication Data
US 2011/0283790 A1 Nov. 24, 2011

Related U.S. Application Data

(63) Continuation-in-part of application No. 12/683,495, filed on Jan. 7, 2010, now Pat. No. 8,505,423.

(60) Provisional application No. 61/143,284, filed on Jan. 8, 2009, provisional application No. 61/428,534, filed on Dec. 30, 2010.

(51) Int. Cl.
*B26D 5/20* (2006.01)
*G01M 1/16* (2006.01)
(Continued)

(52) U.S. Cl.
CPC ................ *B26D 5/20* (2013.01); *B26D 7/1863* (2013.01); *B26D 7/06* (2013.01); *B26D 3/08* (2013.01); *B26D 7/30* (2013.01); *G01M 1/326* (2013.01); *B26D 1/085* (2013.01)
USPC .................... 83/809; 83/865; 83/76.6; 73/468

(58) Field of Classification Search
CPC .............. B26D 5/20; B26D 7/00; B26D 7/18; B26D 3/00; B26D 1/547; B26D 1/00; B26D 5/007; B26D 7/015
USPC ......... 83/13, 151, 648, 408, 436.5, 76.6, 167, 83/109, 416, 369, 73, 77, 7, 9, 865, 358, 83/359, 65, 240, 420, 271; 73/468, 470; 177/64, 80, 119, 1, 66
See application file for complete search history.

(56) References Cited

U.S. PATENT DOCUMENTS 1,751,562 A * 3/1930 Stinger ........................... 83/115
3,177,039 A   4/1965 Skidmore
(Continued)

FOREIGN PATENT DOCUMENTS

| DE | 19922085 A1 | 12/2000 |
| DE | 19961828 A1 | 6/2001 |
| DE | 10006176 A1 | 8/2001 |

OTHER PUBLICATIONS

3M Wheel Weight System, TN-2015 and TN-2023, Technical Data Sheet, May 2007, 2 pages.
(Continued)

*Primary Examiner* — Ghassem Alie
(74) *Attorney, Agent, or Firm* — Harness, Dickey & Pierce, PLC

(57) ABSTRACT

An apparatus for balancing a wheel includes a tool and an arm control module. The tool is mechanically coupled to an arm and includes a leading edge, a trailing edge, and a face surface that forms an arc between the leading and trailing edges. The arm control module actuates the arm to position the leading edge of the tool a predetermined distance from an edge of a deck of a cutting apparatus to receive a piece of non-segmented wheel weight material. A blade of a cutting apparatus passes between the edge of the deck and the leading edge of the tool to cut the piece from the non-segmented wheel weight material.

12 Claims, 49 Drawing Sheets

(51) Int. Cl.
  *B26D 7/30* (2006.01)
  *G01M 1/32* (2006.01)
  *B26D 7/18* (2006.01)
  *B26D 7/06* (2006.01)
  *B26D 3/08* (2006.01)
  *B26D 1/08* (2006.01)

(56) References Cited

U.S. PATENT DOCUMENTS

| | | | |
|---|---|---|---|
| 3,273,941 A | 9/1966 | Skidmore | |
| 3,732,761 A | 5/1973 | Sanders | |
| 3,779,119 A | 12/1973 | Broides | |
| 3,800,894 A | 4/1974 | Keser et al. | |
| 3,960,409 A | 6/1976 | Songer | |
| 4,003,525 A | 1/1977 | Podvin et al. | |
| 4,335,439 A | 6/1982 | St. Denis | |
| 4,689,457 A | 8/1987 | Izumiya et al. | |
| 5,279,195 A * | 1/1994 | Breton | 83/72 |
| 5,363,728 A * | 11/1994 | Elsner et al. | 83/23 |
| 5,956,205 A | 9/1999 | Konno et al. | |
| 5,959,205 A | 9/1999 | Yamaya et al. | |
| 6,119,814 A | 9/2000 | Kane et al. | |
| 6,125,904 A | 10/2000 | Kane et al. | |
| 6,176,288 B1 | 1/2001 | Kane et al. | |
| 6,209,684 B1 | 4/2001 | Kane et al. | |
| 6,234,232 B1 | 5/2001 | Kane et al. | |
| 6,286,906 B1 | 9/2001 | Nagashima et al. | |
| 6,364,421 B1 | 4/2002 | Pursley | |
| 6,364,422 B1 | 4/2002 | Sakaki et al. | |
| 6,413,626 B1 | 7/2002 | Wollner | |
| 6,481,083 B1 | 11/2002 | Lawson et al. | |
| 6,502,618 B1 | 1/2003 | Kane et al. | |
| 6,581,444 B2 | 6/2003 | Bal | |
| 6,616,089 B2 | 9/2003 | Gross et al. | |
| 6,877,544 B2 | 4/2005 | Kane et al. | |
| 6,886,231 B2 | 5/2005 | Lawson et al. | |
| RE39,312 E | 10/2006 | Kane et al. | |
| 7,185,410 B2 | 3/2007 | Lawson et al. | |
| 7,478,659 B2 | 1/2009 | Jeon | |
| 7,600,306 B2 | 10/2009 | Lawson et al. | |
| 8,161,650 B2 | 4/2012 | Lawson et al. | |
| 8,182,639 B2 | 5/2012 | Donnay et al. | |
| 8,336,379 B2 | 12/2012 | Rogalla et al. | |
| 2006/0016309 A1 | 1/2006 | Spaulding et al. | |
| 2006/0169415 A1 | 8/2006 | Lawson et al. | |
| 2007/0074824 A1 | 4/2007 | Lawson et al. | |
| 2008/0156447 A1 | 7/2008 | Lawson et al. | |
| 2009/0001803 A1 | 1/2009 | Taylor | |
| 2009/0084506 A1 | 4/2009 | Lawson et al. | |
| 2010/0051206 A1 | 3/2010 | Lawson | |
| 2010/0059154 A1 | 3/2010 | Perecman | |
| 2010/0147458 A1 | 6/2010 | Donnay et al. | |
| 2010/0154611 A1 | 6/2010 | Lammlein, Jr. | |
| 2010/0163189 A1 | 7/2010 | Lawson et al. | |
| 2011/0226055 A1 | 9/2011 | Rogalla et al. | |
| 2012/0073764 A1 | 3/2012 | Lawson et al. | |
| 2012/0125542 A1 | 5/2012 | Lawson et al. | |

OTHER PUBLICATIONS

3M Mechanical Replacement Weight, TN4014 (PN99427), Technical Data Sheet, Oct. 2008, 2 pages.
3M Engineering Drawings, 2007, 48 pages.

* cited by examiner

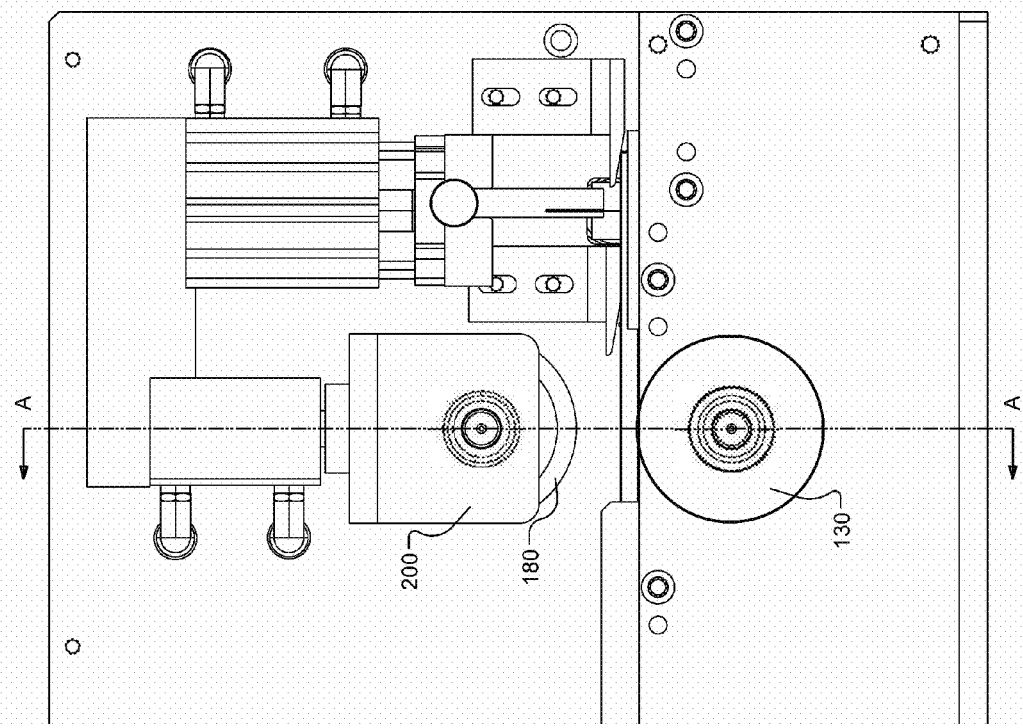

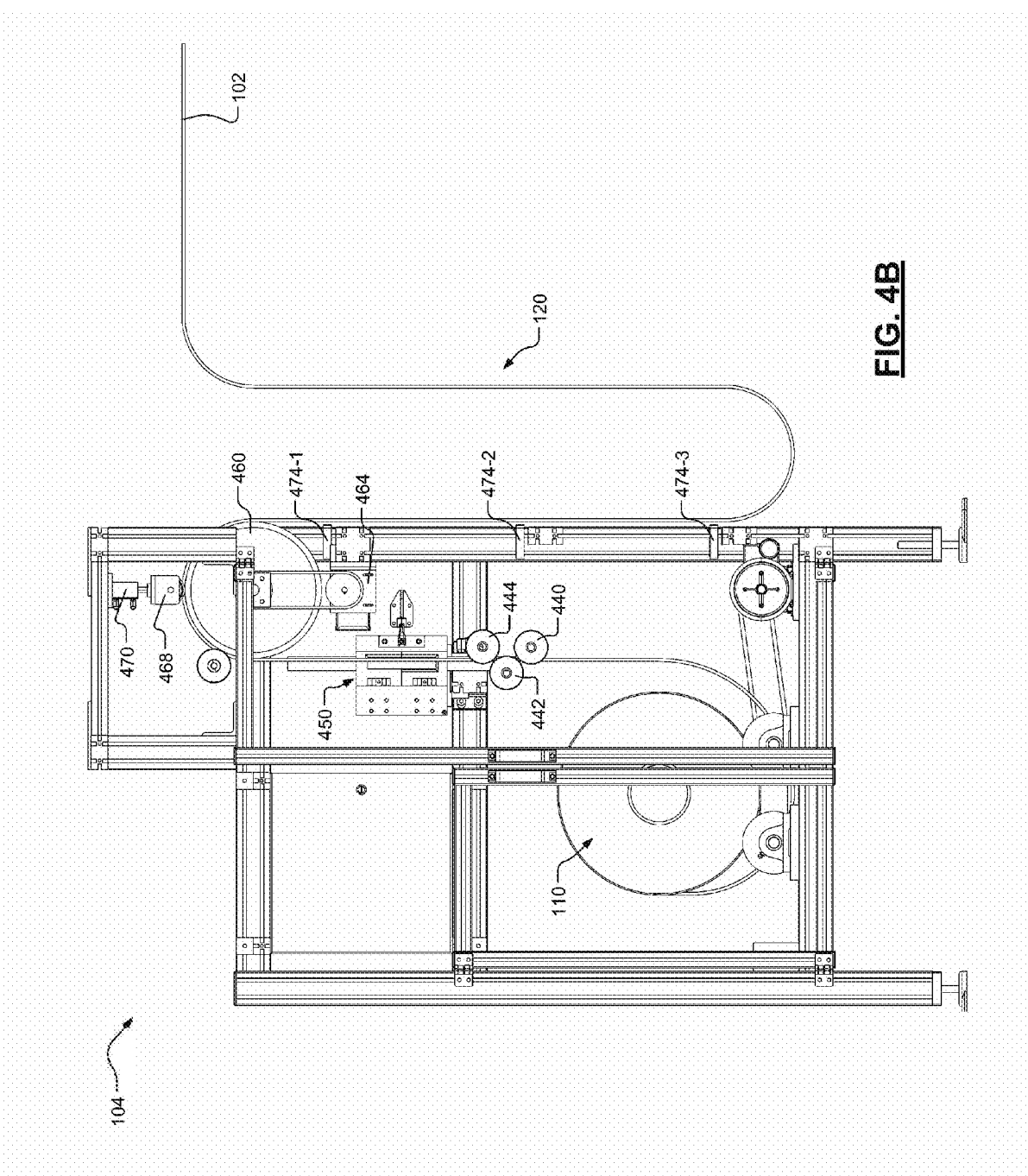

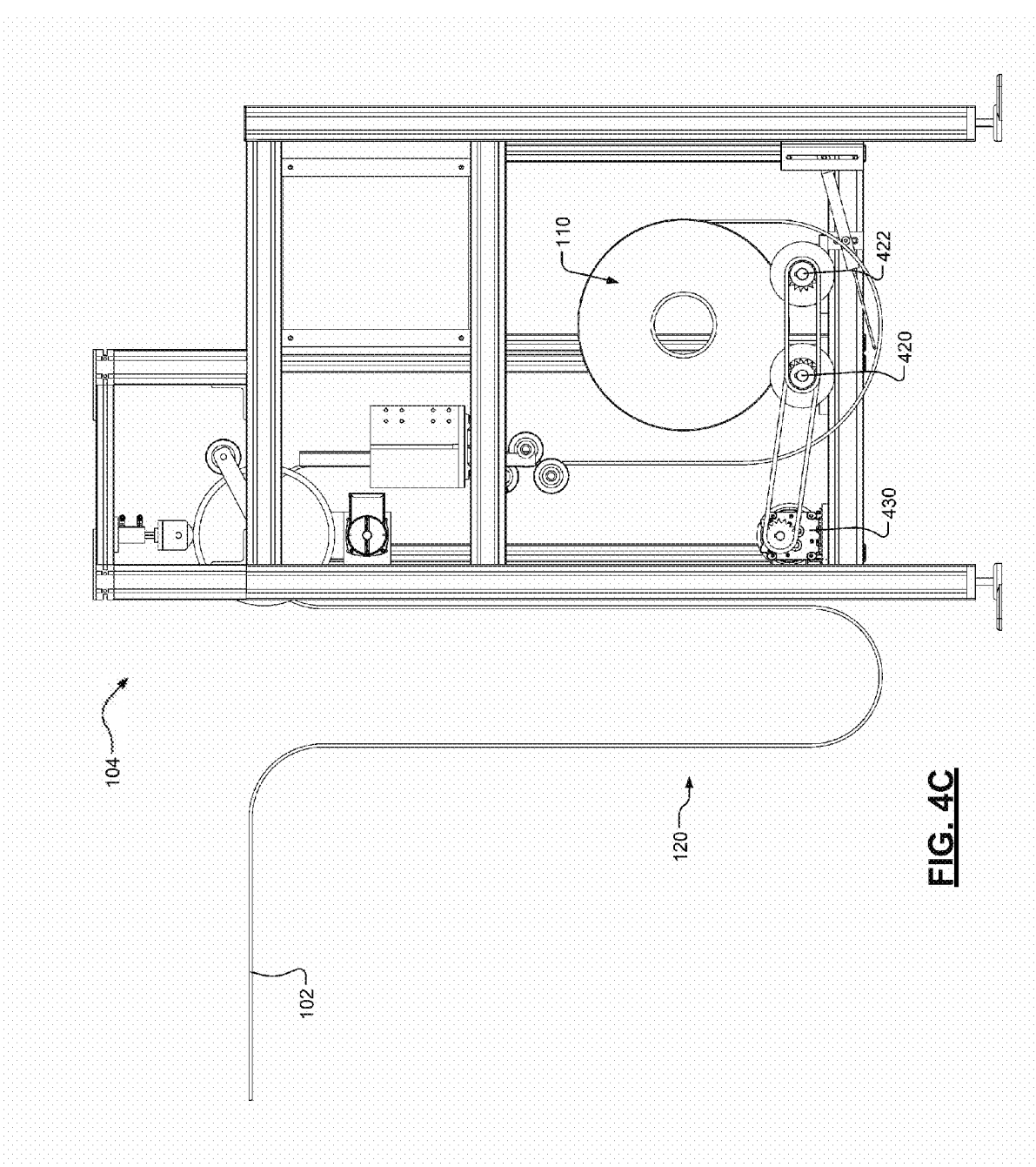

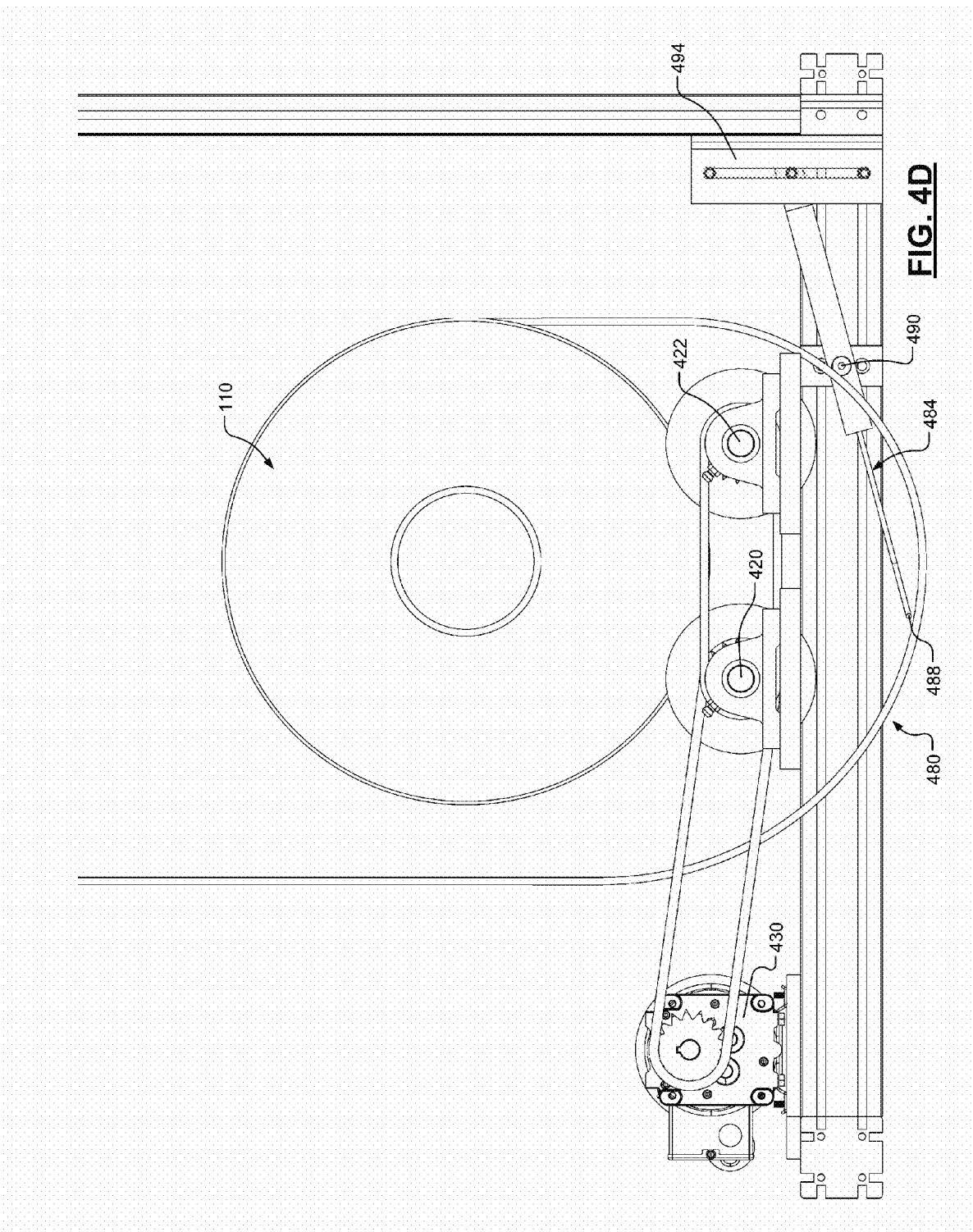

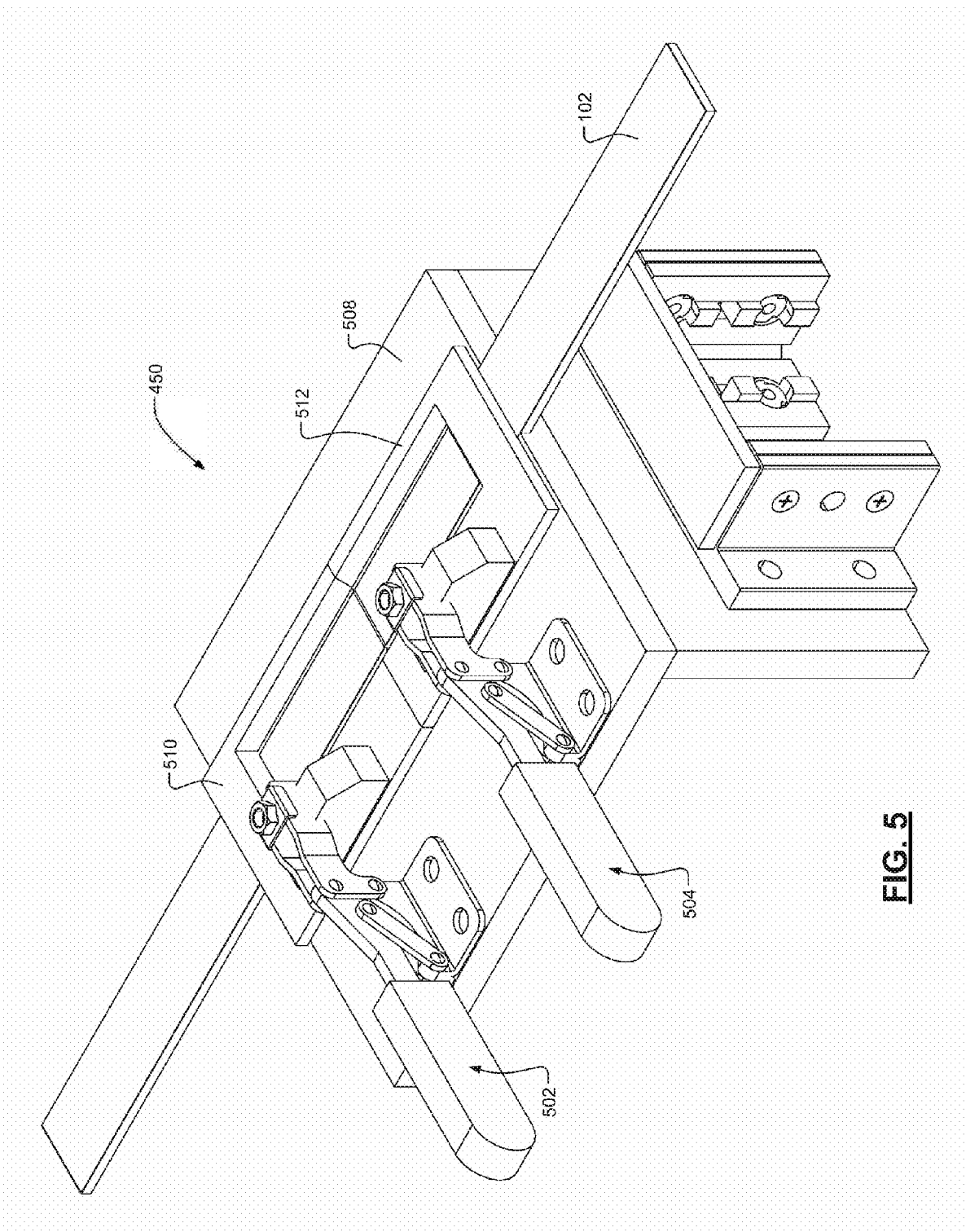

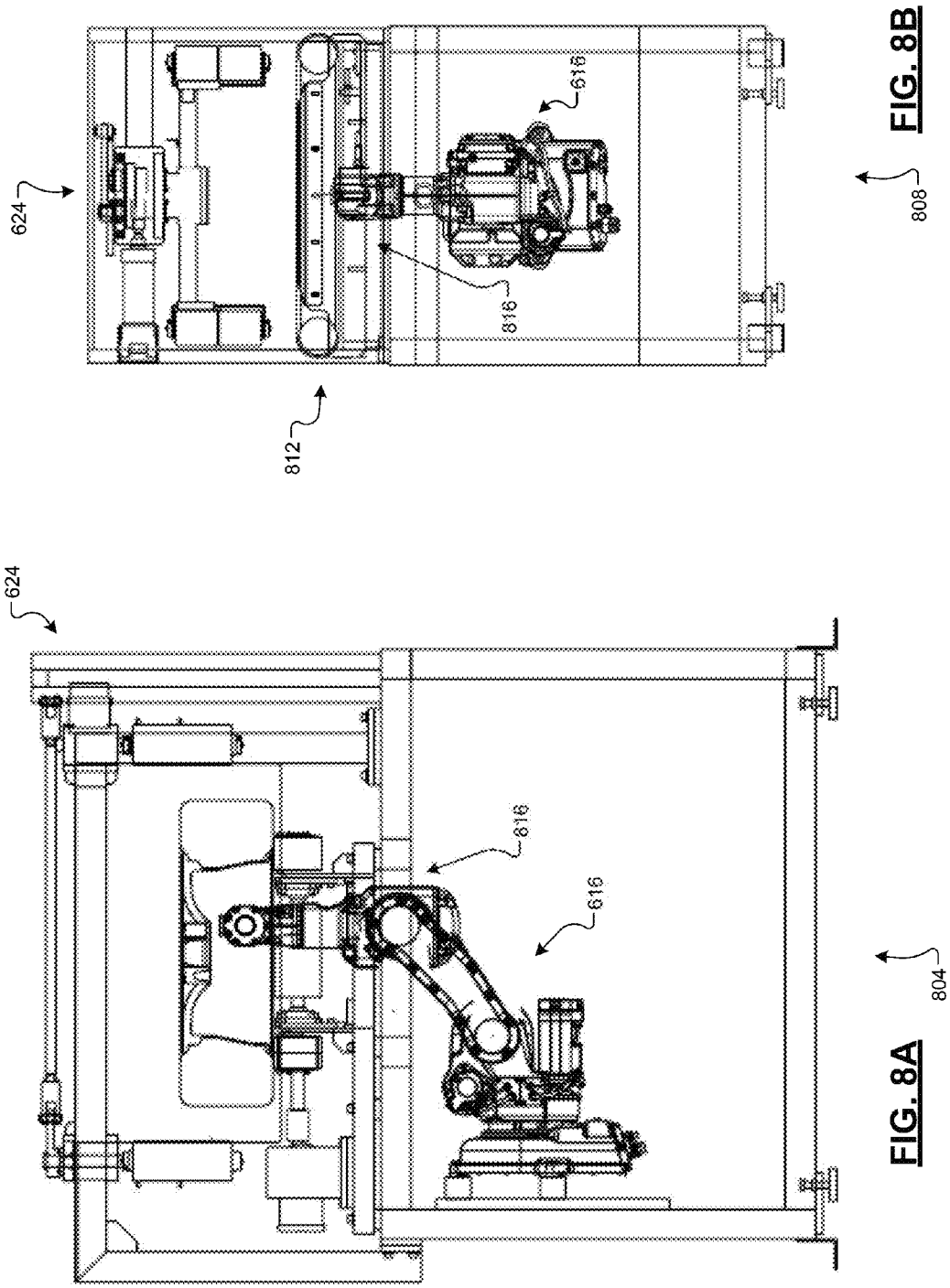

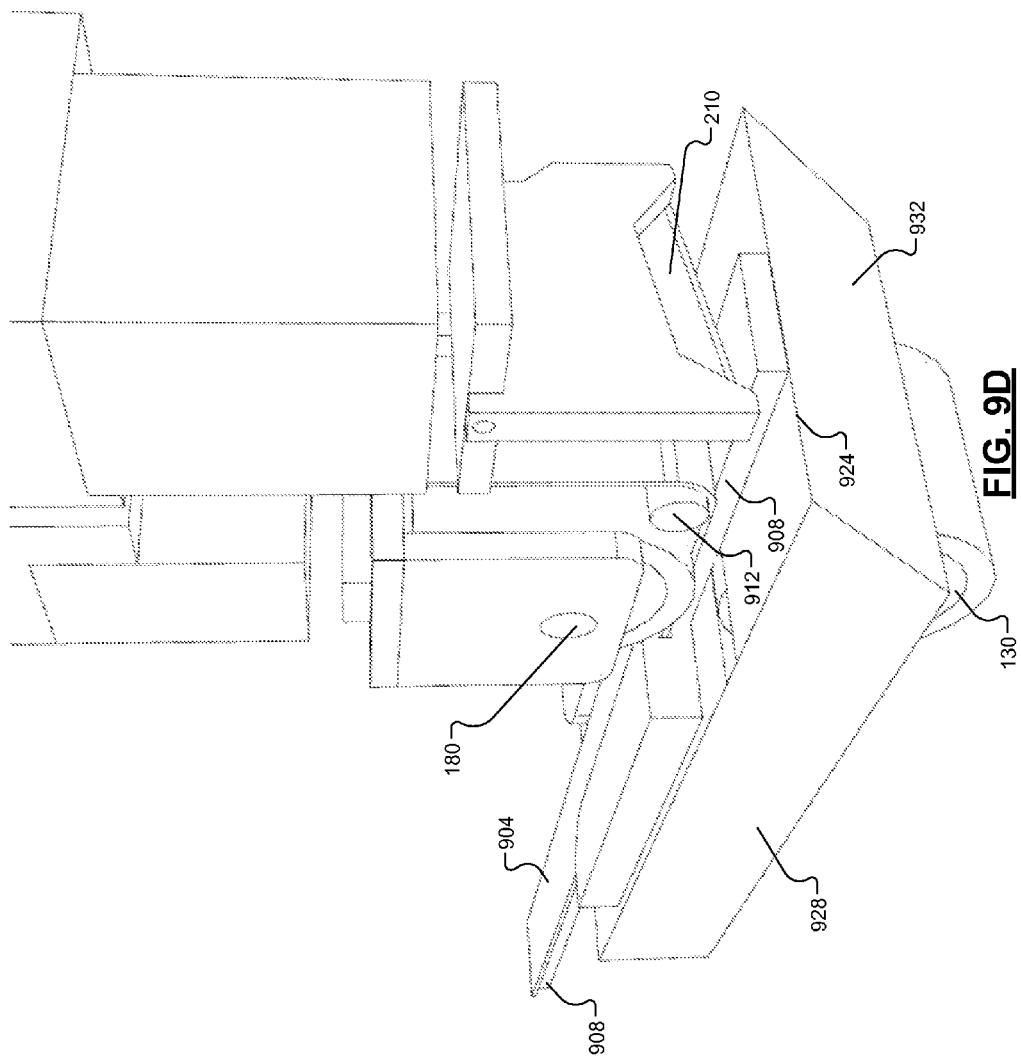

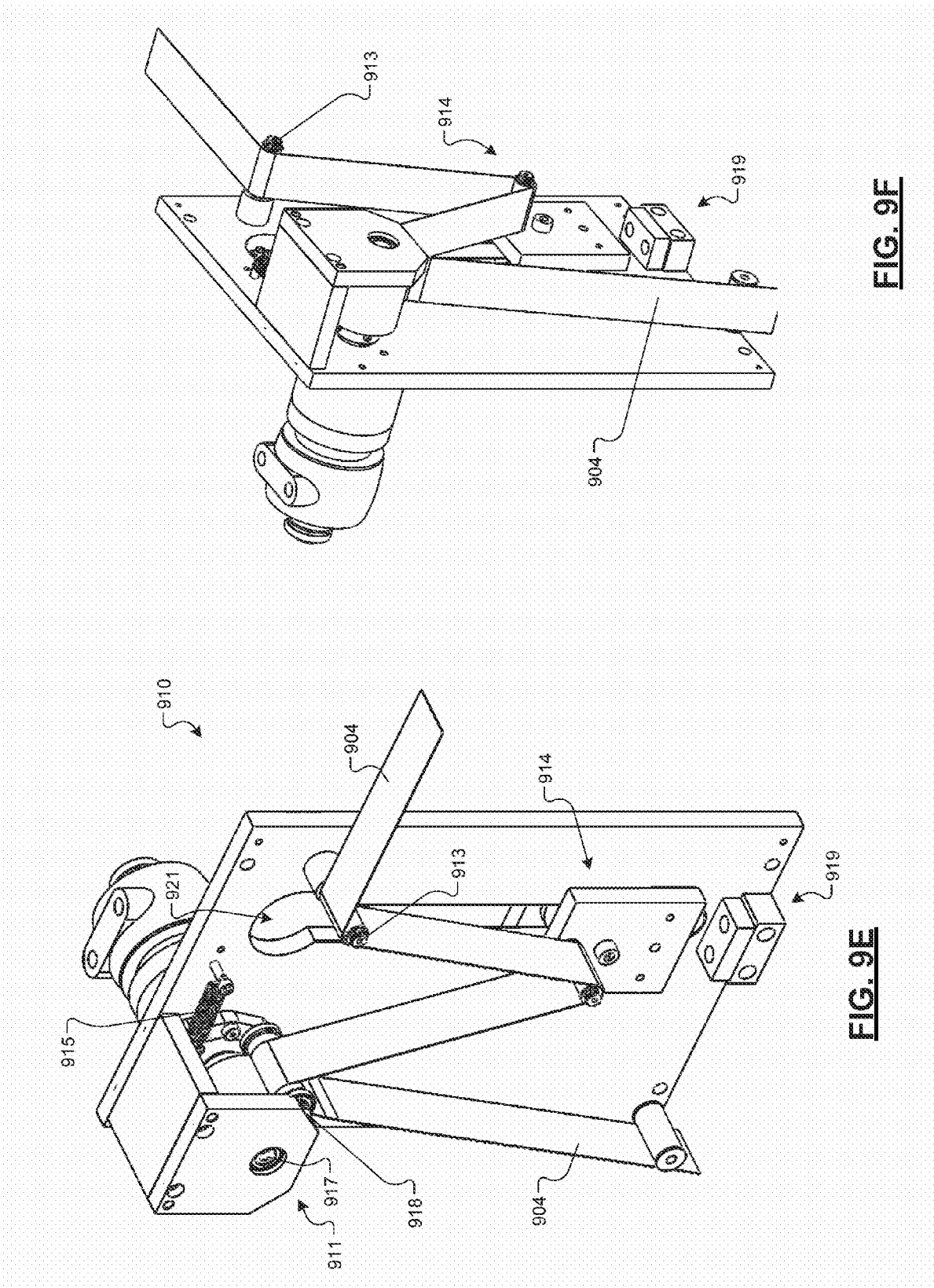

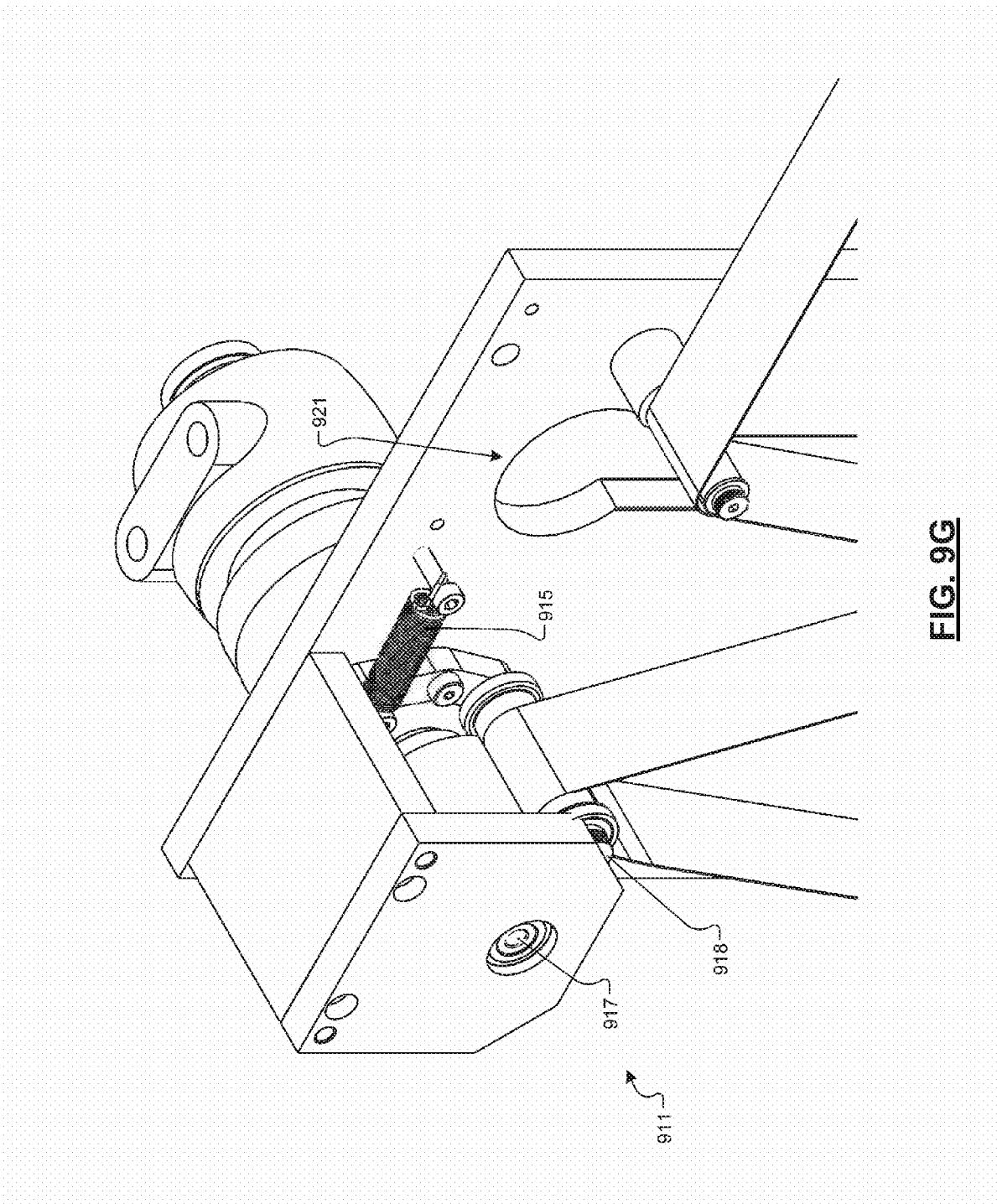

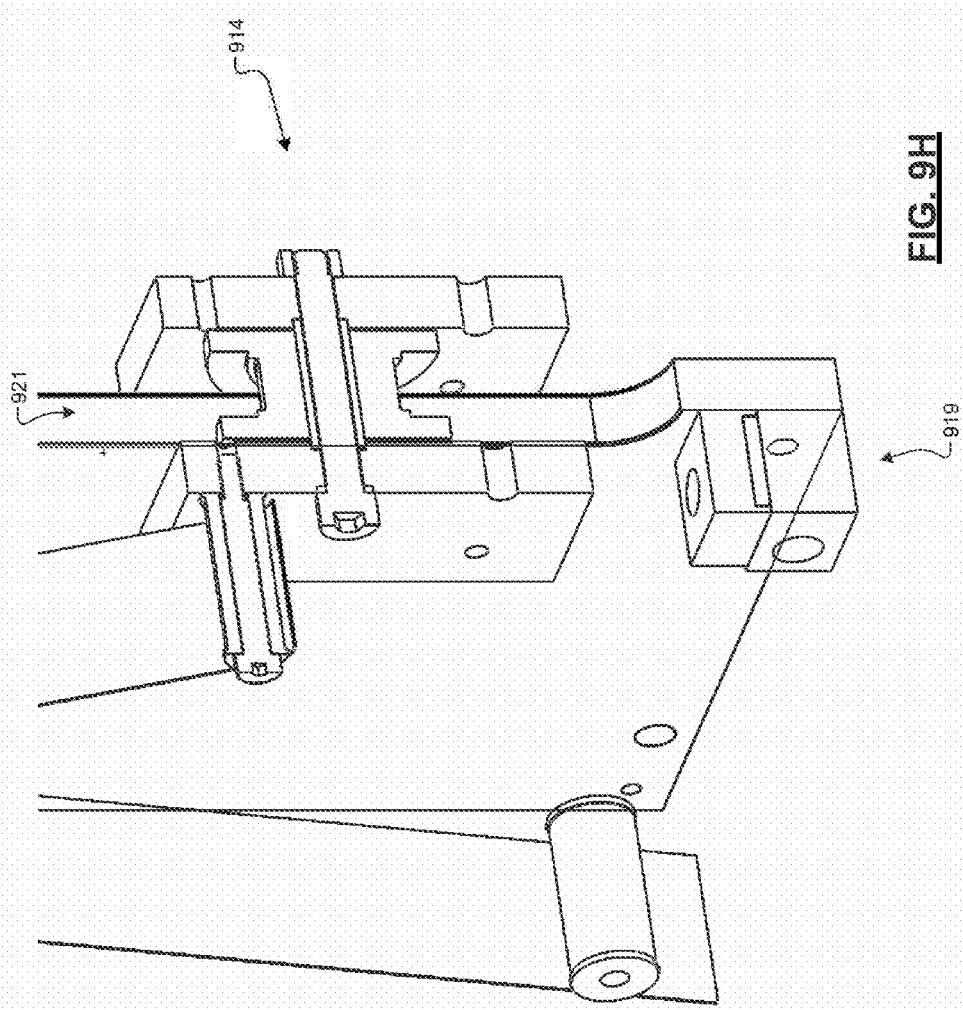

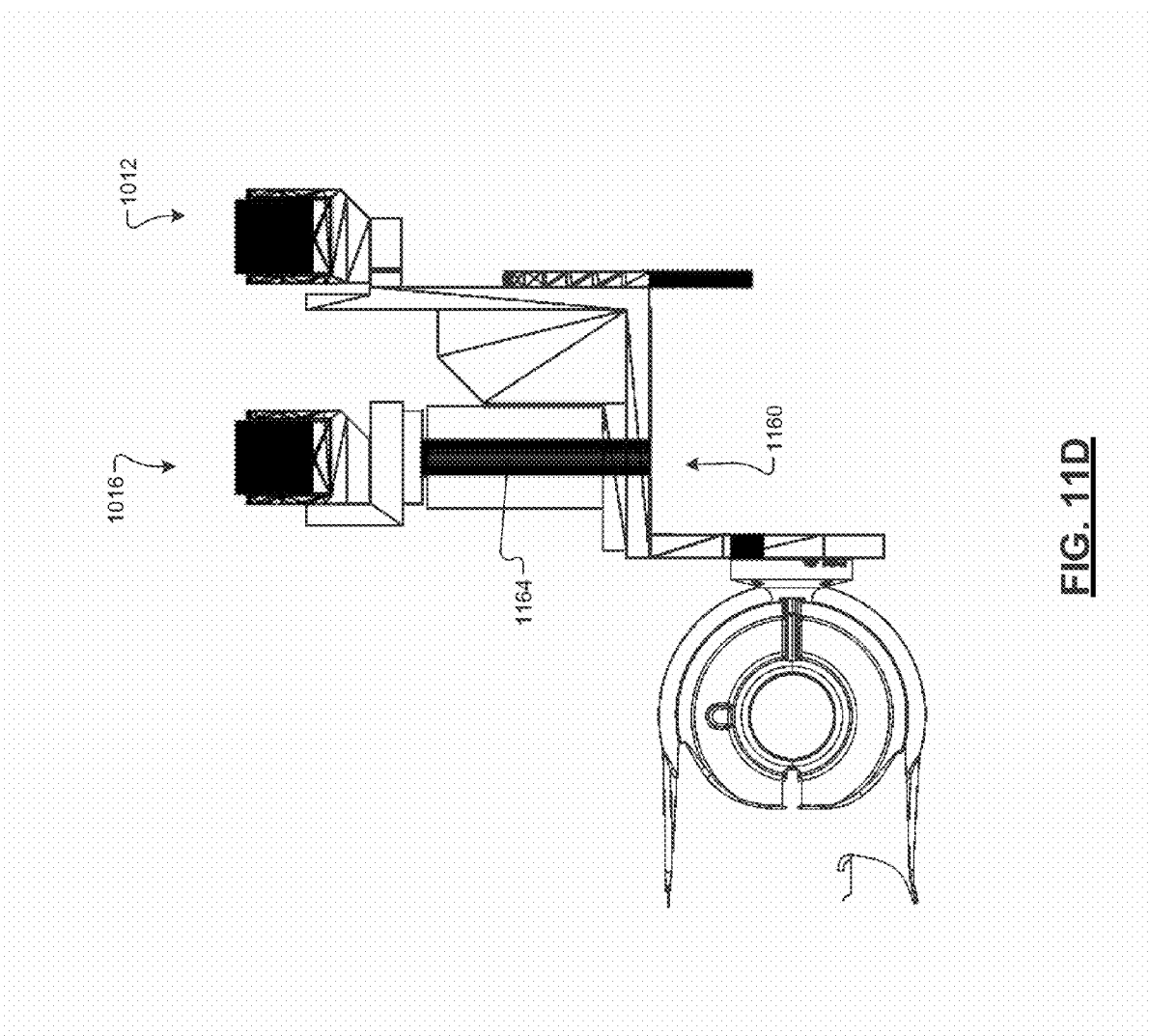

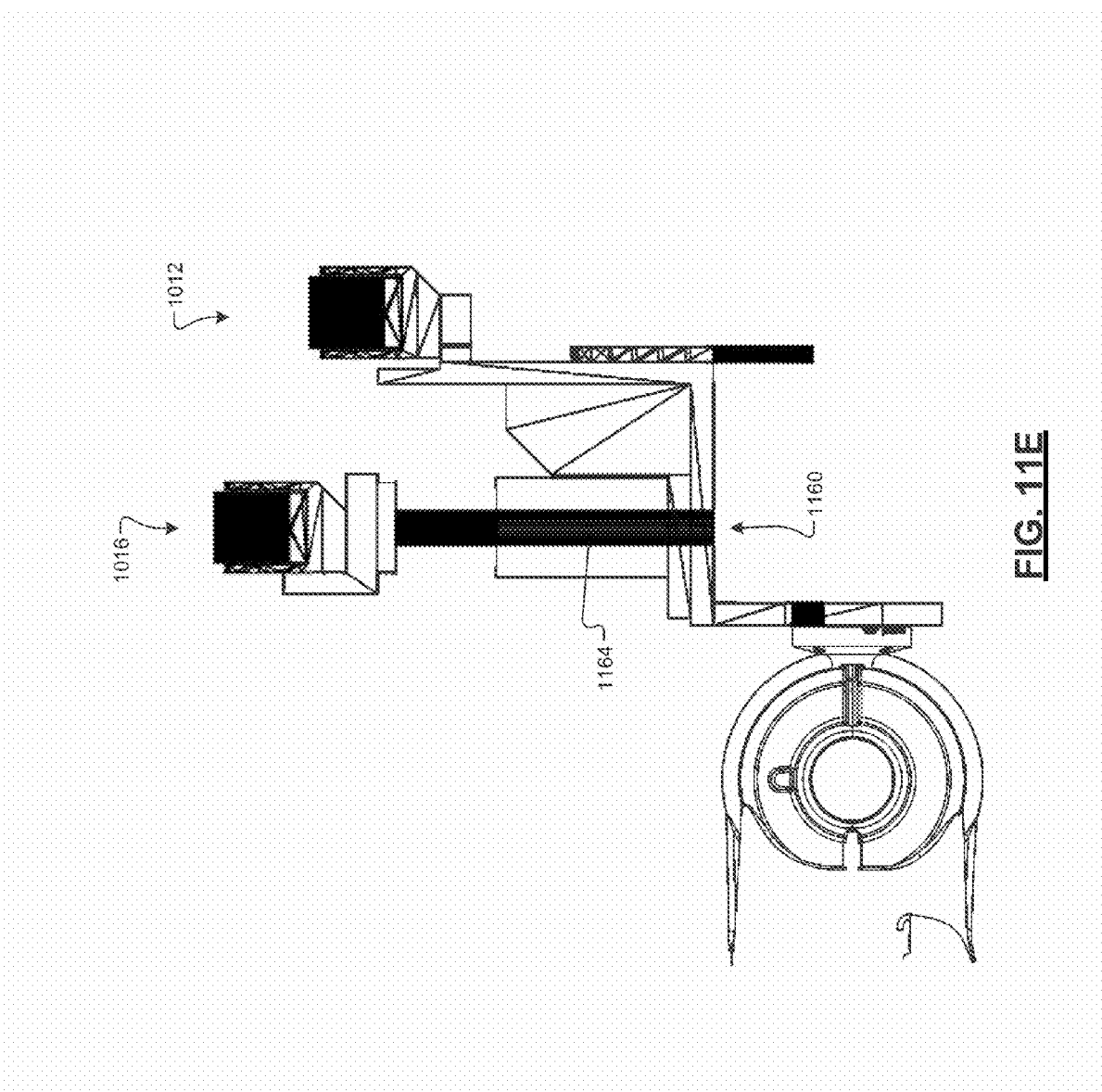

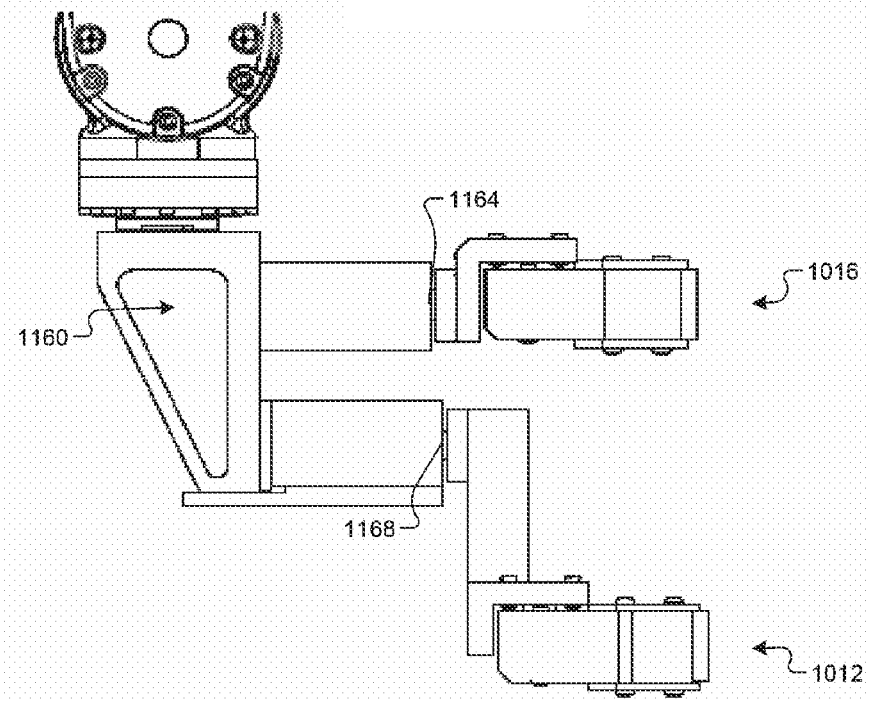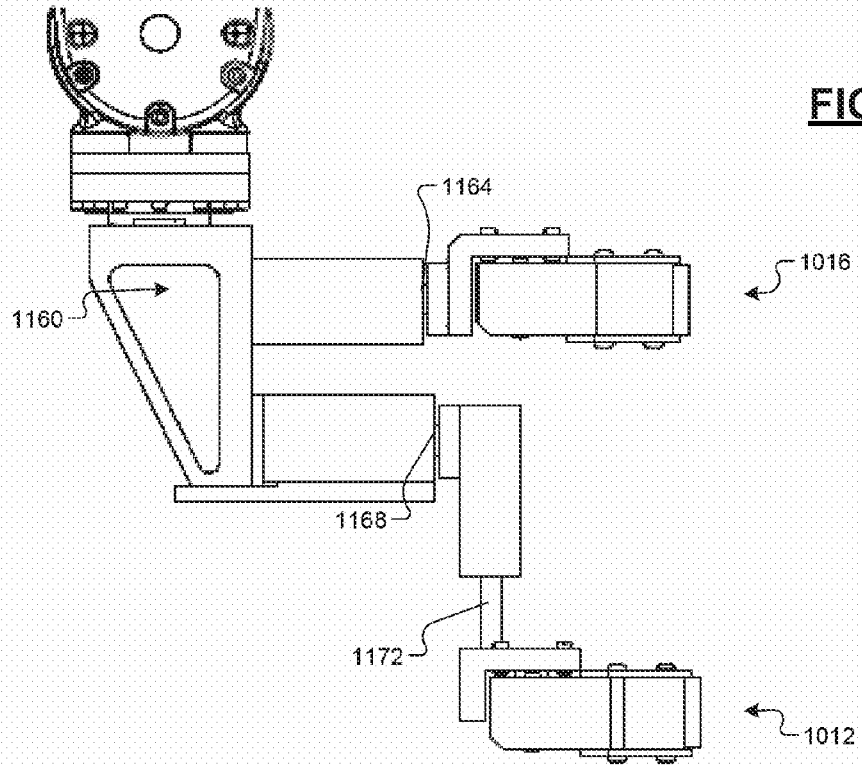
FIG. 11F

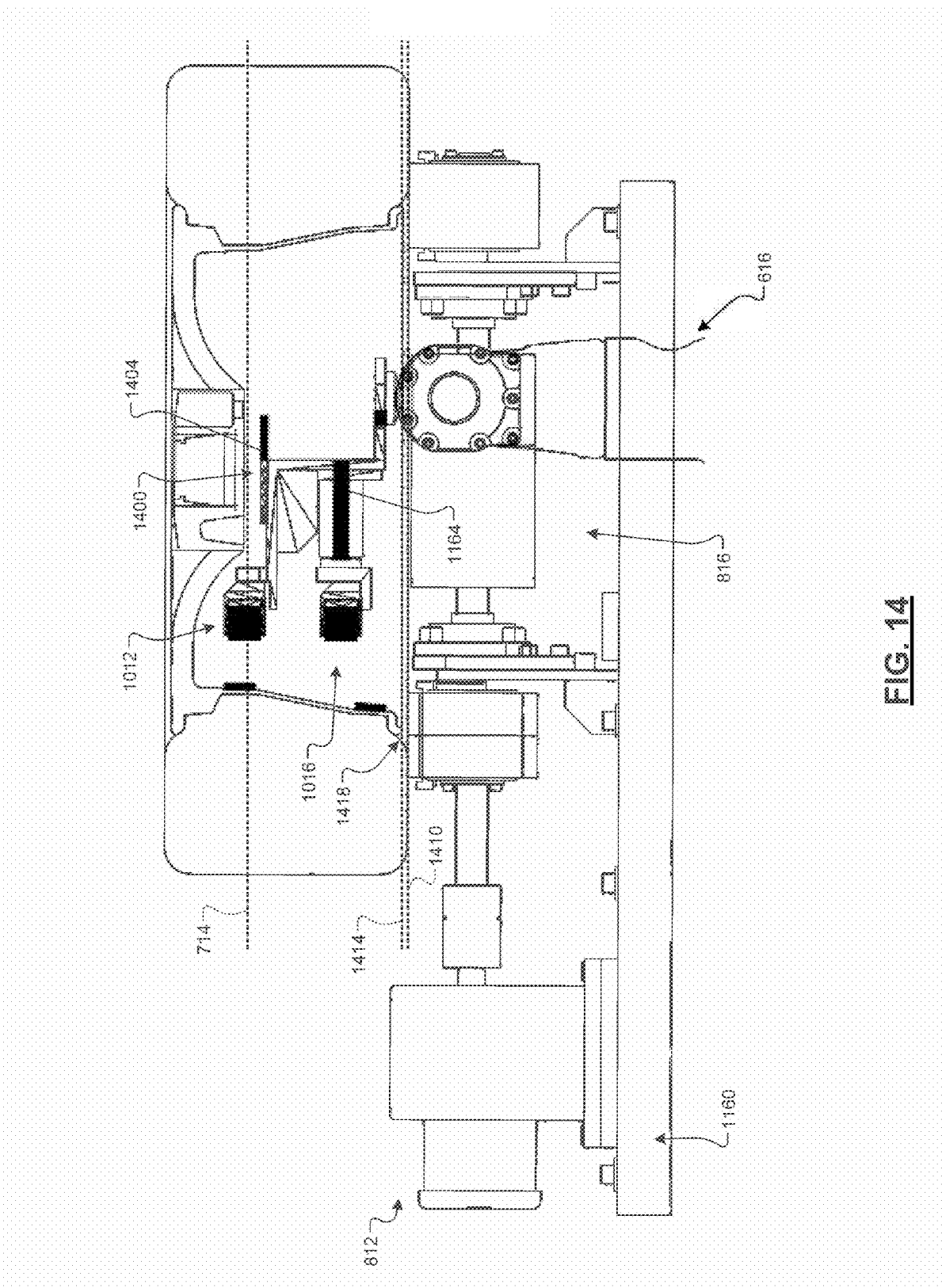

WEIGHT MATERIAL DISPENSING, CUTTING, AND APPLYING SYSTEM

CROSS-REFERENCE TO RELATED APPLICATIONS

This application is a continuation-in-part of U.S. patent application Ser. No. 12/683,495, filed on Jan. 7, 2010, which claims priority to U.S. Provisional Application No. 61/143,284, filed on Jan. 8, 2009. This application claims the benefit of U.S. Provisional Application No. 61/428,534, filed on Dec. 30, 2010. The disclosures of the above applications are incorporated herein by reference in their entirety.

FIELD

The present disclosure relates to weight material and more particularly to weight material dispensing and cutting systems and methods of operating such systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Rotating assemblies are used in many applications. For example only, in automotive applications, wheel/tire assemblies are used to couple the vehicle to the ground. As the vehicle moves, wheel/tire assemblies rotate many times. At higher rates of speed, any weight imbalance in the wheel/tire assemblies may result in vibration, which increases wear on vehicle components and may be perceived as a poor ride by the driver.

As a result, wheel/tire assemblies are balanced in a balancing process. A balancing machine may spin a wheel/tire assembly to determine which points of the wheel/tire assembly require more or less weight so that the weight will be evenly distributed across the assembly. In most applications, it is easier to add additional weight than to remove weight.

The balancing machine may therefore determine how much weight to add to which locations of the wheel/tire assembly in order to balance the weight distribution of the assembly. In various implementations, two locations on the assembly may be selected, although more or fewer are possible. The balancing locations may be predetermined, and the balancing machine simply determines how much weight to apply to each of the predetermined balancing locations.

For a rimmed wheel, lead pound-on weights may be attached to the rim of the wheel. For example, lead weights from 0.5 ounces to 10 ounces in increments of 0.5 ounces may be stocked by businesses that balance wheel/tire assemblies. In this example, 20 different part numbers of lead weights must be inventoried and managed. The various lead weights may not look appreciably different in size, thereby leading to inadvertent mixing of the weights and inadvertent use of the wrong size of weight. In addition, lead toxicity is a concern. Other materials may be used for pound-on weights, such as iron. With iron pound-on weights, rust may be a concern.

To address these concerns, systems of encased lead weights have been developed. In these systems, individual weights (such as 0.5 ounce weights) are encased in a non-toxic coating, such as plastic, and the coating connects the individual weights together to form a segmented strip. Depending on the weight desired for balancing, the corresponding number of weights can be cut from the strip. The segmented strip of weights allows a single part number to be inventoried. The segmented strip may have an adhesive backing that secures the cut segments to the wheel/tire assembly. The non-toxic coating may protect against lead toxicity and/or rust.

SUMMARY

An apparatus for balancing a wheel includes a tool and an arm control module. The tool is mechanically coupled to an arm and includes a leading edge, a trailing edge, and a face surface that forms an arc between the leading and trailing edges. The arm control module actuates the arm to position the leading edge of the tool a predetermined distance from an edge of a deck of a cutting apparatus to receive a piece of non-segmented wheel weight material. A blade of a cutting apparatus passes between the edge of the deck and the leading edge of the tool to cut the piece from the non-segmented wheel weight material.

An apparatus for balancing a wheel includes a first tool, a second tool, an actuator, and an arm control module. The first tool is positioned by an arm and includes a first face surface. The second tool is positioned by the arm and includes a second face surface. The actuator selectively extends and retracts the second tool relative to the first tool. The arm control module, after a first piece of non-segmented wheel weight material is deposited on the first face surface and a second piece of the non-segmented wheel weight material is deposited on the second face surface, (i) applies the first piece along a first plane of the wheel by moving the arm and (ii) applies the second piece along a second plane of the wheel while the second tool is extended relative to the first tool by moving the arm. The first and second planes do not intersect.

A method of cutting non-segmented wheel weight material includes actuating an arm to position a leading edge of a tool a predetermined distance from an edge of a deck of a cutting apparatus. The tool includes the leading edge, a trailing edge, and a face surface that forms an arc between the leading and trailing edges. The method further includes receiving a piece of the non-segmented wheel weight material using the tool. A blade of the cutting apparatus passes between the edge of the deck and the leading edge of the tool to cut the piece.

A method for balancing a wheel includes selectively extending and retracting a first tool relative to a second tool. The first and second tools are positioned by an arm, and the first and second tools include first and second face surfaces, respectively. The method further includes, after a first piece of non-segmented wheel weight material is deposited on the first face surface and a second piece of the non-segmented wheel weight material is deposited on the second face surface, moving the arm to apply the first piece along a first plane of the wheel while the first tool is extended relative to the second tool and moving the arm to apply the second piece along a second plane of the wheel, wherein the first and second planes do not intersect.

BRIEF DESCRIPTION OF THE DRAWINGS

The present disclosure will become more fully understood from the detailed description and the accompanying drawings, wherein:

FIG. 2E is a partial front view of an example implementation of a cutting apparatus according to the principles of the present disclosure;

FIG. 4B is a front view of an example implementation of a dispensing apparatus according to the principles of the present disclosure;

FIG. 4C is a rear view of an example implementation of a dispensing apparatus according to the principles of the present disclosure;

FIG. 4D is a partial rear view of an example implementation of a dispensing apparatus according to the principles of the present disclosure;

FIG. 5 is an isometric view of an example implementation of a splicing apparatus according to the principles of the present disclosure;

FIGS. 8A and 8B are front and side views, respectively, of an example implementation of an arm with and an end of arm tool (EOAT), a crowder, and a conveyer system according to the principles of the present disclosure;

FIGS. 9A-9H are various isometric views of the cutting apparatus and a backing removal system according to the principles of the present disclosure;

FIGS. 11A-11G are various views of wet out tools of the EOAT according to the principles of the present disclosure;

FIG. 14 is an isometric view of an example implementation of a wheel balancing system including a mounting plane learning system according to the principles of the present disclosure.

DETAILED DESCRIPTION

Figure 1A:
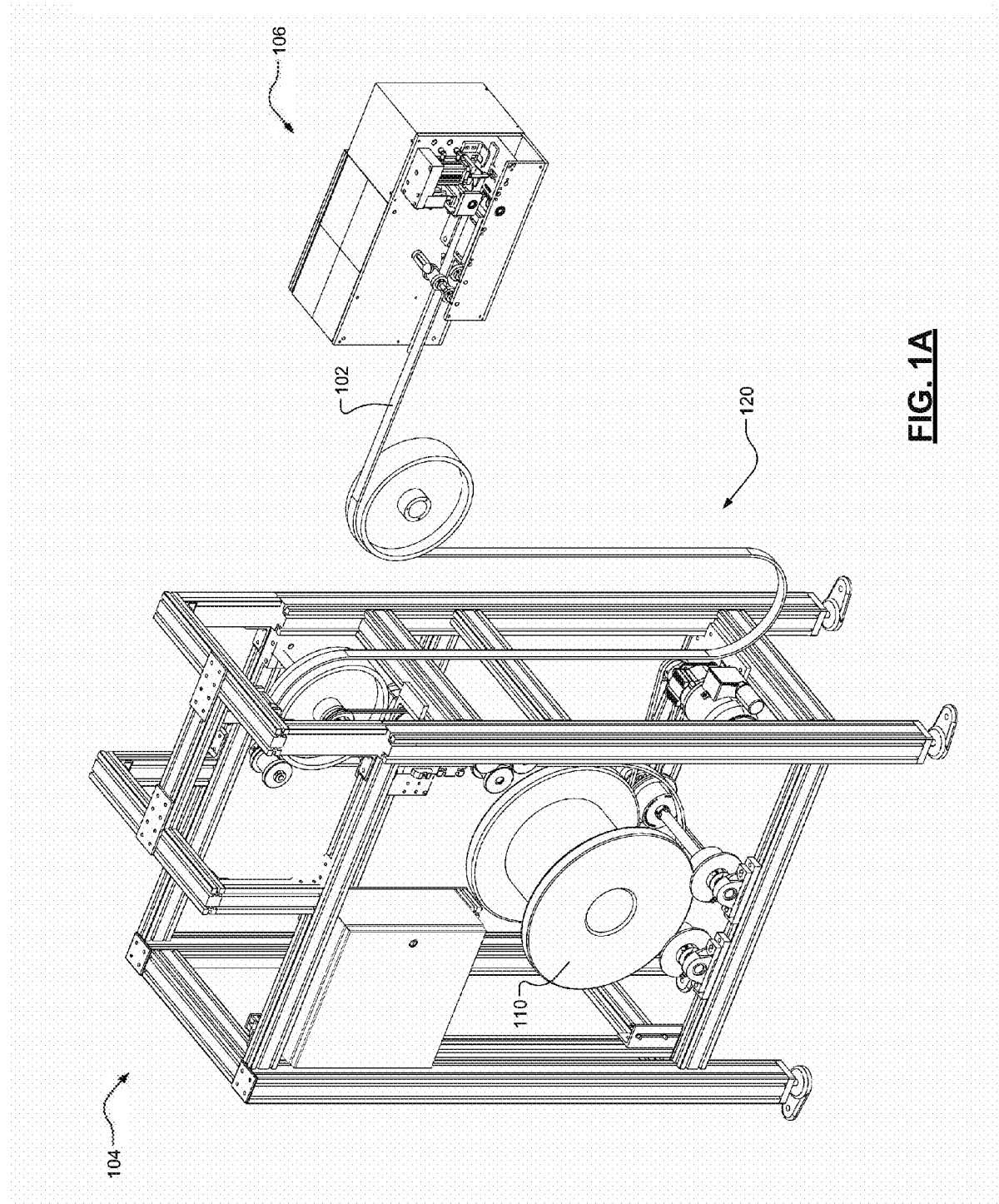
FIG. 1A is an isometric view of an example continuous weight material dispensing and cutting system according to the principles of the present disclosure.

The following description is merely example in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

When individual lead or iron weights are encased and joined in a segmented strip, the granularity of control of the weight is limited. Cutting a segment with a partial lead weight is not an option because of the toxicity of the lead, and cutting the lead may be more difficult than cutting the casing. Similarly, cutting a segment with a partial iron weight exposes the iron to rust and may be more difficult than cutting only the casing. Weight pieces are therefore only available in increments of the individual weight. This may limit the accuracy of the balancing. In addition, if only half a segment in terms of weight is needed for balancing, the entire segment is used, thereby wasting half a segment.

To overcome the problems of this segmented design, a continuous strip of high-density weight material may be used. For ease of storage, handling, and transportation, the weight material may be flexible. For example, the weight material may be flexible enough to be stored in a roll. Because the weight material is continuous, the granularity of control of the weight of a segment can be made arbitrarily small. Manufacturing limitations may cause the linear density of the continuous weight material to vary slightly over the length of the continuous weight material. The precision of the cutting apparatus and the variance of the linear density of the weight material therefore dictates the accuracy of pieces cut from a continuous strip of the weight material.

In contrast to segmented strips of lead or iron weights connected by a casing, continuous weight material may have a cross-section that is substantially uniform along the length of the continuous weight material. The segmented material, meanwhile, has one cross-section where the lead/iron material is present and a different cross-section in the connecting spaces where only the casing is present.

Similarly, the linear density of the continuous weight material may remain approximately constant. This is in contrast to the segmented material, where the sections including lead/iron have a much higher linear density than the connecting sections. The continuous weight material may be available in different cross-sectional shapes and sizes to accommodate various aesthetic and packaging concerns.

One side of the continuous weight material may be partially or fully covered with an adhesive to allow a cut segment to be attached to a wheel. The adhesive may be in the form of an acrylic foam tape. A lining or backing may cover an exposed surface of the tape to prevent the tape from sticking to the continuous weight material when stored in a roll. In addition, the backing prevents contaminants from reducing the effectiveness of the adhesive. For example only, the continuous weight material may be available from the 3M Company, such as product numbers TN2015, TN2023, and TN4014.

For purposes of illustration only, the present disclosure describes continuous weight material in the context of wheel/tire assemblies. However, the systems and methods of the present disclosure apply to other applications where additional precise weights may be needed. For example only, precise weights may be used in balancing other components in both automotive and non-automotive applications. The components may be rotating components, such as a flywheel or a driveshaft, or may be components that reciprocate or move in another fashion. The systems and methods of the present disclosure apply to weight balancing even for stationary objects, where desired weight balance parameters may be specified.

Figure 1B:
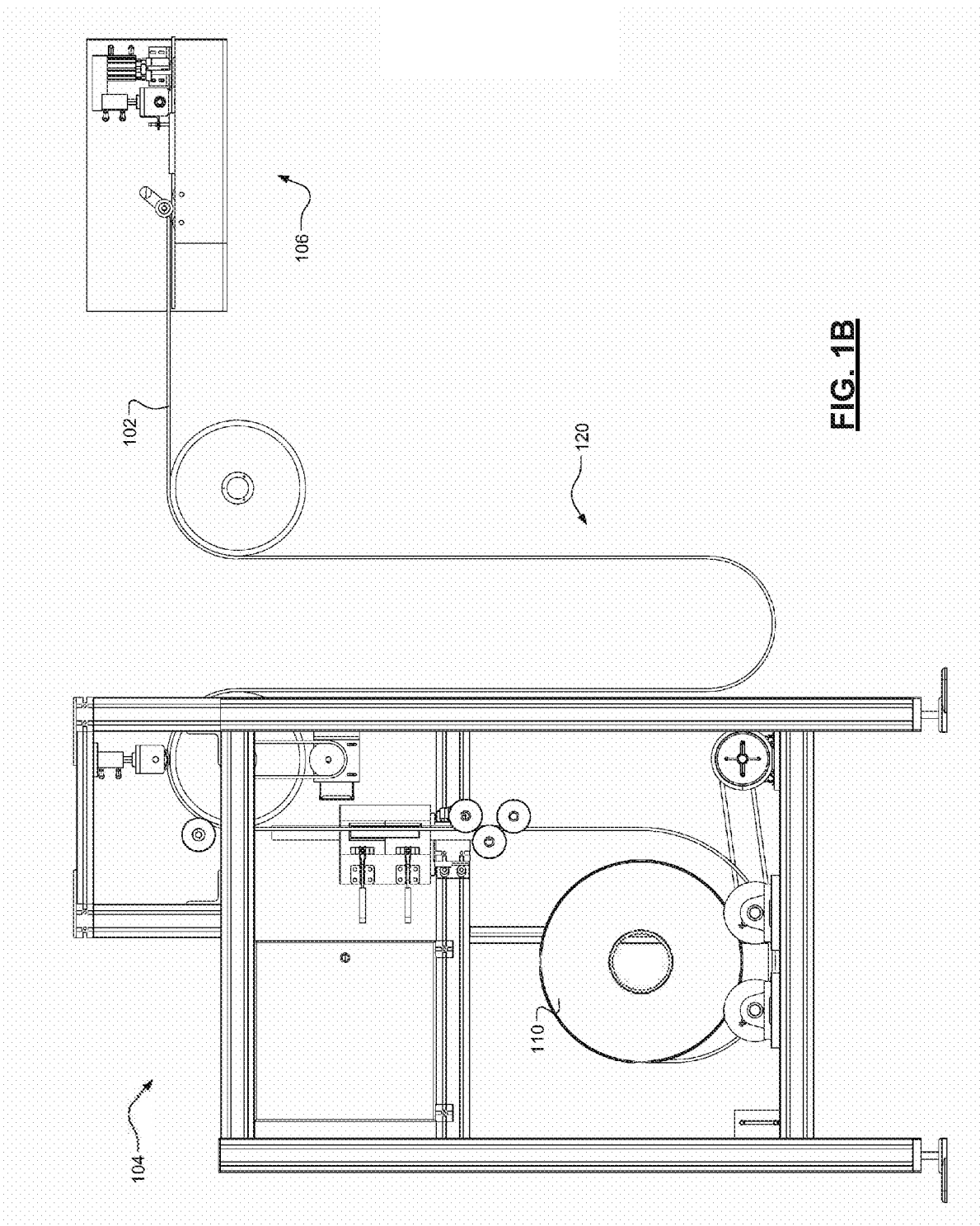
FIG. 1B is a front view of an example continuous weight material dispensing and cutting system according to the principles of the present disclosure.

Referring now to FIGS. 1A and 1B, isometric and front views of a continuous weight material dispensing and cutting system are shown. A strip 102 of continuous weight material is provided from a dispensing apparatus 104 to a cutting apparatus 106. The dispensing apparatus 104 provides the strip 102 from a spool 110. The cutting apparatus 106 advances the strip 102 by a specified length, and then cuts the strip 102 to create a piece of weight material.

The dispensing apparatus 104 may create a loop 120 from the strip 102 so that advancing of the strip 102 by the cutting apparatus 106 does not have to be precisely synchronized with feeding of the strip 102 by the dispensing apparatus 104. In addition, the loop 120 provides a reserve of additional weight material to allow the cutting apparatus 106 to continue operating while the spool 110 is being changed. The size of the loop 120 may be limited by a distance to the floor. The size of the loop 120 may also be limited by the ability of the cutting apparatus 106 to pull the weight of the weight material included in the loop 120. For example, motor torque and/or friction may limit the amount of weight the cutting apparatus 106 can pull.

Figure 2A:
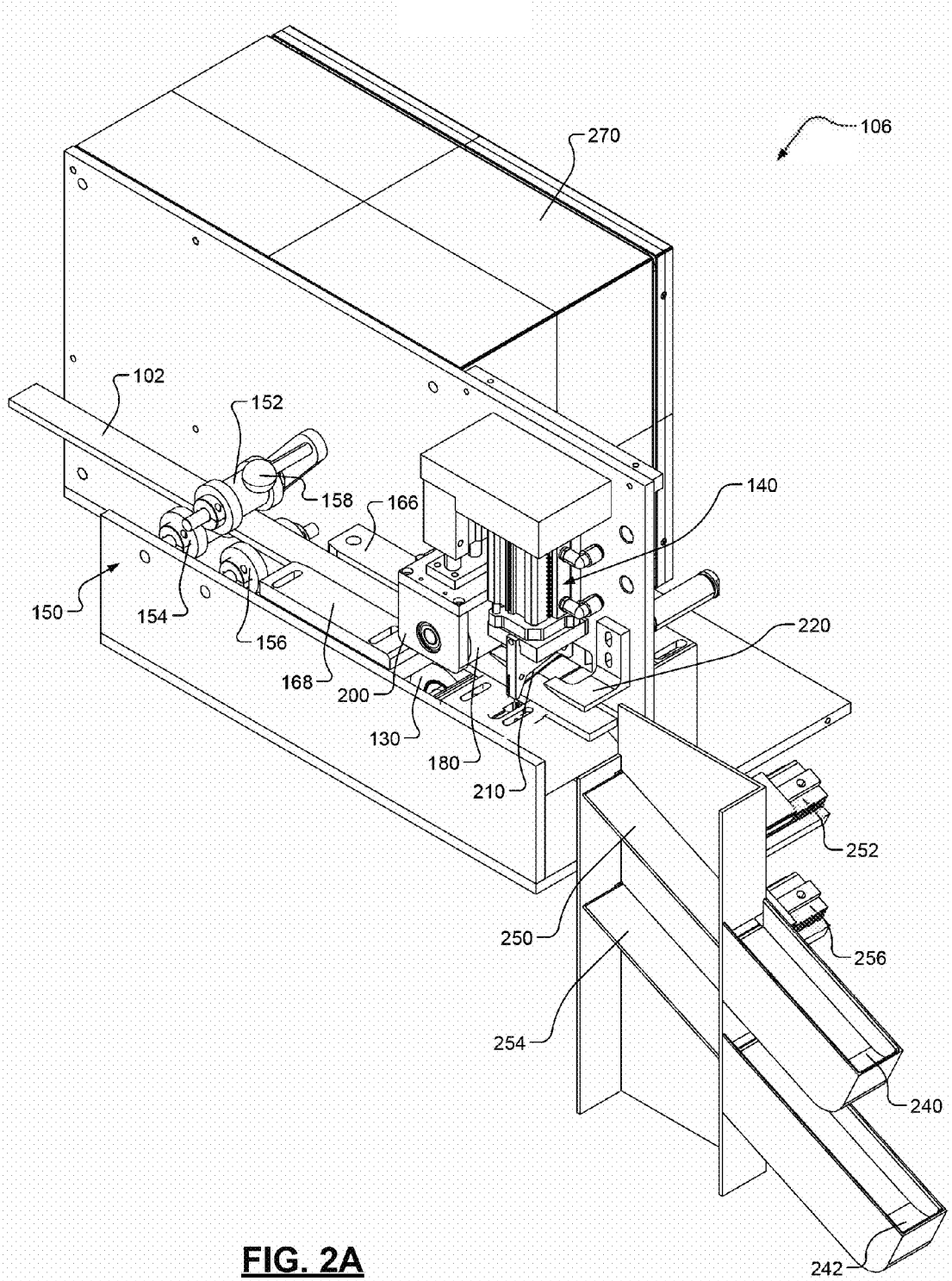
FIG. 2A is an isometric view of an example implementation of a cutting apparatus according to the principles of the present disclosure.
Figure 2B:
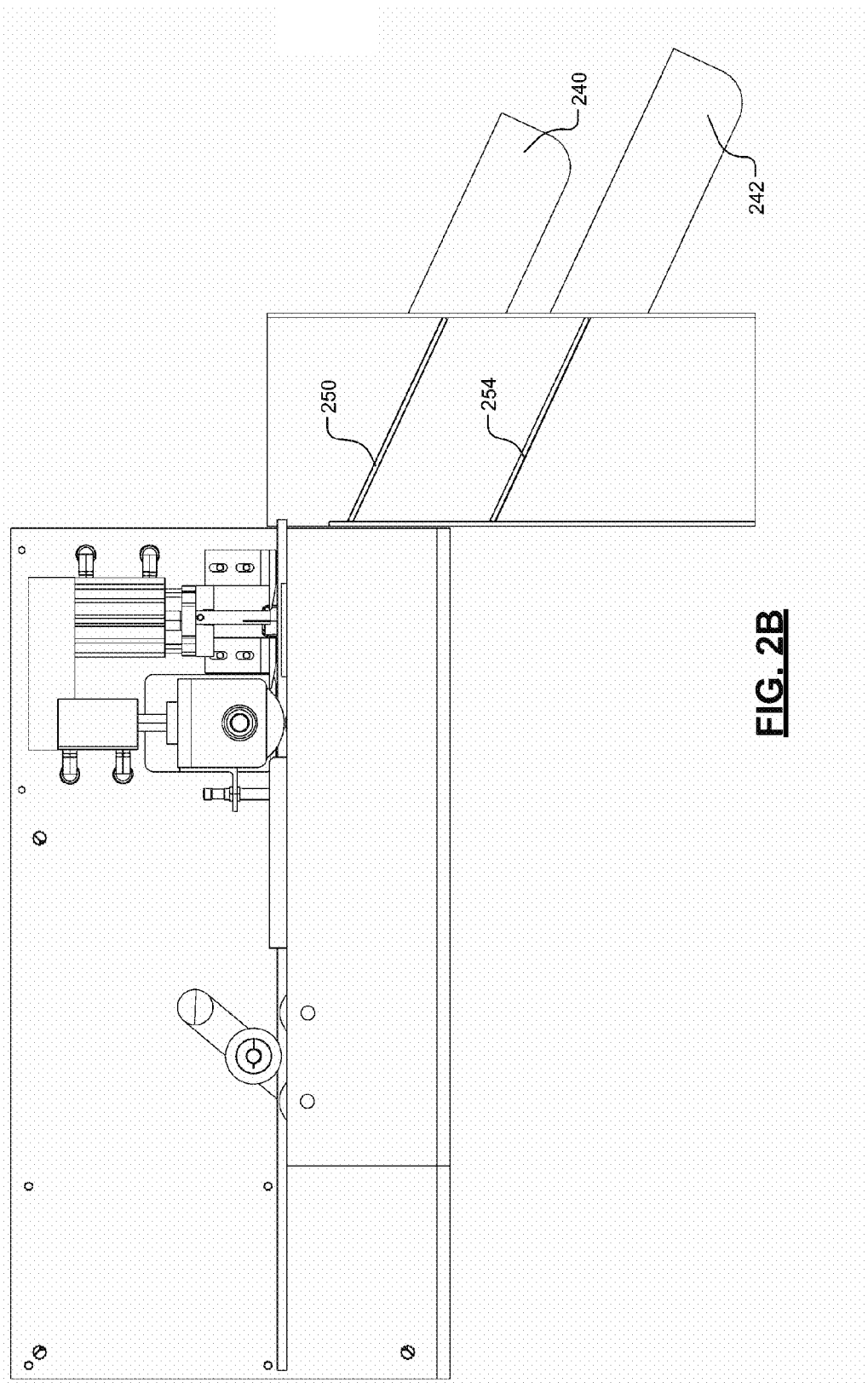
FIG. 2B is a side view of an example implementation of a cutting apparatus according to the principles of the present disclosure.
Figure 2C:
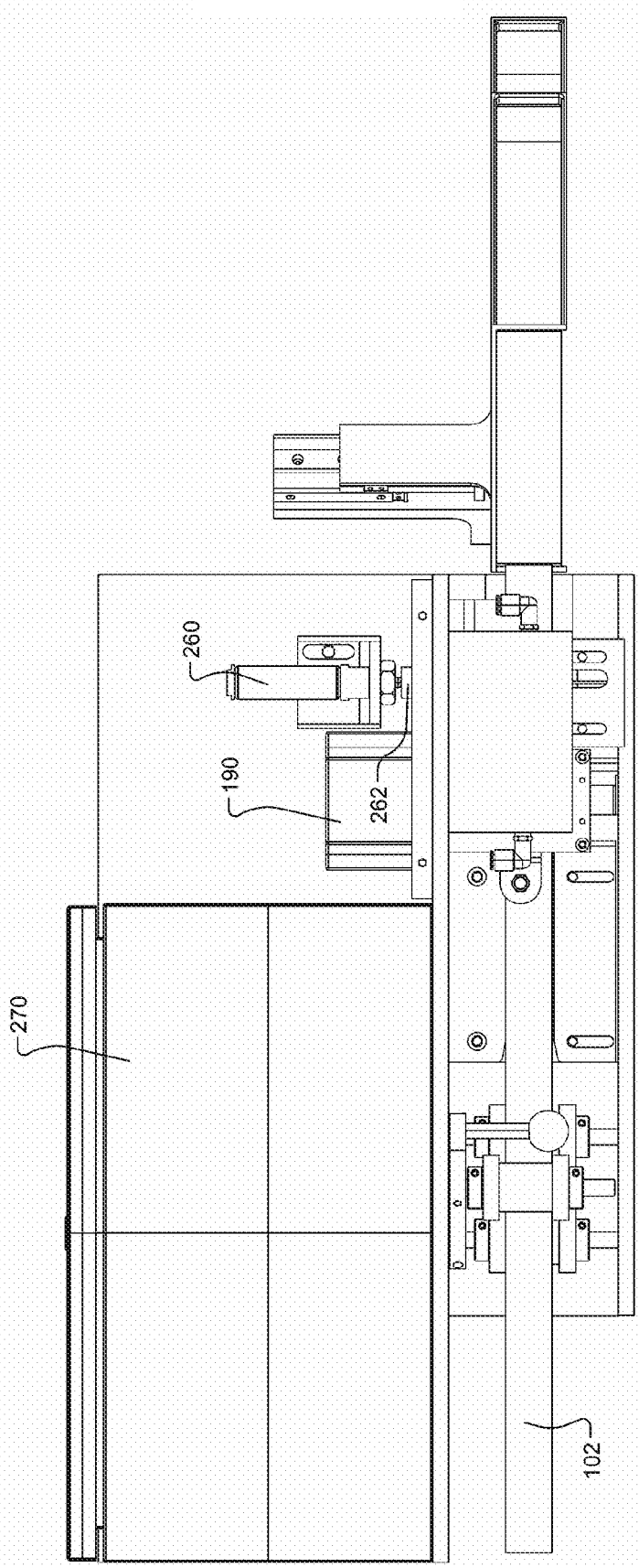
FIG. 2C is a top view of an example implementation of a cutting apparatus according to the principles of the present disclosure.

Referring now to FIGS. 2A-2J, various views of an example implementation of the cutting apparatus 106 are presented. The cutting apparatus 106 includes a drive roller 130 that advances a predetermined length of the strip 102. A cutting device 140 then cuts the strip 102, thereby creating a piece of weight material. Prior to reaching the drive roller 130, the strip 102 may be drawn through an alignment assembly 150. The alignment assembly 150 ensures that the strip 102 enters at the correct orientation and position. In various implementations, such as is shown in FIG. 2A, the alignment assembly 150 may include first, second, and third rollers 152, 154, and 156. In various implementations, one or more of the first, second, and third rollers 152, 154, and 156 may be eliminated.

Figure 2D:
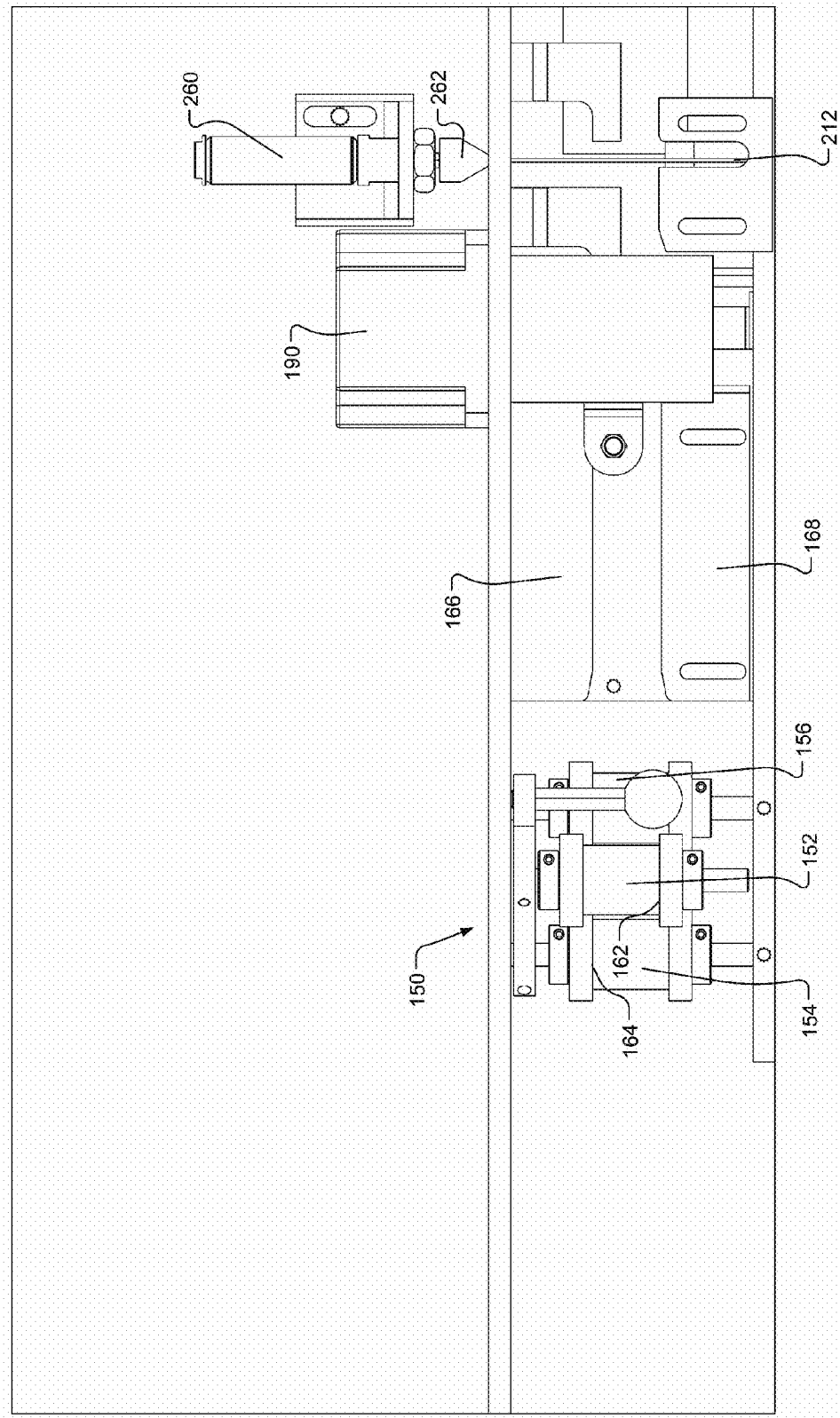
FIG. 2D is a simplified top view of an example implementation of a cutting apparatus according to the principles of the present disclosure.

The height of the first roller 152 may be adjusted based on the cross-sectional thickness of the strip 102. The first roller 152 may be adjusted using an adjustment knob 158. In FIG. 2D, a top view illustrates that the first roller 152 and the second and third rollers 154 and 156 may be adjusted laterally with respect to each other based on the cross-sectional width of the strip 102. In various implementations, the second and third rollers 154 and 156 may be fixed, while the first roller 152 is adjusted laterally.

A first edge 162 of the first roller 152 and a first edge 164 of the second roller 154 define the track for the strip 102. The distance between the first edges 162 and 164 may therefore be adjusted to be equal to or slightly greater than the cross-sectional width of the strip 102. First and second guides 166 and 168 may further prevent the strip from moving in a lateral direction. The second guide 168 may be adjusted based on the cross-sectional width of the strip 102. In various implementations, the first and second guides 166 and 168 may be shortened or eliminated altogether.

The drive roller 130 engages the strip 102 and pulls the strip 102 underneath the cutting device 140. The drive roller 130 presses the strip 102 against an idle roller 180. This increases the frictional force exerted on the strip 102 by the drive roller 130, thereby reducing slippage. The idle roller 180 may rotate freely, such as on low-friction bearings, to reduce rubbing that would otherwise occur if the drive roller 130 simply pressed the strip 102 against a fixed surface.

The drive roller 130 may be directly driven by a stepper motor 190. Directly driven means that the axle of the drive roller 130 is integral with or coupled in line with an output shaft of the stepper motor 190. Directly driven therefore means that the drive roller 130 rotates at the same angular speed as the stepper motor 190. Directly driven also means that an axis around which the drive roller 130 rotates is approximately collinear with an axis around which the output shaft of the stepper motor 190 rotates. One advantage of direct driving over other coupling mechanisms, such as gear, belt, or chain drives is that no slop or gear lash develops over time in a direct drive system.

Figure 2F:
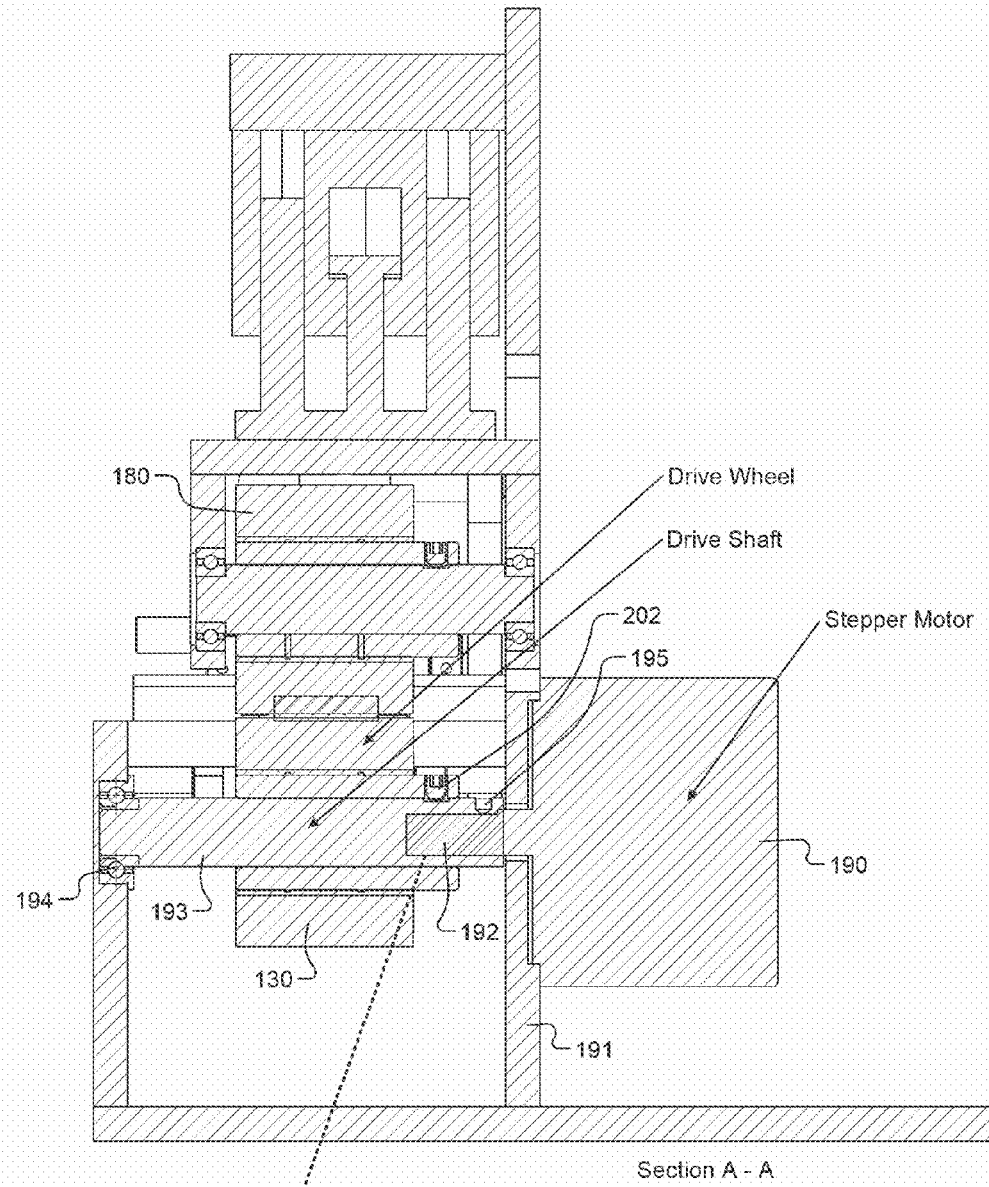
FIGS. 2F-2H are cross-sectional views of example implementations of a cutting apparatus along the A-A line of FIG. 2E according to the principles of the present disclosure.
Figure 2G:
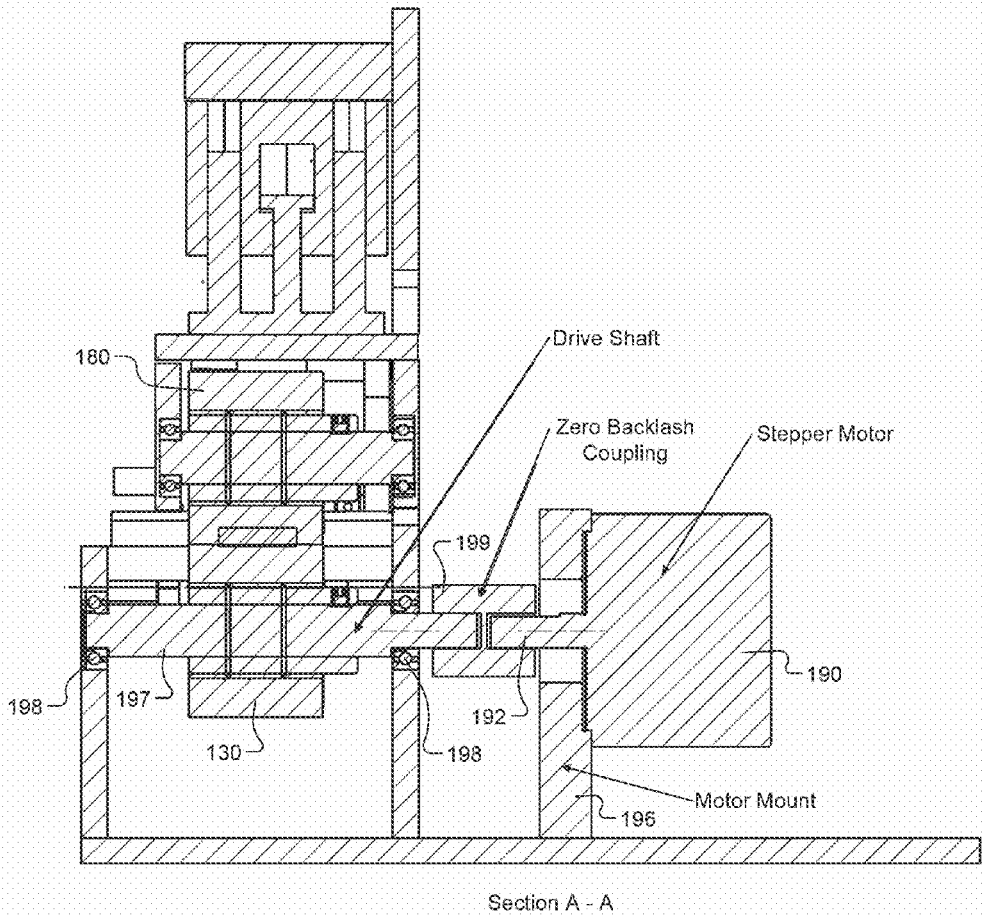
Figure 2H:
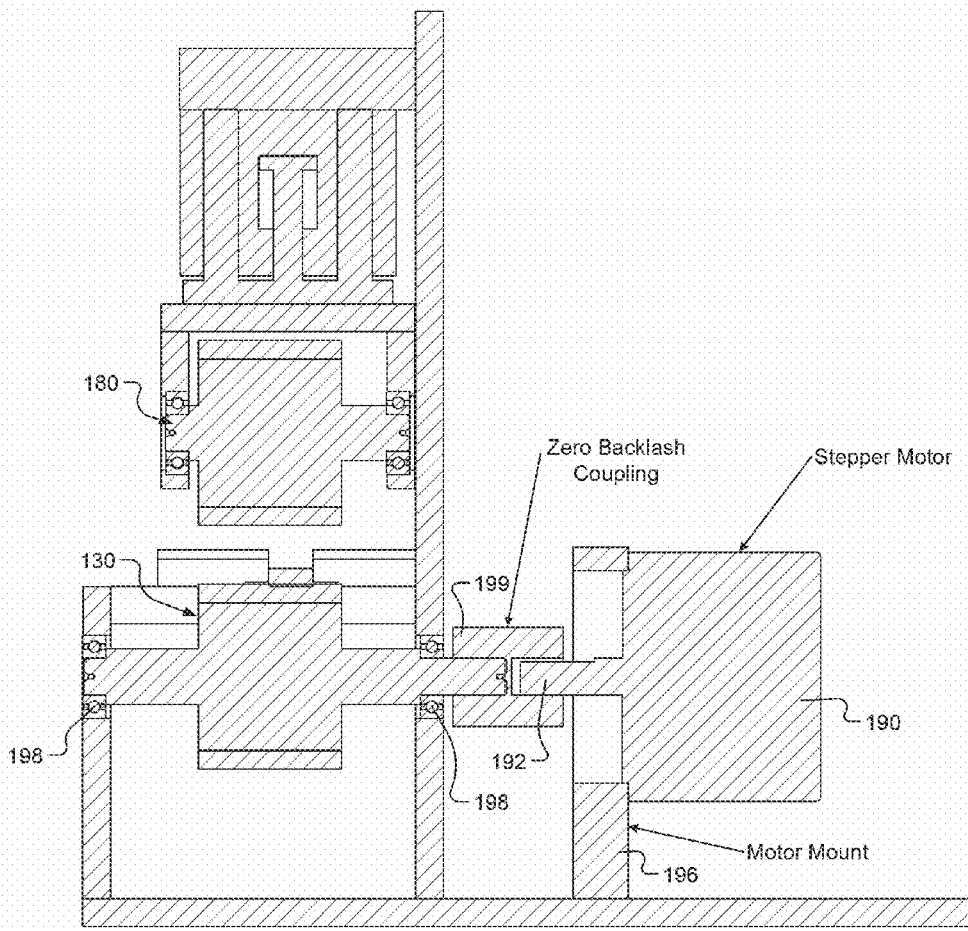

FIGS. 2F-2H depict example configurations for direct driving. The stepper motor 190 is mounted to a rigid plate 191. An output shaft 192 of the stepper motor 190 fits into a corresponding void in a first end of a drive shaft 193. An opposite end of the drive shaft 193 rides in a bearing 194. The drive roller 130 is affixed to the drive shaft 193 and therefore rotates with the drive shaft 193. One or more set screws, such as set screw 202, may secure the drive roller 130 to the drive shaft 193.

One or more set screws 195 may secure the drive shaft 193 to the output shaft 192. For example only, the output shaft 192 may have a cross-section as shown in FIG. 2F, which is a circle with two portions defined by two chords of the circle removed. Two set screws 195 may bear against each flat section 204-1 and 204-2, respectively, of the cross-section.

Referring now to FIG. 2G, the stepper motor 190 is secured to a rigid motor mount 196. The drive roller 130 is affixed to a drive shaft 197, which is supported by bearings 198. The output shaft 192 is attached to a protruding end of the drive shaft 197 by a coupling 199. The coupling 199 may allow for a small amount of axial, lateral, and angular misalignment between the drive shaft 197 and the output shaft 192.

The misalignment is small and therefore the output shaft 192 and the drive shaft 197 are still approximately collinear, as required for direct driving. For example only, an angle misalignment of less than 1 degree and a lateral misalignment of less than 7 thousandths of an inch may still be considered approximately collinear with regard to the definition of direct driving. For applications where less precision is required, slightly more angular and lateral misalignment may be allowed, such as 5 degrees and 50 thousandths of an inch.

Referring now to FIG. 2H, a unitary version of the drive roller 130 is shown. The drive roller 130 incorporates an axle that is supported by the bearings 198 and attached to the output shaft 192 of the stepper motor 190 by the coupling 199.

Figure 2I:
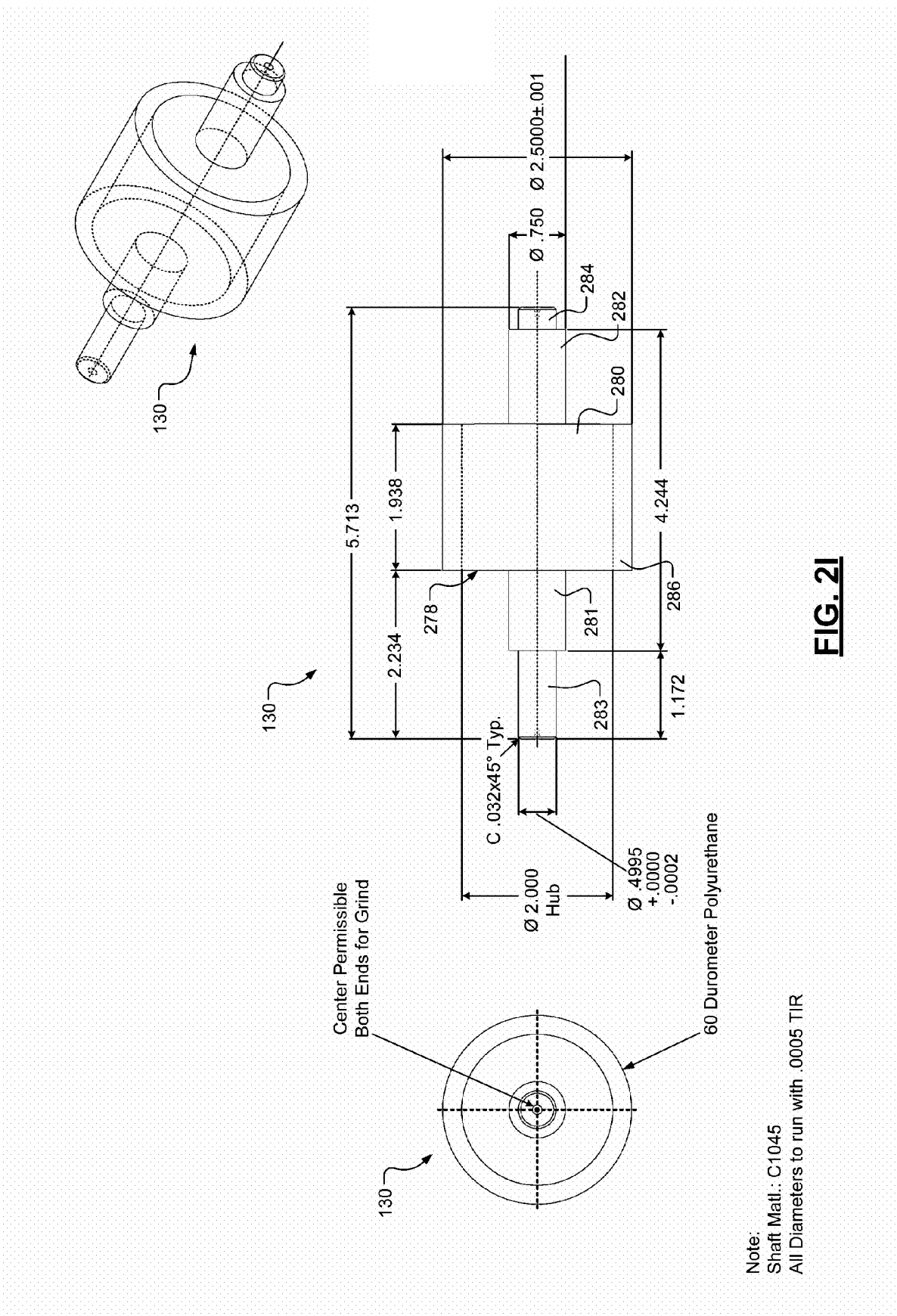
FIG. 2I is a composite of end, side, and isometric views of a drive roller depicted in FIG. 2H according to the principles of the present disclosure.

Referring now to FIG. 2I, end, side, and isometric views of the drive roller 130 as shown in FIG. 2H. The drive roller 130 includes a unitary piece 278 having a roller core 280, axle ends 281 and 282, and bearing ends 283 and 284. The axle ends 281 and 282 are on either side of the roller core 280 and may have a smaller diameter than the roller core 280. The bearing ends 283 are on either end of the axle ends 281 and 282, respectively, and may have a smaller diameter than the axle ends 281 and 282.

The unitary piece 278 is formed from a single piece of material. In various implementations, the unitary piece 278 is rough machined, such as by using a lathe, from a piece of round stock, such as 1045 cold rolled steel. The roller core 280 is then coated with a cover material 286, which may have a high coefficient of friction and be more compliant than metal, such as 60-durometer polyurethane. The cover material 286 and the bearing ends 283 may then be finely machined, such as by using a surface grinder. In various implementations, the axle ends 281 and 282 may also be finely machined.

Referring back to FIG. 2A, the distance the strip 102 is moved with each step of the stepper motor 190 depends on configuration of the stepper motor 190 and an electrical driver of the stepper motor 190, as well as the diameter of the drive roller 130. For example only, the distance moved with each step may be between 7 and 8 ten thousandths of an inch, or may be four thousandths of an inch. For example only, a system according to the principles of the present disclosure may allow pieces of weight material to be generated with a repeatability of approximately 0.5 or 0.25 grams.

The variation in linear density of the weight material, and not the accuracy of the cutting system, may be the limiting factor with regard to weight repeatability. For example only, a system according to the principles of the present disclosure may produce pieces of weight material whose length deviates from the desired length (which may be calculated based on desired weight) by no more than plus or minus 0.5%, for a total range of 1%.

The idle roller 180 is mounted in a carriage 200. The carriage 200 may move up and down with respect to the strip 102 to accommodate various thicknesses of the strip 102. In addition, more or less pressure may be applied by the carriage 200 to increase the frictional force of the idle roller 180. For example, in humid or oily environments, the pressure applied by the carriage 200 may be increased.

When the idle roller 180 is also driven, a second stepper motor (not shown) may be mounted to the carriage 200 so that the second stepper motor moves up and down with the carriage 200. The second stepper motor directly drives the idle roller 180 in unison with driving of the drive roller 130 by the stepper motor 190. Alternatively, the idle roller 180 may be driven from the stepper motor 190 via a belt/chain or gear train. In another alternative, the stepper motor 190 may directly drive the idle roller 180, and the drive roller 130 is allowed to idle.

Downforce of the carriage 200 may be created in various ways. For example, air pressure may be used to press the carriage 200 against the drive roller 130. In addition, gravity may provide downforce. Further, springs and/or hydraulic pressure may apply downforce to the carriage 200. The air pressure or hydraulic pressure may be calibrated using a calibration procedure and/or may be manually set by an operator.

In various implementations, the drive roller 130 and/or the idle roller 180 may have a raised pattern that is imprinted on the strip as the strip passes between the drive roller 130 and the idle roller 180. This pattern may have aesthetic value. In addition, the raised pattern may offer a better grip of the strip 102, reducing slippage.

The stepper motor 190 is electronically controlled to advance a predetermined amount of the strip 102 past the cutting device 140. Once this predetermined amount has been fed, the cutting device 140 actuates a blade 210 to cut a piece off of the strip 102. For example only, the cutting device 140 may be actuated by air pressure.

Figure 2J:
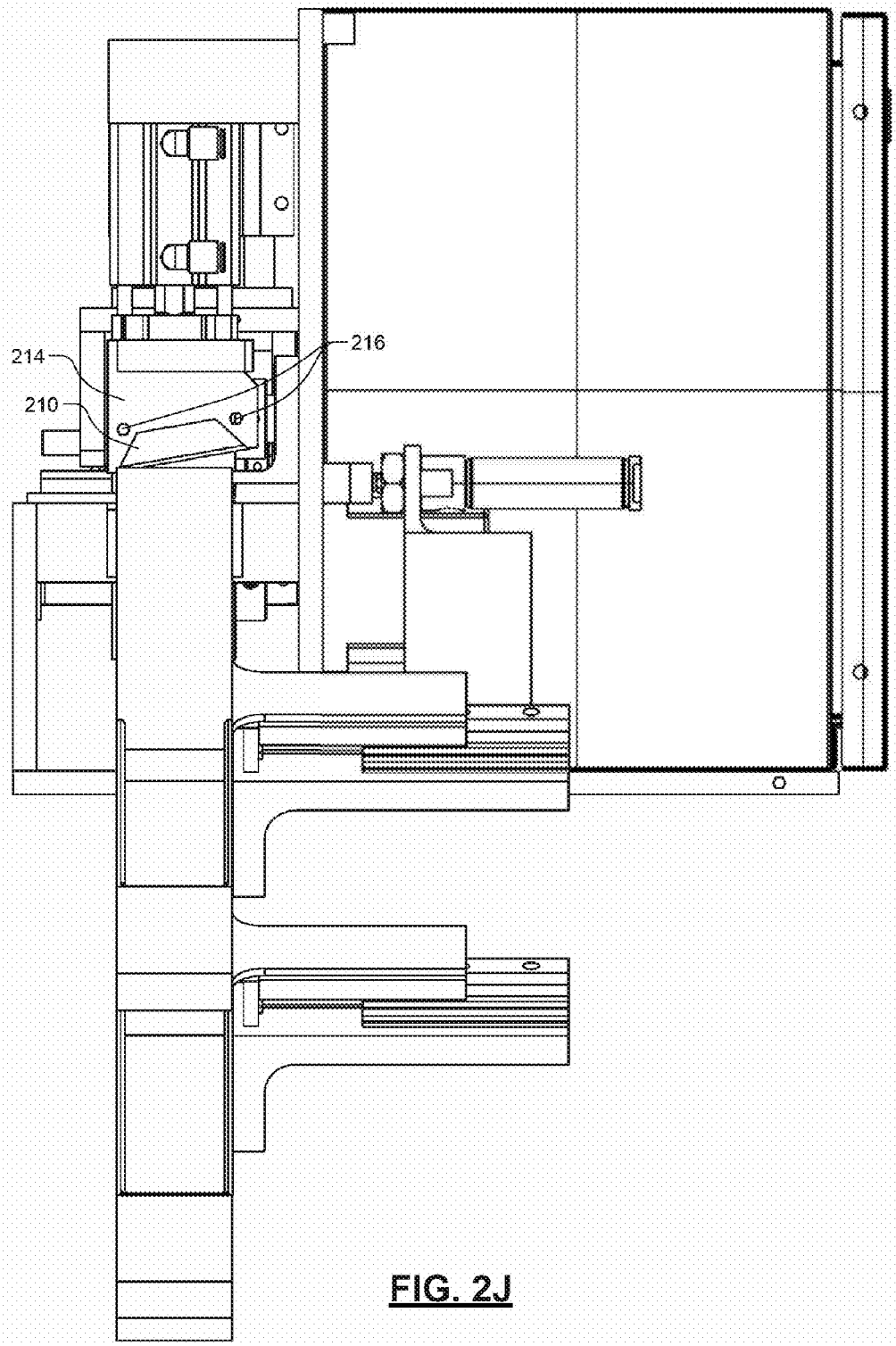
FIG. 2J is an end view of an example implementation of a cutting apparatus according to the principles of the present disclosure.

As shown in more detail with respect to FIG. 2J, the blade 210 may be positioned so that the cutting edge is not perpendicular to the direction of travel of the blade 210. This causes the edge of the blade 210 to meet the strip 102 at a single point, which maximizes the cutting force of the blade 210, similar to an angled guillotine. The blade 210 may be a standard trapezoidally shaped utility knife blade. The blade may be secured in a cartridge that is mounted to the cutting device 140 without using tools for quick replacement. For example only, the cartridge may be secured by thumbscrews.

A slit 212 may be located beneath the blade 210. The blade 210 can therefore travel past the bottom of the strip 102, insuring a complete cut. The slit 212 may be only slightly wider than the thickness of the blade 210, thereby providing support on either side of the blade 210. This prevents the strip 102 from being pressed through the slit 212 by the blade 210, especially as the blade 210 dulls.

A shoe 220 may hold down the cut piece of material as the blade 210 retracts. The cut piece of weight material then falls free of the cutting apparatus 106. The shoe 220 may not contact a cut piece of weight material that is very short. In various implementations, a transport system, such as a conveyor, may take the cut piece of weight material from the location of the cutting apparatus 106 to a location where the piece of weight material will be applied.

Locating the cutting apparatus 106 away from the application location may be necessary to accommodate space constraints. Alternatively, bins may be located adjacent to the cutting apparatus 106. For example only, first and second bins 240 and 242 may be provided. The first and second bins 240 and 242 may correspond to first and second pieces of weight material for a given wheel/tire assembly. Each wheel/tire assembly may have two locations for application of wheel weight.

The first piece of weight material will be retrieved from the first bin 240 and applied to the first location, while the second piece of weight material will be retrieved from the second bin 242 and applied to the second location. A light may be associated with each of the bins 240 and 242 and may be illuminated to indicate from which of the bins 240 and 242 a piece of weight material should be retrieved.

A first diverter 250 may direct a piece of cut weight material from the cutting apparatus 106 to the first bin 240. A first actuator 252 may move the diverter 250 to the side, thereby allowing a piece of cut weight material to fall to a second diverter 254, which then directs the cut weight material to the second bin 242. A second actuator 256 may move the second diverter 254 to the side. When both the first and second diverters 250 and 254 are moved to the side, the cut piece of weight material may fall into a discard bin.

For example, as described in more detail below, when a spliced section of the strip 102 is detected, the spliced section may be cut and discarded. In addition, pieces used for calibration and pieces at the beginning or end of a supply of weight material may be discarded. For example only, the first and second actuators 252 and 256 may be electrically powered or may be actuated by air pressure. A suction system may be used to remove the discarded pieces of weight material. The suction system may also dispose of the weight material backing when it is removed to apply the weight material to the wheel/tire assembly.

In various implementations, the backing material may be removed before the cut piece of weight material reaches the first diverter 250. For example, the backing material may be removed as the strip 102 passes the drive roller 130. In such a system, system components that will come into contact with the cut piece may be made from or coated with a nonstick coating. For example, the first and second diverters 250 and 254 and the first and second bins 240 and 242 may be plasma coated or coated with polytetrafluoroethylene (PTFE) or its equivalents.

The weight material may be applied by human operator or by a robot, with or without human assistance. A robotic application unit may be implemented in the system. The robotic application unit may retrieve the cut piece of weight material and apply the cut piece of weight material to an end effector. In various implementations, the robotic application unit may hold the piece of weight material with the end effector prior to the material being cut, eliminating the need to pick up the cut piece of weight material. The end effector may hold the material using any suitable system, including magnetic, vacuum, and/or mechanical gripping systems.

The robotic application unit then transports the piece of cut weight material to the wheel/tire assembly, where the end effector presses the piece of weight material against the appropriate spot on the wheel/tire assembly. In various implementations, a backing material with the weight material is removed by a second gripping apparatus. Alternatively, a vacuum may be used to remove the backing. The backing may be disposed of via a suction system.

Once the piece of weight material has been applied to the wheel/tire assembly, pressure may be applied across the length of the piece of weight material to wet out the piece of weight material. This pressure may be applied by the end effector or by a second end effector.

In order for an operator to accurately place a piece of weight material on a given position of a wheel/tire assembly, a witness mark may be added to the piece of weight material by the cutting apparatus 106. The witness mark can then be aligned with a corresponding witness mark on the wheel.

For example only, a scribe cylinder 260 may be used to scribe a mark on the side of the strip 102. To accomplish this, the stepper motor 190 may advance half of the desired length of the strip 102, at which point the scribe cylinder 260 makes a scribe mark on the strip 102. The stepper motor 190 then advances the remaining portion of the desired length of the strip 102. Once the cutting device 140 cuts the piece of weight material from the strip 102, the scribe mark is located in the middle of the resulting piece.

The scribe cylinder 260 may actuate a scribe head 262 that creates an indentation on the side of the strip 102. For example only, the scribe cylinder 260 may be controlled by air pressure. Sensors may detect whether the various components of the system are operating correctly. For example only, sensors may measure whether the scribe cylinder 260 is actuating fully and whether the cutting device 140 is actuating fully.

A control enclosure 270 may include electronics that control the stepper motor 190, and when present, the second stepper motor. The stepper motor 190 and the second stepper motor may both receive the same electrical signals to ensure that they operate in unison. The electronics may include one or more processors and circuitry that performs some or all of the functions shown in FIG. 3. The control enclosure 270 may also include pneumatic and/or hydraulic control devices, such as solenoids. These solenoids may be electrically controlled to provide air and/or hydraulic pressure at various times, such as to actuate the blade 210 and the scribe cylinder 260. An air regulator with moisture separator may assure a clean air supply for pneumatic components.

In various implementations, the control enclosure 270 may include electronics that control both the dispensing apparatus 104 and the cutting apparatus 106. The control enclosure 270 may be separate from, or separable from, the remainder of the cutting apparatus 106. One or more wired or wireless links may allow communication between the control enclosure 270 and the cutting apparatus 106. In addition, one or more wired or wireless links may allow communication between the control enclosure 270 and the dispensing apparatus 104. The control enclosure 270 may provide one or more power supplies to the cutting apparatus 106 and/or the dispensing apparatus 104.

Referring now to FIG. 2J, the blade 210 is secured in a cartridge 214 by set screws 216. The cartridge 214 may slide onto a track of the cutting device 140 and be secured by one or more thumbscrews (not shown).

Figure 3:
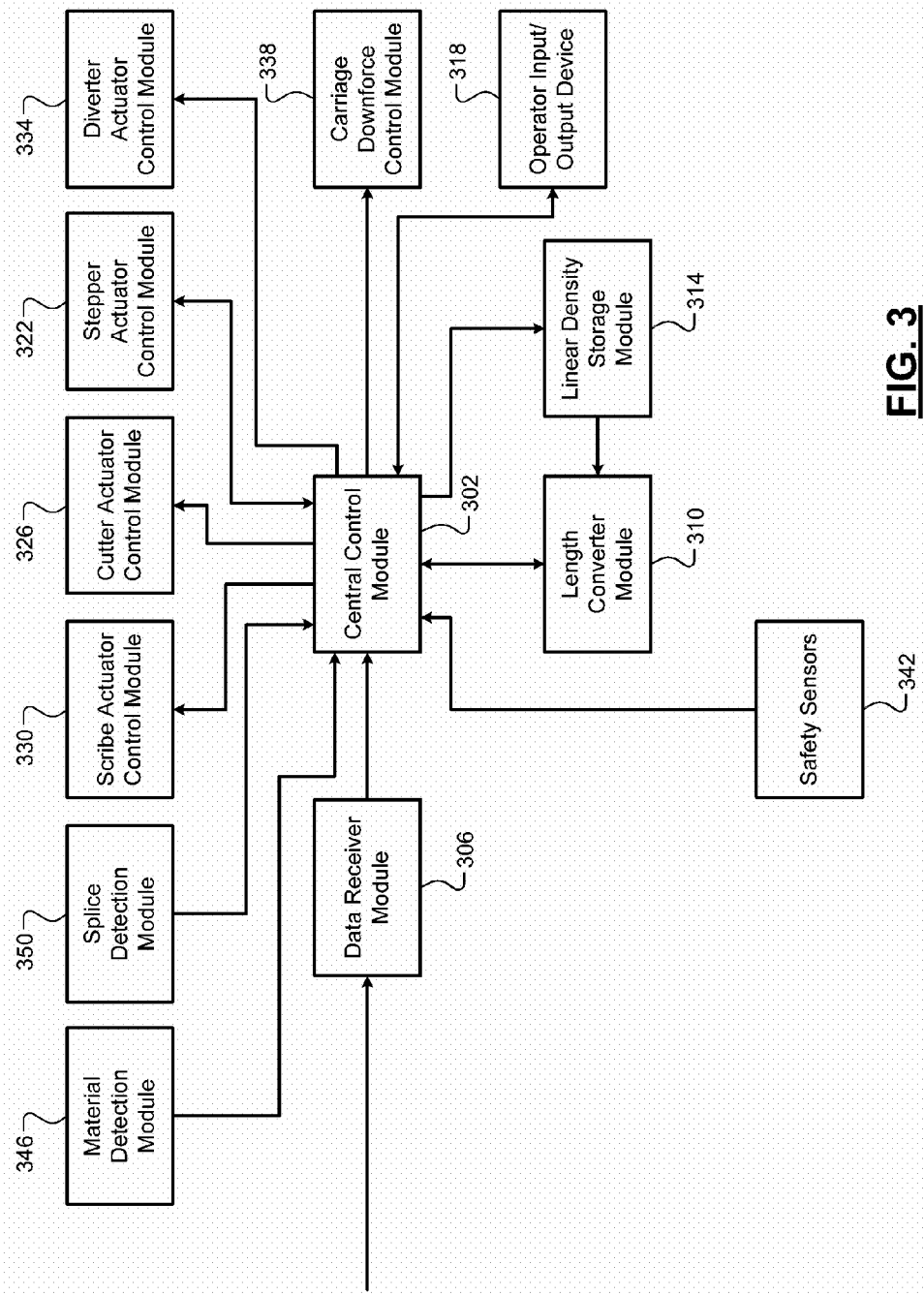
FIG. 3 is a functional block diagram of an example implementation of control electronics for the system according to the principles of the present disclosure.

Referring now to FIG. 3, a functional block diagram of an example control system of the control enclosure 270 is presented. A central control module 302 may receive weight data from a data receiver module 306. The data receiver module 306 may receive desired weight values from a balancing machine. For example only, the data receiver module 306 may receive data over a serial interface, a parallel interface, a factory control network, a local area network, or a direct electrical interface. For example only, supported communication protocols may include Ethernet, Datahighway Plus (DH+), controller area network (CAN), and DeviceNet. In various implementations, while the data receiver module 306 receives the desired weight values from the balancing machine, the desired weight values are transferred via another apparatus, such as a conveyor system, an upper-level system, a plant management system, and a data tracking system.

In various implementations, the data receiver module 306 may have a conversion front end (not shown) and a reference interface, such as RS-232. The conversion front end converts an incoming interface to the reference interface. In this way, the conversion front end can be replaced when a new external interface is used, while retaining RS-232 for internal communication.

The data receiver module 306 may receive two weight values for each wheel/tire assembly. The central control module 302 provides weight values to a length converter module 310, which converts the weight values into length values. This conversion is based on the linear density of the weight material, a value that may be stored in a linear density storage module 314.

The central control module 302 may provide a linear density value to the linear density storage module 314. Alternatively, the linear density storage module 314 may be preprogrammed with values of linear density for various available weight materials. The central control module 302 may then indicate to the linear density storage module 314 which material is being used.

In various implementations, the weight to length conversion may be performed by dividing the desired weight by the linear density of the weight material in use. The central control module 302 may communicate with an operator input/output device 318. The operator input/output device 318 may provide sensory feedback to an operator and/or may receive input from the operator.

For example only, the operator input/output device 318 may allow for the operator to supply the linear density of the weight material being used. Alternatively, the operator may indicate which weight material is being used, and the central control module 302 will select the corresponding linear density in the linear density storage module 314.

In other implementations, the operator input/output device 318 may offer the operator a selection of linear densities, from which the operator selects the correct linear density. In various implementations, various sensors may be present to determine the material's linear density. For example only, a calibration scale may be implemented. The central control module 302 may cause a predetermined length of material to be cut. The weight of this length of material, as measured by a calibration scale, and the requested length can be used to calculate linear density.

Alternatively, the calibration scale may be used to verify accuracy of the system. If the linear density as calculated based on the weight measured by the calibration scale does not match the expected density, the scale may be out of calibration, the material may be different than expected, and/or length errors may be present. This calibration process may also be manually initiated via the operator input/output device 318.

In various implementations, the central control module 302 may determine linear density of the weight material based on the cross-sectional profile of the weight material. The central control module 302 may include one or more sensors that determine the cross-sectional profile of the weight material. Based on these sensors, the central control module 302 can select or calculate the linear density of the weight material. In various implementations, the volumetric density of the weight material may remain approximately constant. The linear density can thereby be calculated from the volumetric density based on the cross-sectional area of the weight material.

Once the central control module 302 has determined a desired length to which to cut the weight material, the central control module 302 provides this length to a stepper actuator control module 322. The central control module 302 may convert the desired length into a number of steps for the stepper motor 190 and provide the length in units of steps.

The stepper actuator control module 322 then controls the stepper motor 190 to advance by the requested number of steps. Once the stepper actuator control module 322 has finished its movement, the stepper actuator control module 322 may transmit a completion signal to the central control module 302.

The central control module 302 may then request that a cutter actuator control module 326 actuate the cutting device 140. For example only, the cutter actuator control module 326 may energize a solenoid that allows air pressure to flow to the cutting device 140, thereby forcing the blade 210 through the weight material.

In various implementations, the central control module 302 may apply a scribe mark to the piece of weight material. Whether the scribe mark is applied, and to where the scribe mark is applied, may be determined by operator input from the operator input/output device 318. When a scribe mark will be added to the center of the piece, the central control module 302 may provide half the desired length to the stepper actuator control module 322.

After completion of this half length, the central control module 302 provides a signal to the scribe actuator control module 330. The scribe actuator control module 330 then actuates then actuates the scribe cylinder 260 to create the scribe mark. The central control module 302 then provides the remaining half length to the stepper actuator control module 322.

Once the stepper actuator control module 322 signals that the stepper motor 190 has advanced through the second half of the length, the central control module 302 then instructs the cutter actuator control module 326 to cut the weight material. The scribe mark will then be in the center of the cut piece.

The central control module 302 may provide commands to a diverter actuator control module 334. The diverter actuator control module 334 may direct cut pieces between different locations. For example only, the diverter actuator control module 334 may direct a cut piece between one or more bins and a discard bin. The diverter actuator control module 334 may also illuminate a light corresponding to the bin where the cut piece is located for retrieval by the operator.

The stepper motor 190 drives the drive roller 130. The downforce of the carriage 200 against the weight material determines the frictional force, which prevents the weight material from slipping against the drive roller 130. The central control module 302 may modulate the amount of downforce via a carriage downforce control module 338. In various implementations, the carriage downforce control module 338 may control hydraulic and/or air pressure pressing the carriage 200 against the idle roller 180.

The central control module 302 may receive inputs from one or more safety sensors 342. For example only, the safety sensors 342 may sense whether maintenance doors are open. The central control module 302 may halt operation of various components, such as the cutter actuator control module 326 and the scribe actuator control module 330, when any of the safety sensors 342 indicate that a maintenance door is open.

This prevents the operator from coming in contact with moving parts. Emergency stop switches (not shown) may be located at various locations on both the cutting apparatus 106 and the dispensing apparatus 104. The emergency stop switches also halt operation of various components. This prevents operator injury and equipment damage in event of a fault.

In various implementations, the stepper actuator control module 322 may still be active when maintenance doors are open. The stepper actuator control module 322 may control the stepper motor 190 to advance, thereby drawing in new weight material when a new roll is begun. The operator may signal via the operator input/output device 318 to the central control module 302 that a new piece of material is being loaded. The stepper actuator control module 322 may then begin advancing the stepper motor 190 to draw in the new weight material.

A material detection module 346 may detect whether weight material is present. For example only, the material detection module 346 may detect once the roll of weight material has been used up. In this way, the central control module 302 can stop operation and not inadvertently output the last piece, which may be too short due to the weight material running out.

In addition, the central control module 302 will halt actuating the scribe cylinder 260 and the cutting device 140 when no weight material is present. When loading new material, the material detection module 346 may detect that the new weight material is present. The central control module 302 may then direct the stepper actuator control module 322 to advance the stepper motor 190 to draw the material into the cutting apparatus 106. The material detection module 346 may use various types of sensors. For example only, the material detection module 346 may interface with a photoelectric sensor, a mechanical sensor, an infrared sensor, and/or an ultrasonic sensor.

A splice detection module 350 may detect splices in the weight material. When one roll of weight material ends, a new roll of weight material can be spliced to the end of the old roll. In this way, operation is continuous, without having to feed a new roll of weight material. However, the splice itself may not be desirable for placing on a wheel/tire assembly.

Therefore, when the splice detection module 350 detects a splice, the central control module 302 may advance the length of the splice, cut the splice, and instruct the diverter actuator control module 334 to discard the material surrounding the splice. After a splice, a predetermined length of the new weight material may be cut and weighed to determine the linear density of the new weight material.

Splices may be created with adhesives that have different material properties than the surrounding weight material. For example only, the splicing material may be adhesive tape. The adhesive tape may have a higher optical reflectivity than the surrounding weight material. This change in optical reflectivity may be sensed by the splice detection module 350 as a splice.

In another example, electrical properties of the adhesive tape, such as magnetic permeability, may be different than the surrounding weight material. Alternatively, the splicing material may not be detectable by itself; additional material is added to allow for detection. For example only, the splicing tape may be undetectable, so reflective tape is applied over the splice.

The operator input/output device 318 may allow the operator to repeat the previous cut. For example, this feature may be used when a piece of weight material is dropped or misplaced. The operator input/output device 318 may also allow an operator to manually cut a piece of weight material to a given length or having a given weight. This may be useful when integrating with balancing machines that do not output weights in a digital format.

When integrating a system according to the present disclosure with prior art lead balancing stations, a large number of bins may be present, each having a different size of lead weight. The operator input/output device 318 may allow the operator to cut a predetermined number of pieces of a certain weight to replace the lead weights in one bin with cut pieces of the continuous weight material.

The operator input/output device 318 may allow the user to enter an upper limit and a lower limit, to define a range of weights, as well as an increment. The central control module 302 can then cut a predetermined number of pieces of each increment of weight, from the lower limit to the upper limit. In various implementations, control may pause between each increment, so the cut pieces can be removed from a collection bin and placed in the correct bin previously occupied by the lead weights. The operator can then signal via the operator input/output device 318 to begin cutting the next increment.

In various implementations, the operator input/output device 318 may be separate from, or separable from, the control enclosure 270. The control enclosure 270 may be separate from the cutting apparatus 106, the dispensing apparatus 104, and the operator input/output device 318. The control enclosure 270 may then be placed at any convenient location. Being separate, the operator input/output device 318 may be placed so as to best be accessible to the operator. By separating components, shipping, packaging, service, and replacement may be made easier and more cost-effective.

Referring now to FIG. 4A-4D, various views of an example implementation of the dispensing apparatus 104 are presented. Weight material may be purchased and stored on the spool 110. The spool 110 is loaded into the dispensing apparatus 104 by opening first and second doors 408 and 412. The first and second doors 408 and 412 protect the operator from moving parts and may prevent debris from entering the dispensing apparatus 104.

The spool 110 has first and second ends 414 and 416 whose diameters are larger than the diameter of a center portion 418 of the spool 110. The first and second ends 414 and 416 ride on first and second axles 420 and 422. Each of the axles 420 and 422 may have a flanged roller, which correspond to the first and second ends 414 and 416. The flange of the flanged rollers prevents the spool 110 from moving in an axial direction along the axles 420 and 422.

In various implementations, a second spool (not shown) may be stored in the dispensing apparatus 104. The second spool may be located directed above the spool 110. The second spool may be stored in the dispensing apparatus 104 simply to be located conveniently. However, in various implementations, the dispensing apparatus 104 may include machinery that, once the spool 110 is removed, guides the second spool into the previous location of the spool 110. In fact, the dispensing apparatus 104 may include automated machinery that automatically (or upon actuation of a button or other operator input) replaces the spool 110 with the second spool.

As shown in FIGS. 4C-4D, the first and second axles 420 and 422 may be coupled via a chain or a belt. This causes the first and second axles 420 and 422 to rotate together. The first and second axles 420 and 422 may be driven by a motor 430 via another belt or chain. The motor 430 turns the first and second axles 420 and 422 in order to dispense more weight material from the spool 110.

Weight material from the spool 110 passes through first, second, and third rollers 440, 442, and 444. The weight material then passes through a splicing apparatus 450, which will be described in more detail below. In various implementations, the splicing apparatus 450 may be located in another position, such as on the exterior of the dispensing apparatus 104. The splicing apparatus 450 may be portable, and may be handheld—when not in use, the splicing apparatus 450 may then be temporarily affixed to the dispensing apparatus 104. The weight material then passes over a pulley 460. The pulley 460 is driven by a motor 464. The motor 464 turns the pulley 460 to provide the loop 120 of weight material.

The size of the loop 120 may be determined by operating requirements of the system and may be set to provide enough weight material so that a splice can be made while operation continues unabated using material from the loop 120. An idle roller 468 applies pressure to the weight material to keep the weight material from slipping against the pulley 460. Downforce is applied to the idle roller 468 by a downforce device 470. For example only, the downforce device 470 may include a spring. Alternatively, the downforce device 470 may be fixed in place, creating a fixed gap between the idle roller 468 and the pulley 460.

Figure 4A:
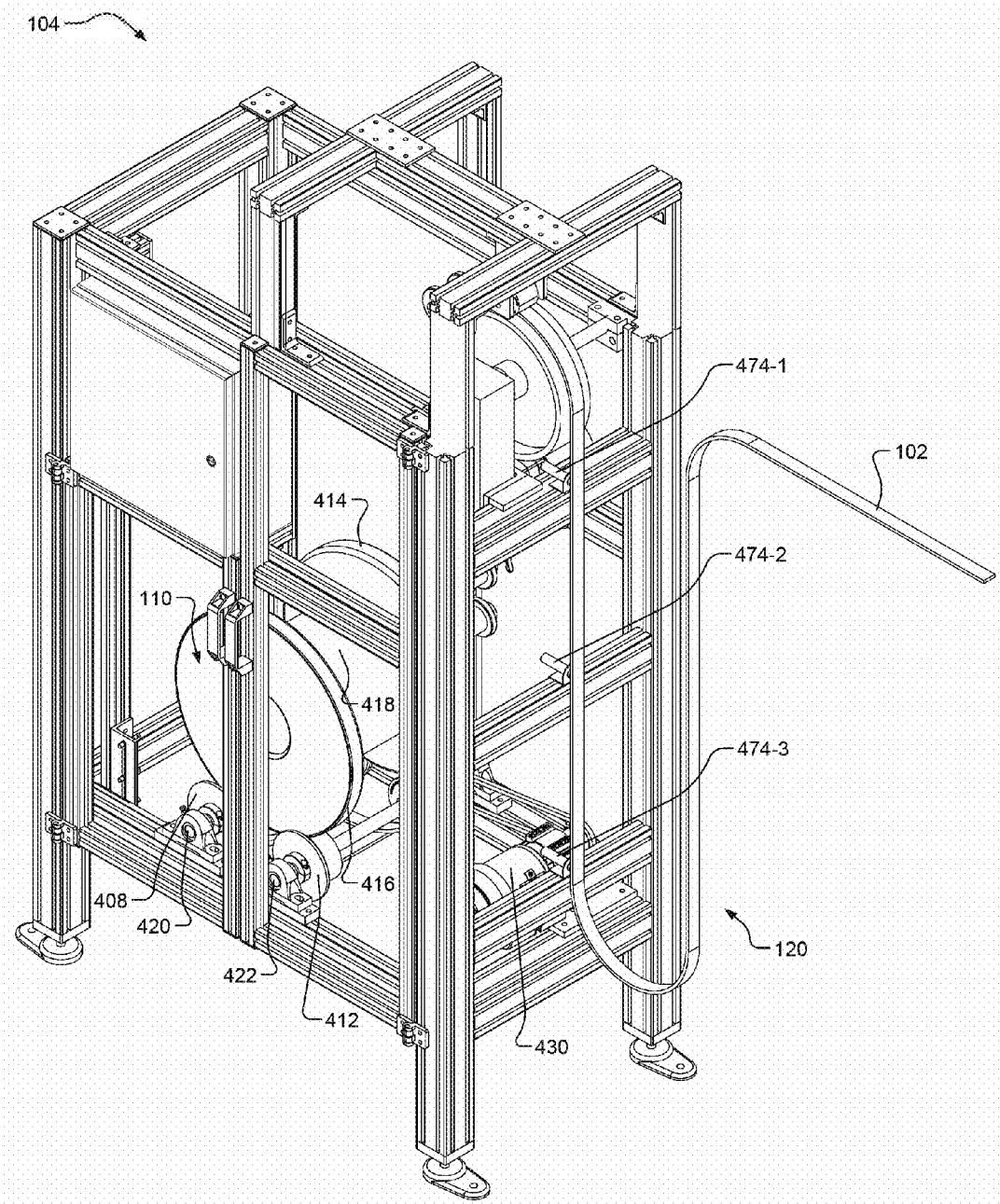
FIG. 4A is an isometric view of an example implementation of a dispensing apparatus according to the principles of the present disclosure.

The dispensing apparatus 104 may include one or more sensors to determine the length of the loop 120. For example, as shown in FIGS. 4A and 4B, the dispensing apparatus 104 may include sensors 474-1, 474-2, and 474-3. If the length of the loop 120 decreases below a predetermined distance, operation of the cutting apparatus 106 may be halted to prevent the weight material from being pulled taught and slipping in the cutting apparatus 106.

The motor 464 may drive the pulley 460 to establish a predetermined length of the loop 120. When splicing is being performed, the motor 464 may fix the position of the pulley 460 to keep the strip 102 from moving and allow precise splicing. When splicing, the trailing end of the previous roll of weight material may be centered in the splicing apparatus 450. The previous spool 110 can be removed and replaced with a new spool 110 containing a new roll of weight material.

The new weight material may be threaded through the rollers 440, 442, and 444 so that the leading end of the new weight material butts up against the trailing end of the previous roll of weight material. The two ends are then joined. For example only, a length of adhesive tape may be present at the splicing apparatus 450. In order to join the leading end of the new weight material to the trailing end of the previous weight material, the operator may apply the piece of tape to the ends and apply enough pressure to ensure adhesion.

In addition, splice indicia may be applied to the weight material. For example only, reflective tape may be applied to allow for detection of the splice. Alternatively, marks, paint, or other indicia may be applied to the weight material. Once the splice is completed, the motor 464 may drive the pulley 460 to reestablish the desired length of the loop 120. The dispensing apparatus 104 may be designed to isolate access to the splicing apparatus 450 from access to the spool 110. In this way, the splicing apparatus 450 can only be accessed once the spool 110 is loaded and associated safety doors are closed. Then, the splice can be performed without exposing the operator to the mechanics of the motor 430 and the first and second axles 420 and 422.

For example only, during normal operation (when not splicing), the motor 464 may drive the pulley 460 such that a bottom of the loop 120 remains between the sensors 474-1 and 474-2. In various implementations, the sensors 474-1, 474-2, and 474-3 may be photoelectric sensors. The sensors 474-1, 474-2, and 474-3 may be diffuse sensors, which include both a light emitter and a detector, eliminating the need for separate light emitters or detectors on an opposite side of the loop 120.

When a splice is desired, the motor 464 may drive the pulley 460 to lower the bottom of the loop 120 to the sensor 474-3. In various implementations, once the bottom of the loop 120 reaches the sensor 474-3, the motor 464 may drive the pulley 460 a predetermined further amount, to lower the bottom of the loop 120 a predetermined distance below the sensor 474-3.

Alternatively, for splicing, the motor 464 may drive the pulley 460 until a trailing end of the weight material is located at a predetermined location (such as the middle) of the splicing apparatus 450. However, even if the trailing end has not yet reached the predetermined location of the splicing apparatus 450, the motor 464 may halt movement of the pulley 460 once the bottom of the loop 120 reaches the sensor 474-3, or at a predetermined distance thereafter. Once the bottom of the loop rises above the sensor 474-3, the motor 464 may once again actuate the pulley 460 to attempt to bring the trailing end of the weight material to the predetermined location of the splicing apparatus 450. Once splicing is complete, the motor 464 may resume controlling the bottom of the loop 120 to be between the sensors 474-1 and 474-2.

The motor 430 drives the first and second axles 420 and 422 in order to provide slack material from the spool 110. In this way, the frictional force required between the weight material and the pulley 460 is reduced. The spool 110 may be installed in such a way that a bottom loop 480 is created below the spool 110. A dancer switch 484 detects the height of the bottom loop 480.

The dancer switch 484 includes a rod 488 arranged in a direction perpendicular to the plane of FIG. 4D. The rod rides along the inside of the bottom loop 480. The dancer switch 484 pivots about a pivot point 490. As the bottom loop 480 moves up, indicating less slack is available, the dancer switch 484 pivots about the pivot point 490. A sensor 494 across the pivot point 490 from the rod 488 detects this condition and instructs the motor 430 to rotate the first and second axles 420 and 422 to provide more slack material.

Referring now to FIG. 5, an isometric view of an example implementation of the splicing apparatus 450 is presented. First and second clamps 502 and 504 are mounted to a base plate 508. The first clamp 502 clamps the trailing end of the old weight material between a first shoe 510 and the base plate 508. The second clamp 504 clamps the leading end of the new roll of weight material between a second shoe 512 and the base plate 508. Adhesive tape (and, optionally, splice indicia, such as reflective tape) may be applied manually by an operator or by a mechanical apparatus. Once the splice has been accomplished, the first and second clamps 502 and 504 are released.

Figure 6:
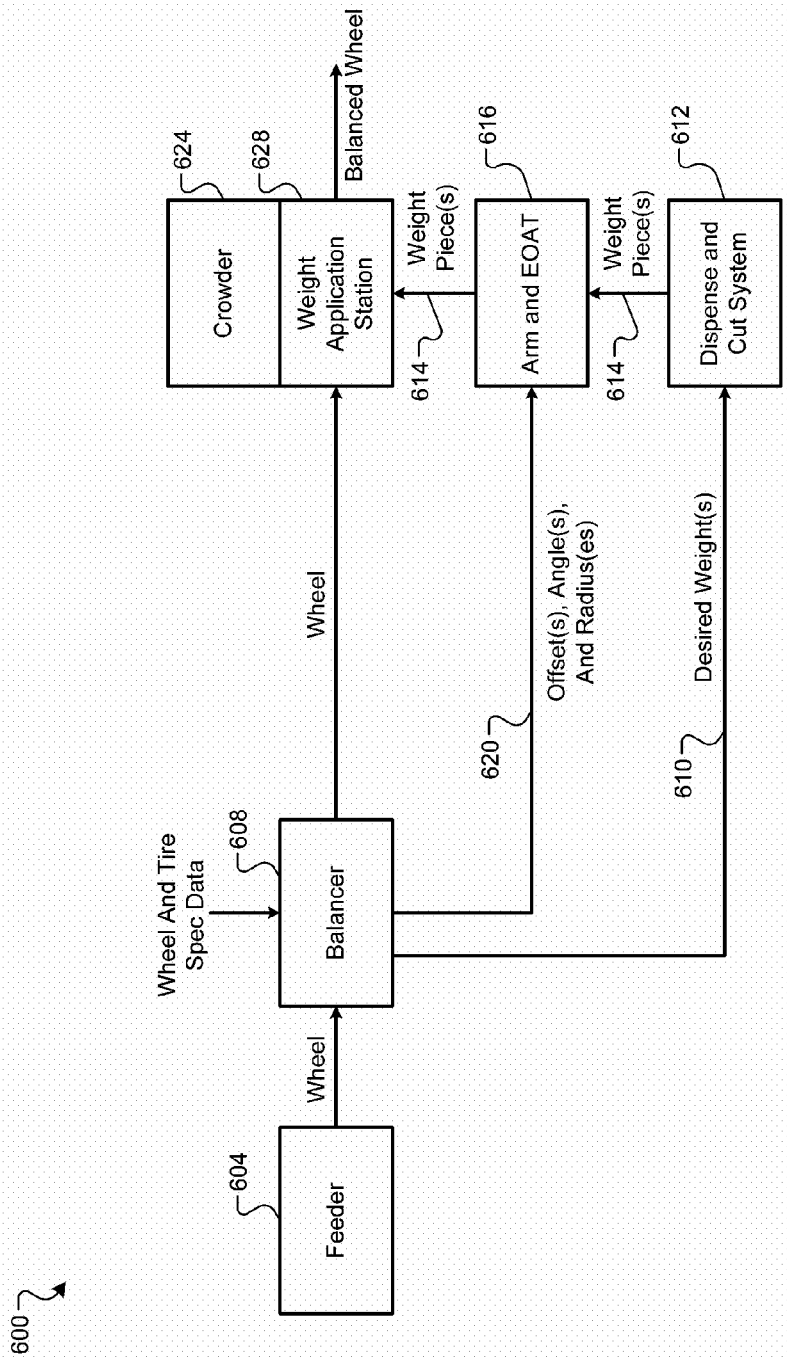
FIG. 6 is a block diagram of an example wheel balancing system according to the principles of the present disclosure.
Figure 7A:
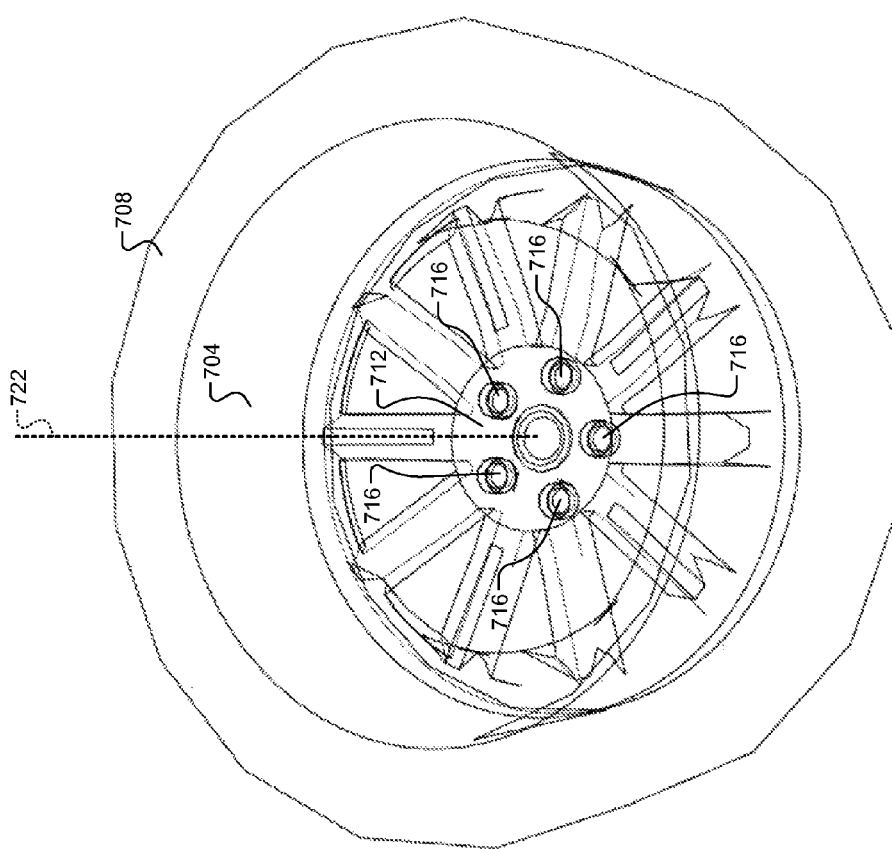
FIG. 7A is an example carside view of a wheel and tire according to the principles of the present disclosure.
Figure 7B:
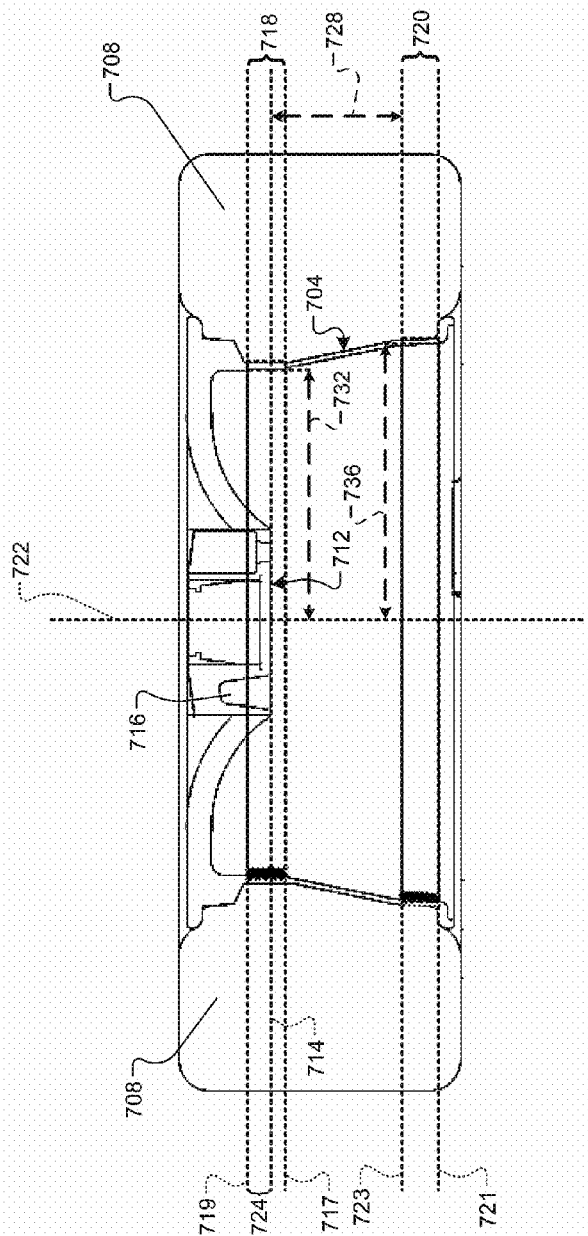
FIG. 7B is an example cross sectional view of the wheel and the tire according to the principles of the present disclosure.
Figure 9A:
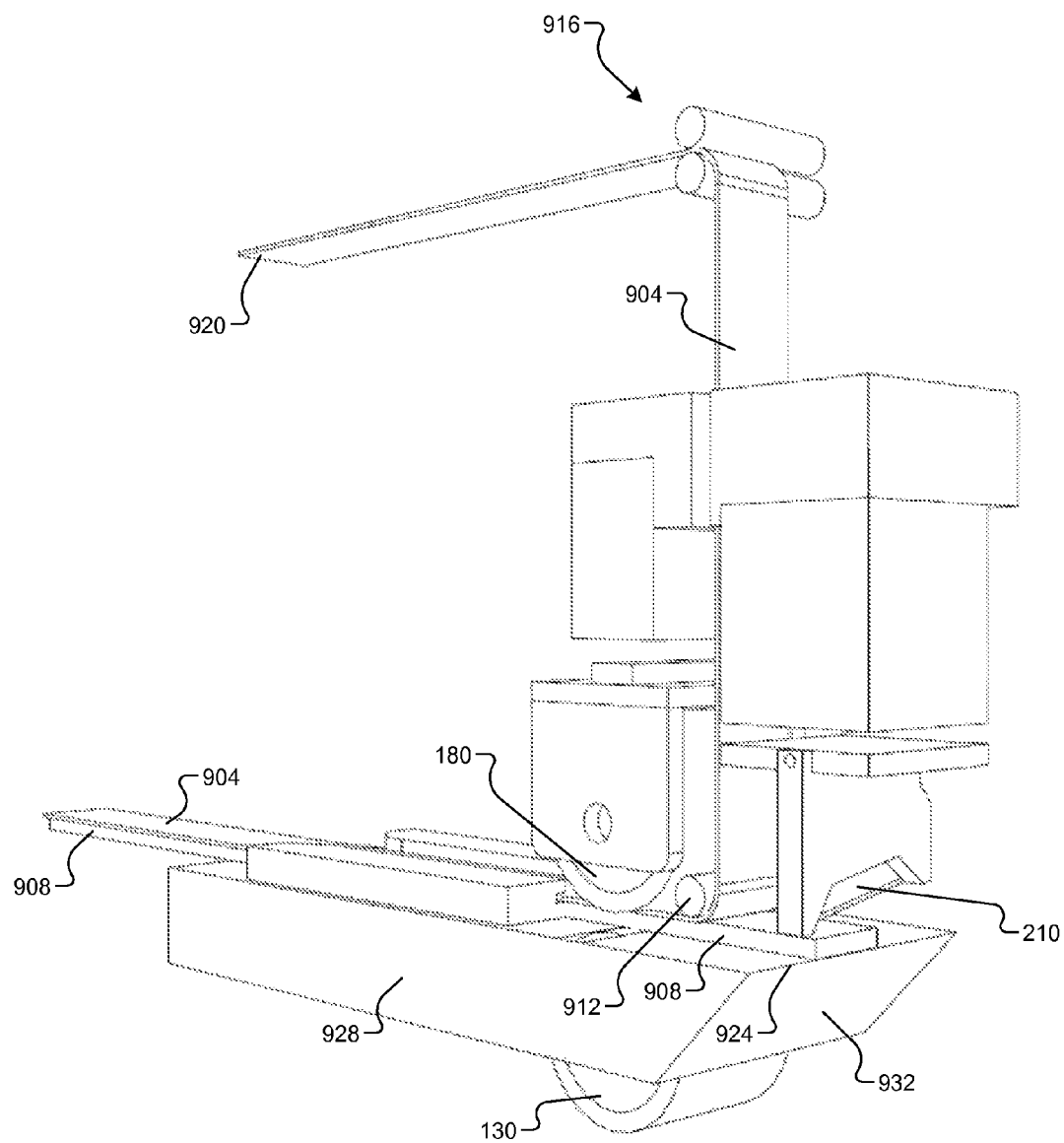
Figure 9B:
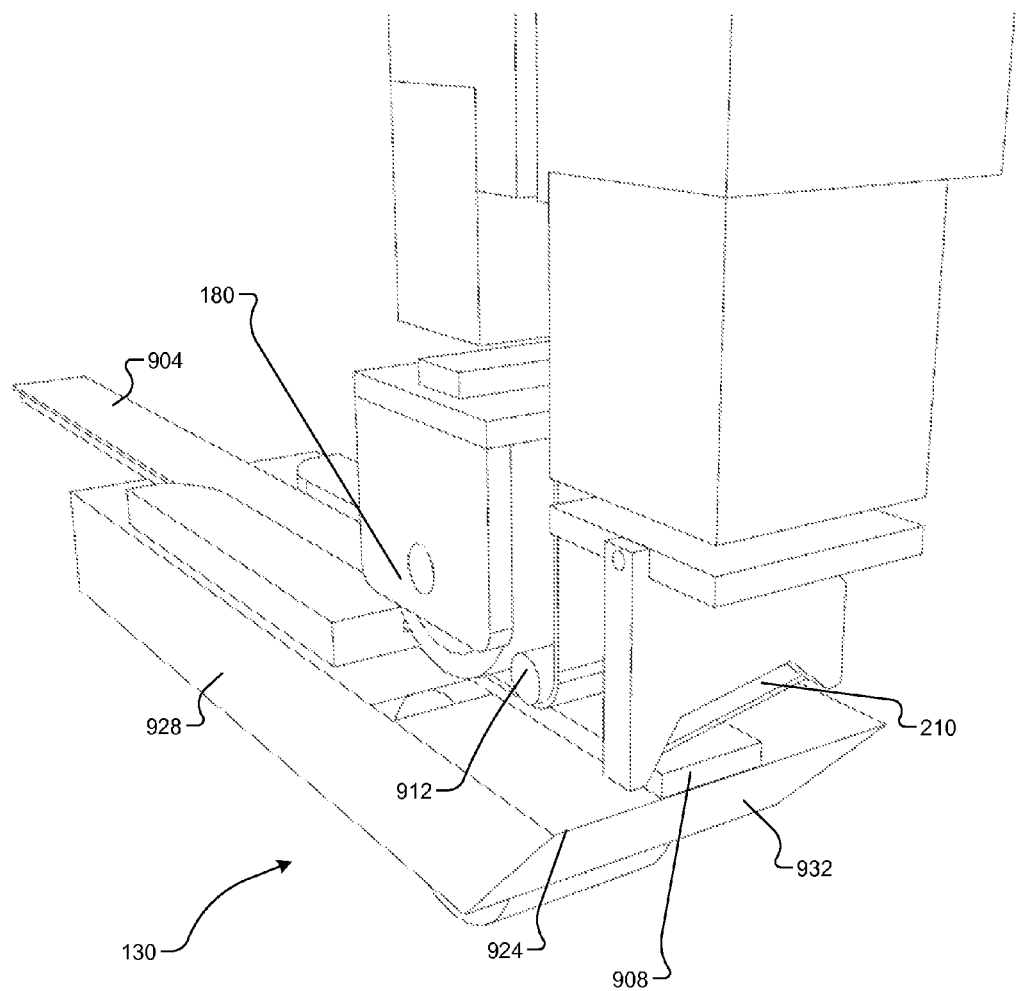
Figure 9C:
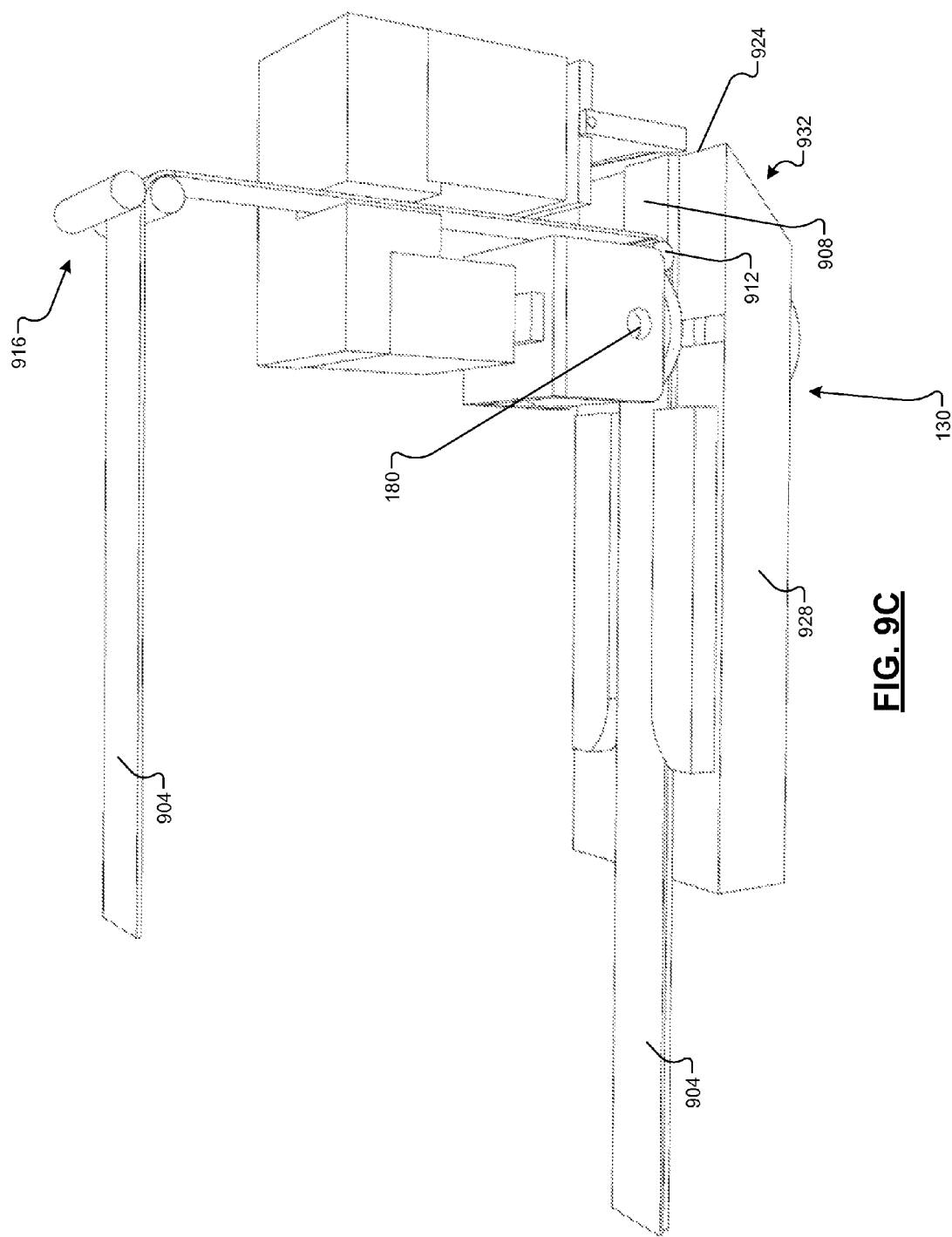

Referring now to FIG. 6, a block diagram of an example wheel balancing system 600 is presented. A feeder 604 provides a wheel to a balancer 608. For example only, the feeder 604 may include a conveyor system or another suitable system for providing the wheel to the balancer 608. FIGS. 7A and 7B include views of an example wheel 704 with a tire 708 mounted on the wheel 704. When the wheel 704 is mounted on a car, one side of the wheel will be facing in toward the middle of the car and the other side will be facing out away from the car. The side facing in is referred to here as the carside and the side facing out is referred to as the curbside.

FIG. 7A includes an example perspective view from the carside of the wheel 704 and the tire 708. FIG. 7B includes an axial, cross-sectional view of the wheel 704 and tire 708 with the carside of the wheel 704 down. Referring now to FIGS. 7A and 7B, the wheel 704 includes a mounting surface 712 where the wheel 704 mates with a rotating portion of a vehicle (e.g., a rotor or hub) if the wheel 704 is mounted to a vehicle. The mounting surface 712 may include one or more apertures 716 through which a mounting stud of the vehicle or a lug bolt may extend. A plane that is flush with the mounting surface 712 is referred to as a mounting plane 714.

The inner surface of wheel 704 may have one or more predetermined surfaces where the weight material can be attached to the wheel 704. For example only, the wheel 704 may include two predetermined surfaces, such as first and second predetermined surfaces 718 and 720, where the weight material can be attached to the inner surface of the wheel 704. The example of FIG. 7B shows pieces of weight material attached to the wheel 704 within the first and second predetermined surfaces 718 and 720.

Each of the predetermined surfaces can be thought of as defining a cylinder or a conical frustum. A conical frustum is a cone with the top sliced off parallel to the base, and can look like a tapered cylinder. Each of the predetermined surfaces can be referred to as a plane. For example only, the cylindrical or frustum shaped portion of the interior surface of the wheel 704 defined by the first predetermined surface 718 will hereafter be referred to as the midplane of the wheel 704. The cylindrical or frustum shaped portion of the interior surface of the wheel 704 defined by the second predetermined surface 720 will hereafter be referred to as the lowerplane of the wheel 704. The width of the strip 102 of the weight material may be selected such that the width of the strip 102 is less than or equal to the narrower one of the midplane 718 and the lowerplane 720. In various implementations, the width of the midplane 718 and the lowerplane 720 may be equal.

The midplane 718 and the lowerplane 720 are each defined by two parallel planes. For example only, the midplane 718 is defined by an inner (or carside) plane 717 and an outer (or curbside) plane 719. The lowerplane 720 may be defined by an inner plane 721 and an outer plane 723. A distance between the mounting plane 714 and an inner plane in a direction parallel to a rotational axis 722 of the wheel 704 can be referred to as the offset of the associated plane. For example only, a distance 724 between the mounting plane 714 and the inner plane 717 of the midplane 718 will be referred to as a first offset. A distance 728 between the mounting plane 714 and the inner plane 721 of the lowerplane 720 will be referred to as a second offset.

A radial distance between the axis 722 and an inner plane in a radial direction from the axis 722 will be referred to as a radius. For example only, a distance 732 between the axis 722 and the inner plane 717 of the midplane 718 will be referred to as a first radius. A distance 736 between the axis 722 and the inner plane 721 of the lowerplane 720 will be referred to as a second radius.

Referring back to FIG. 6, the balancer 608 spins the wheel in a predetermined manner to determine how to balance the wheel both side-to-side (i.e., curbside to carside) and rotationally. Based on predetermined characteristics of the wheel and measurements taken during the spinning, the balancer 608 generates balancing data for the wheel. The balancer 608 may also apply visual markers to the wheel where balancing weights should be applied.

For example only, the balancing data includes first and second desired weights 610. The first and second desired weights 610 indicate how much of the weight material to apply within the midplane and the lowerplane, respectively, of the wheel. A dispense and cut system (DCS) 612 determines a desired length of a first piece of the weight material based on the first desired weight. The DCS 612 also determines a desired length of a second piece of the weight material based on the second desired weight.

A robotic arm moves an end of arm tool (EOAT), collectively illustrated in FIG. 6 by 616, to receive the first and second pieces of the weight material 614 and may assist the DCS 612 in cutting the pieces 614 of the weight material. In various implementations, the robotic arm is capable of compound, multi-axial movement. The EOAT is attached to a distal end of the arm.

The balancing data also includes first and second angles, the first and second offsets, and the first and second radii (or radiuses) 620. The first angle indicates an angle, measured relative to a reference angle, at which a midpoint of the first piece of the weight material should be applied within the midplane. The second angle indicates an angle, measured relative to the reference angle, at which a midpoint of the second piece of the weight material should be applied within the lowerplane. For example only, the reference angle may be at a 12:00 position of the wheel, an angle at which the valve stem opening is present, or another suitable reference angle.

A crowder 624 centers the wheel about a reference axis. For example only, the crowder 624 may include a four-post crowding mechanism where the four posts are drawn towards the reference axis to center the wheel about the reference axis while minimizing rotation of the wheel. The first and second pieces of the weight material may be applied at a weight application station 628. In various implementations, the crowder 624 may be implemented separately from the weight application station 628. Once the wheel is centered by the crowder 624, the robotic arm and EOAT 616 selectively moves to apply the last cut ends of the first and second pieces of the weight material within the midplane and the lowerplane beginning at the first and second desired angles, respectively. In this manner, the wheel is balanced.

Referring now to FIGS. 8A and 8B, a side view 804 and a front view 808, respectively, of an example implementation of the arm with the EOAT 616, the weight application station 628, and the crowder 624 are presented. In various implementations, the wheel may be provided to a weight application station via a conveyer system 812 or in another suitable manner. For example only, the wheel may be provided to the weight application station with the carside of the wheel facing down on the conveyer. An opening 816 in the conveyer system 812 may be provided at the weight application station through which the arm and EOAT 616 may access the interior of the wheel from below the conveyer system 812. In various implementations, the wheel may be provided to the weight application station with the curb side of the wheel down on the conveyer system 812, and the arm and EOAT 616 may access the interior surfaces of the wheel from above.

FIGS. 9A-9D include various isometric views of an example implementation of the cutting apparatus 106 of the DCS 612. The cutting apparatus 106 of the present application may include a backing material removal system. FIGS. 9E-9H include various isometric views of an example implementation of a backing removal system 910. Referring to FIGS. 9A-9H, in various implementations, the strip may be provided to the cutting apparatus 106 with the backing 904 facing up and with the weight material 908 facing down. In this manner, the adhesive side of the strip faces up.

For example only, the backing material removal system 910 may include a removal roller 912 and a tensioner roller system 916. A leading edge 920 of the backing 904 may be peeled away from the weight material 908 (e.g., by an operator initially). The leading edge 920 of the backing 904 may be provided to a driven roller assembly 911 via an idle roller 913 and a weighted roller assembly 914.

A biasing mechanism 915 (e.g., a spring) biases a driven roller 917 of the driven roller assembly 911 toward an idle roller 918. The driven roller 917 holds the backing 904 in place when the driven roller 917 is not being driven. The driven roller 917 may be driven in tandem with the drive roller 130. In various implementations, the driven roller 917 may be driven independently of the drive roller 130.

For example only, the driven roller 917 may be driven when the weighted roller assembly 914 reaches a predetermined position as indicated by a position sensor assembly 919. In the example embodiment, the weighted roller assembly 914 is implemented in a key-hole arrangement where the weighted roller assembly 914 moves up and down within a guide 921. In various implementations, other types of arrangements may be used, such as an arrangement involving Thompson shafts, THK rails, or another suitable arrangement.

Because the driven roller 917 holds the backing 904 in place when the driven roller 917 is not being driven, the weighted roller assembly 914 may slide down the guide 921 toward the predetermined position as the weight material 908 is dispensed past the removal roller 912. The position sensor assembly 919 may include a position sensor and a stop. The position sensor monitors the position of the weighted roller assembly 914 within the guide 921.

When the position of the weighted roller assembly 914 reaches the predetermined position, the driven roller 917 may be driven. In various implementations, the driven roller 917 may be driven a predetermined amount (e.g., angle). The predetermined amount may be set to lift the weighted roller assembly 914 to a second predetermined position. In other implementations, the driven roller assembly 917 may be driven until the position sensor assembly 919 indicates that the weighted roller assembly 914 is in the second predetermined position. When the weighted roller assembly 914 is between the first and second predetermined positions, the weighted roller assembly 914 and the driven roller 917 maintain tension on the backing 904 such that the backing 904 is removed from the weight material 908 as the weight material 908 is dispensed past the removal roller 912. If rolls of the strip 102 are spliced together, the splice may splice the backing 904 so the backing material removal system will continue to remove the backing 904 even after a splice in the strip 102.

Referring now to FIGS. 10A-10G, various isometric views of the cutting apparatus 106 are shown. As stated above, the slit 212 may be implemented in the cutting apparatus 106 below the blade 210 in various implementations. For purposes of the present disclosure, however, the cutting apparatus 106 includes only a cutting apparatus edge 924 of a slit. A leading edge of the EOAT, as discussed further below, will provide a dispense edge of the slit. The blade 210 passes through this slit to cut the weight material.

A deck 928 of the cutting apparatus 106 may be tapered inward toward the drive roller 130 from the cutting apparatus edge 924 of the slit. The tapered face of the deck 928 is illustrated at 932. The tapered face 932 may enable the leading edge of the EOAT to be moved into a cutting position from behind the blade 210.

The cutting apparatus 106 includes an arm 1004 with an EOAT that is generally illustrated by 1008. The EOAT 1008 includes a first wet out tool 1012 and a second wet out tool 1016. The EOAT 1008 may also be referred to as an end effector. A wet out tool may also be referred to as a wet out shoe.

The first wet out tool 1012 includes a leading edge 1020 of an arc shaped face 1024 and a trailing edge 1028 of the arc shaped face 1024. The second wet out tool 1016 includes a leading edge 1032 of an arc shaped face 1036 and a trailing edge 1040 of the arc shaped face 1036.

When the EOAT 1008 is away from the cutting position, the cutting apparatus 106 may dispense a first piece 1044 of the weight material past the cutting apparatus edge 924 and the blade 210. In various implementations, the cutting apparatus 106 may dispense the first piece 1044 of the weight material past the cutting apparatus edge 924 while the first wet out tool 1012 is in the cutting position or in a final cutting position.

The first piece 1044 includes a previously cut end 1048. The weight material may curve in a downward direction, such as shown in the example illustration of FIG. 10A, when dispensed past the cutting apparatus edge 924. The downward curve may be attributable to, for example, gravity, a shape taken by the weight material from being stored on a roll, and/or one or more other forces.

Figure 10A:
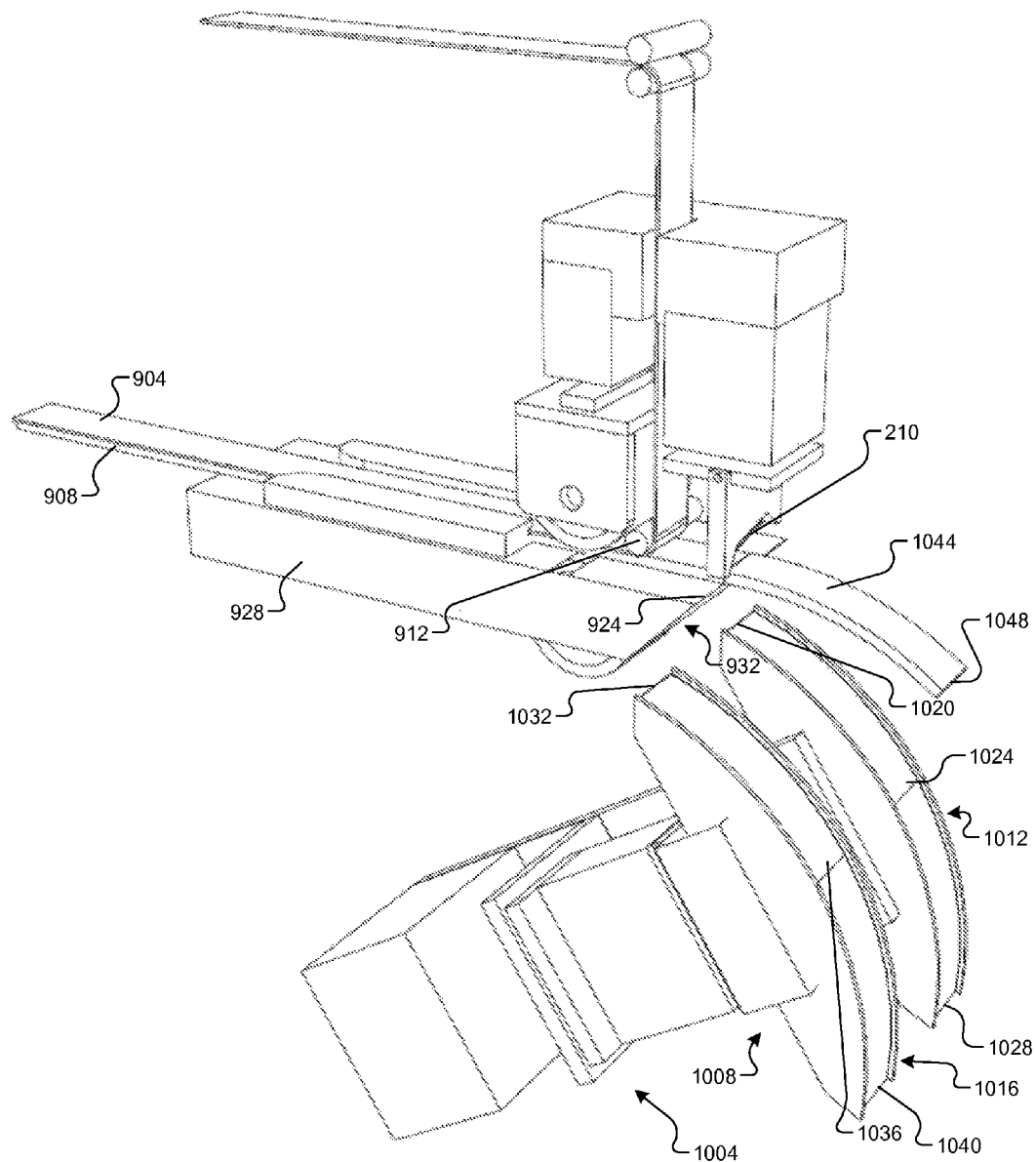
FIGS. 10A-10H are various isometric views of the cutting apparatus, the arm, and the EOAT according to the principles of the present disclosure.
Figure 10B:
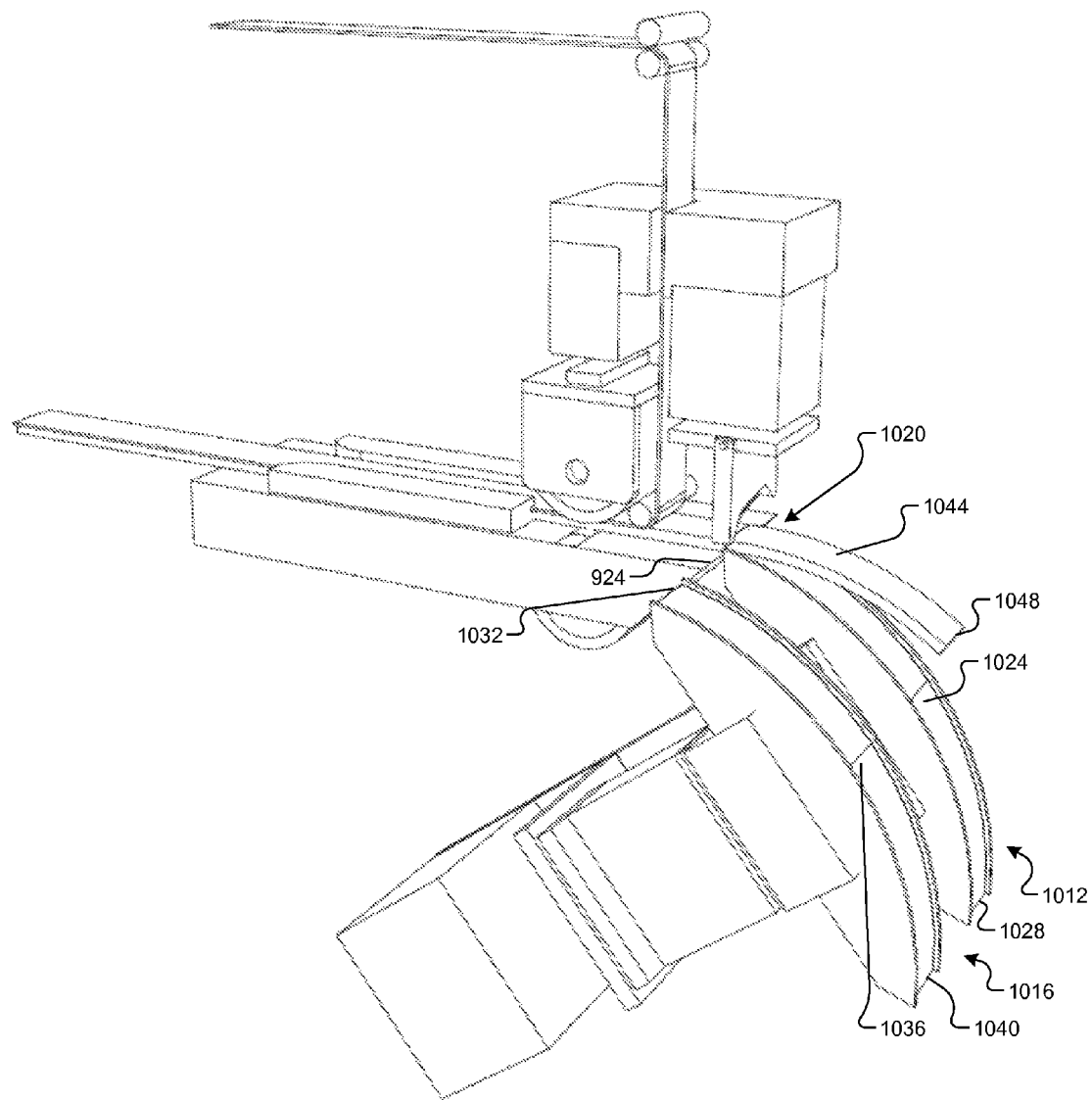

As shown in FIG. 10B, the leading edge 1020 of the first wet out tool 1012 may first be moved up to the cutting position. When in the cutting position, the slit is formed between the cutting apparatus edge 924 and the leading edge 1020 of the first wet out tool 1012. A wet out tool may be said to be in the cutting position when a distance between a leading edge of the wet out tool and the cutting apparatus edge 924 is approximately equal to a predetermined distance. The predetermined distance may be only slightly wider than the thickness of the blade 210 such that the leading edge of the wet out tool and the cutting apparatus edge 924 provide support on both sides of the blade 210. This prevents the weight material 908 from being pressed through the slit between the leading edge of the wet out tool and the cutting apparatus edge 924 by the blade 210, especially as the blade 210 dulls.

Figure 10C:
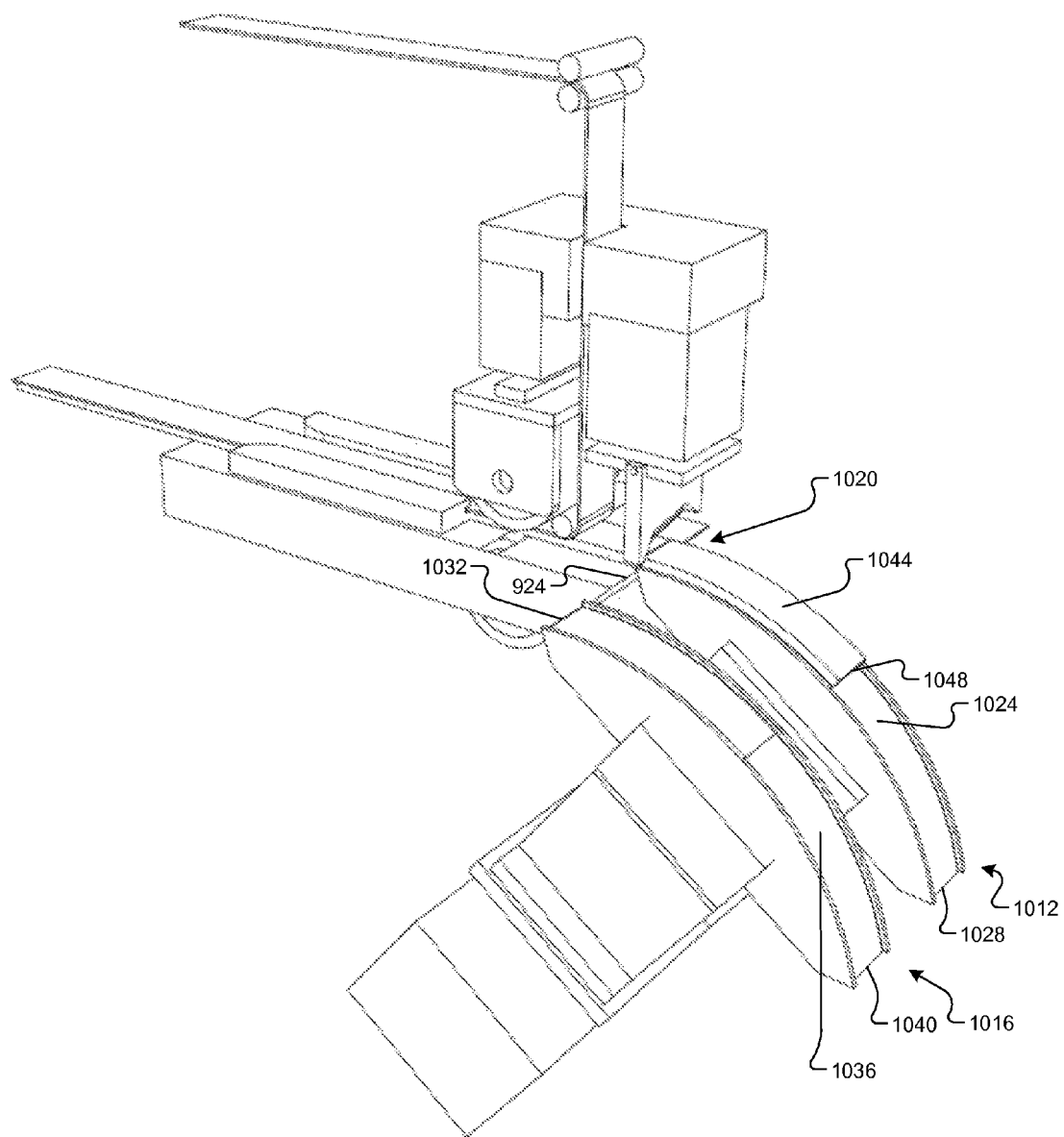

Once the leading edge 1020 of the first wet out tool 1012 is in the cutting position, the arm 1004 may be actuated to rotate the first wet out tool 1012 upward about the leading edge 1020 to a final cutting position. Rotating the first wet out tool 1012 upward about the leading edge 1020 of the first wet out tool 1012 while the first piece 1044 is dispensed may cause the first piece 1044 to lay flatly on the arc shaped face 1024 of the first wet out tool 1012. As stated above, in various implementations, the first piece 1044 may be dispensed after the first wet out tool 1012 is in the final cutting position. The first piece 1044 laying flatly on the arc shaped face 1024 of the first wet out tool 1012 when the first wet out tool 1012 is in the final cutting position is illustrated in FIG. 10C.

Once the first wet out tool 1012 reaches the final cutting position, an in position signal may be provided to the central control module 302 of the cutting apparatus 106. The central control module 302 may trigger cutting of the first piece 1044 via the cutter actuator control module 326 in response to receiving the in position signal. In this manner, first piece 1044 of the weight material having the desired weight is cut from the strip 102. A newly cut end 1052 of the first piece 1044 is created by the cutting of the first piece 1044 that is located approximately at the leading edge 1020 of the first wet out tool 1012.

Figure 10D:
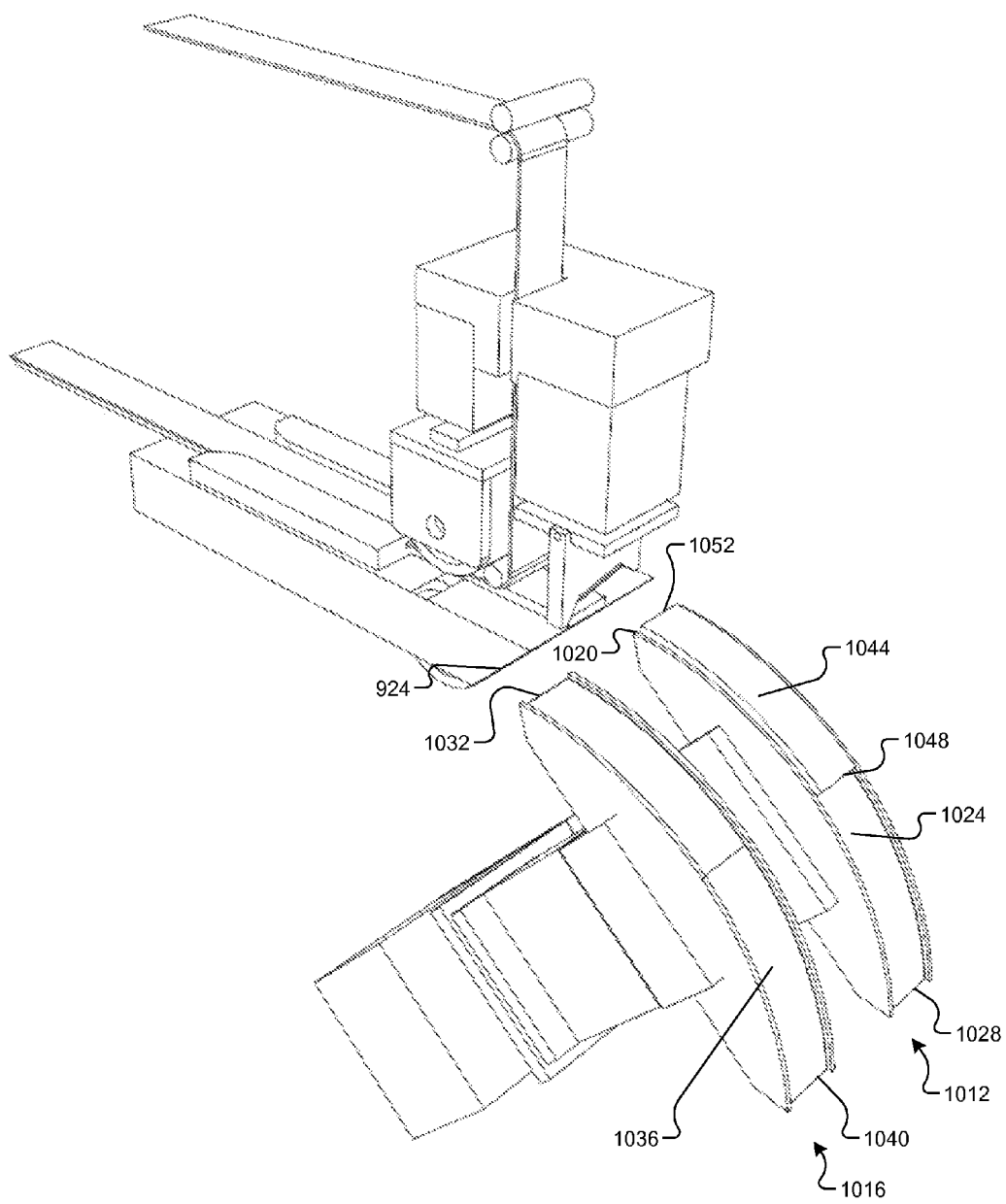

The EOAT 1008 can then be moved away from the final cutting position. For example only, the EOAT 1008 can be moved to position the leading edge 1032 of the second wet out tool 1016 underneath the cutting position. FIG. 10D includes an example illustration of the leading edge 1032 of the second wet out tool 1016 being positioned underneath the cutting position.

Figure 10E:
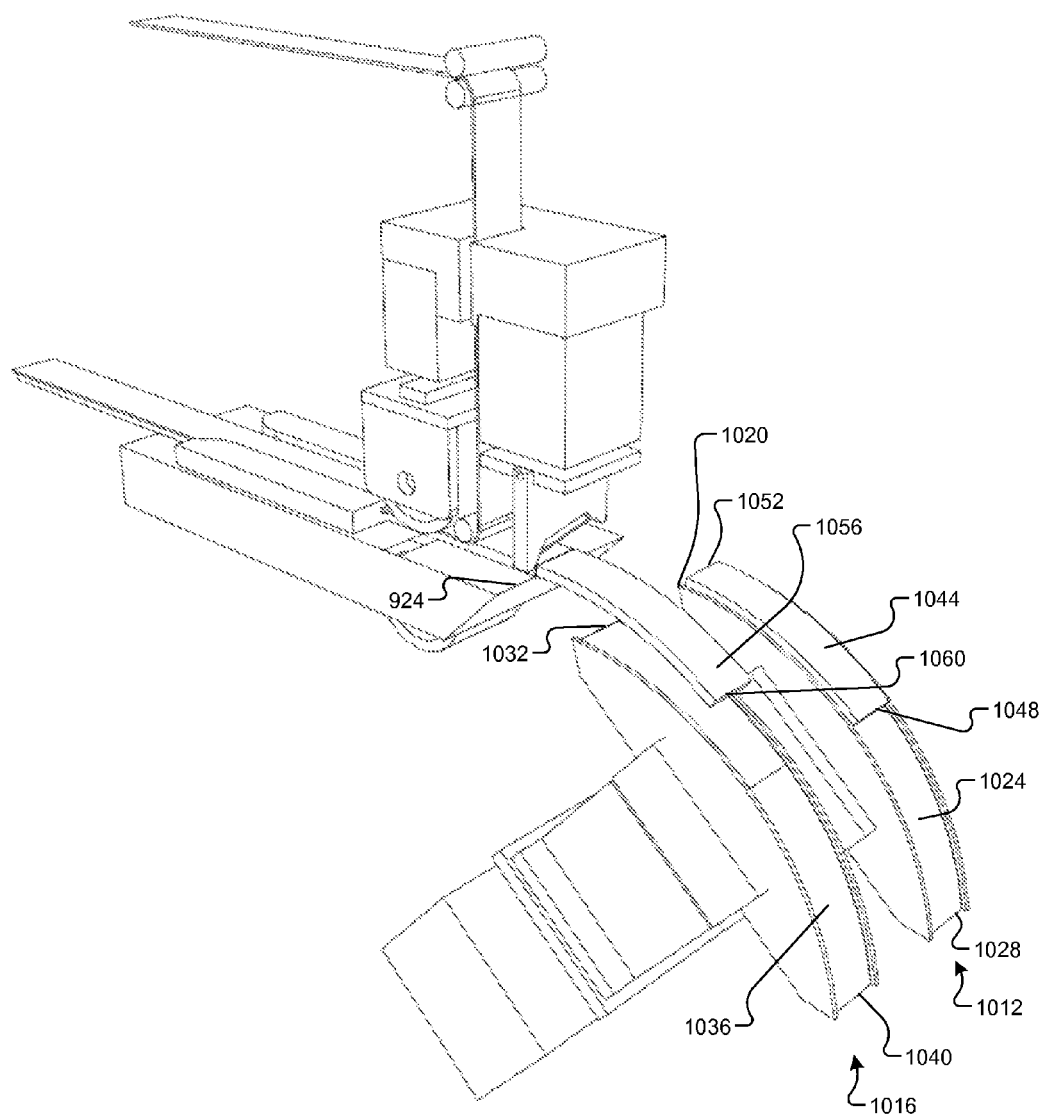

When the EOAT 1008 is away from the cutting position, a second piece 1056 of the weight material can be dispensed. Like the first piece 1044, as discussed above, the second piece 1056 can be dispensed once the second wet out tool 1016 is in the final cutting position. The second piece 1056 also includes a previously cut end 1060. The cutting of the first piece 1044 may create the previously cut end 1060 of the second piece 1056. FIG. 10E includes an example illustration of the second piece 1056 of the weight material dispensed.

Figure 10F:
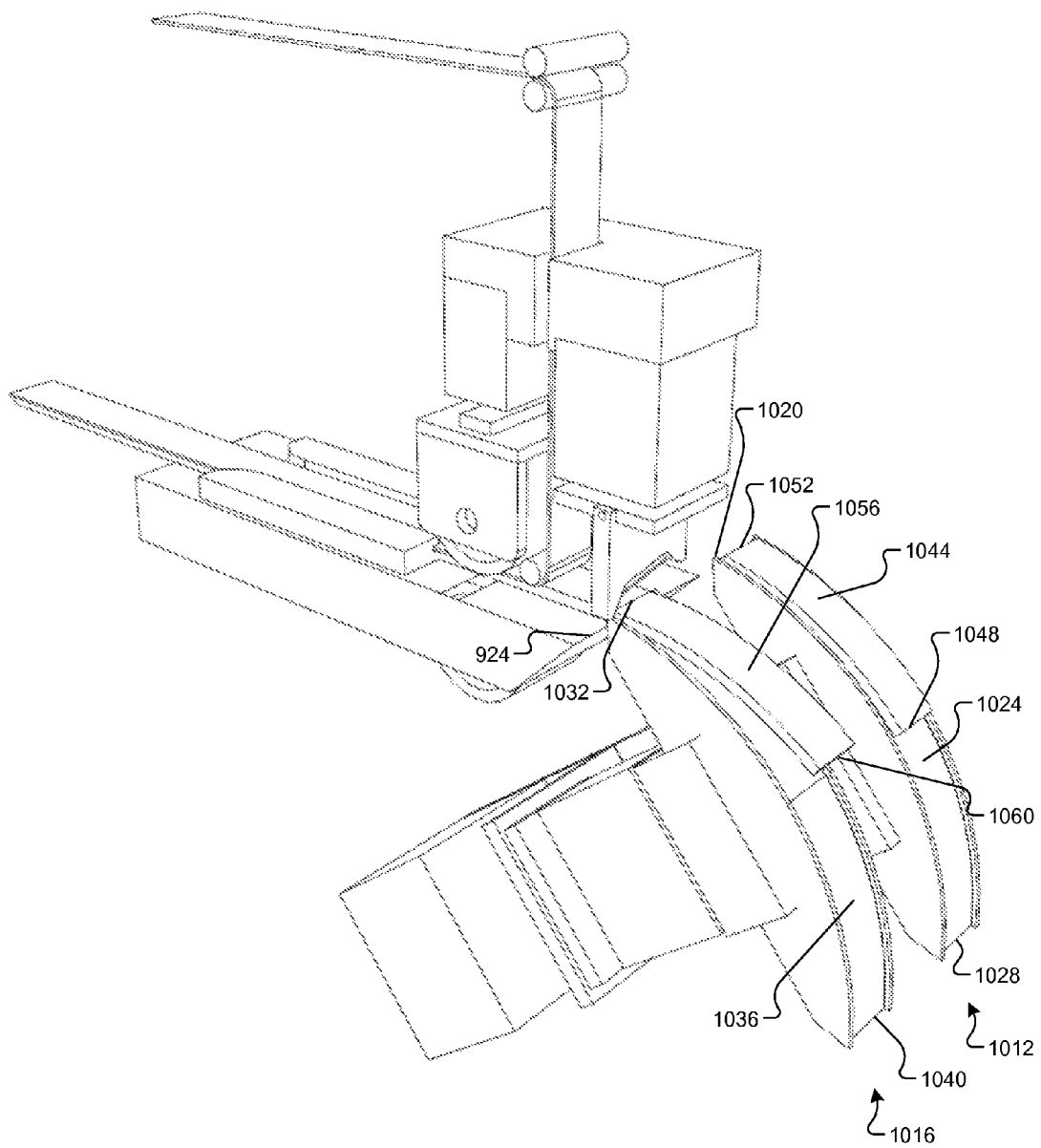
Figure 10G:
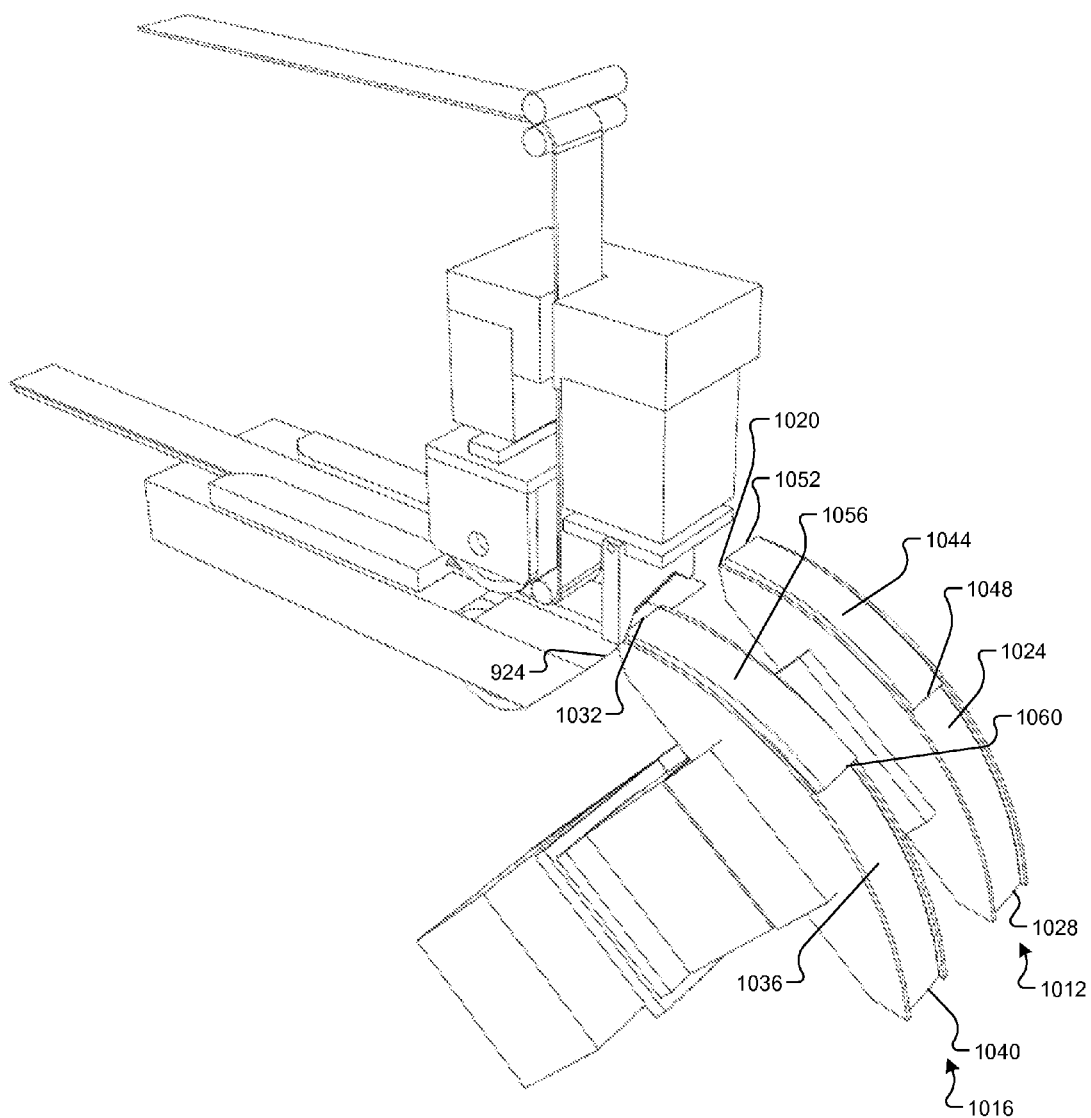

As shown in FIG. 10F, the leading edge 1032 of the second wet out tool 1016 may next be moved up to the cutting position. When in the cutting position, the slit is formed between the cutting apparatus edge 924 and the leading edge 1032 of the second wet out tool 1016. Once the leading edge 1032 of the second wet out tool 1016 is in the cutting position, the arm 1004 may be actuated to rotate the second wet out tool 1016 upward about the leading edge 1032 to the final cutting position. Rotating the second wet out tool 1016 upward about the leading edge 1032 of the second wet out tool 1016 while the second piece 1056 is dispensed may cause the second piece 1056 to lay flatly on the arc shaped face 1036 of the second wet out tool 1016. FIG. 10G illustrates the second piece 1056 laying flatly on the arc shaped face 1036 of the second wet out tool 1016 when the second wet out tool 1016 is in the final cutting position.

Figure 10H:
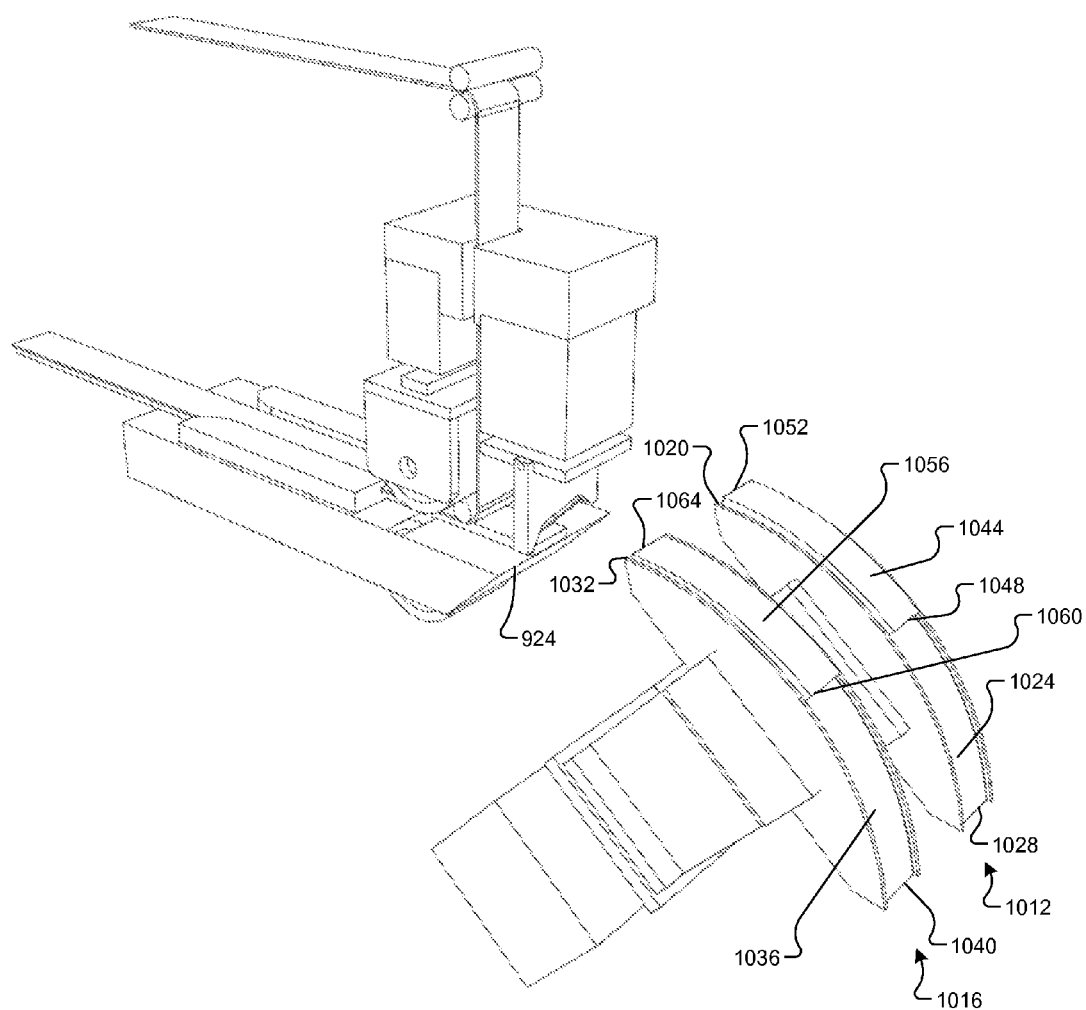

Once the second wet out tool 1016 reaches the final cutting position, a second in position signal may be provided to the central control module 302 of the cutting apparatus 106. The central control module 302 may trigger cutting of the second piece 1056 via the cutter actuator control module 326 in response to receiving the second in position signal. In this manner, the second piece 1056 of the weight material having the desired weight is cut from the strip 102. A newly cut end 1064 of the second piece 1056 is created by the cutting of the second piece 1056 that is located approximately at the leading edge 1032 of the second wet out tool 1016. The first and second pieces 1044 and 1056 can then be moved away from the cutting apparatus 106 via the EOAT 1008 for application to the wheel as shown in the example illustration of FIG. 10H.

Alternatively, the first and second wet out tools 1012 and 1016 may be moved to the final cutting positions prior to the weight material being dispensed onto the first and second wet out tools 1012 and 1016. In such implementations, FIGS. 10A, 10B, 10E, and 10F would not apply. This alternative approach can be used when the weight material is stiff enough that the weight material can be pushed onto the first and second wet out tools 1012 and 1016 without bunching up.

FIGS. 11A-11G include various example views of the first and second wet out tools 1012 and 1016. While the first wet out tool 1012 is shown and will be discussed in conjunction with FIGS. 11A-11C and 11G, the discussion may be applicable to the second wet out tool 1016. Further, while the second wet out tool 1016 is shown and will be discussed in conjunction with FIGS. 11D-11F, the discussion may be applicable to the first wet out tool 1012.

Figure 11A:
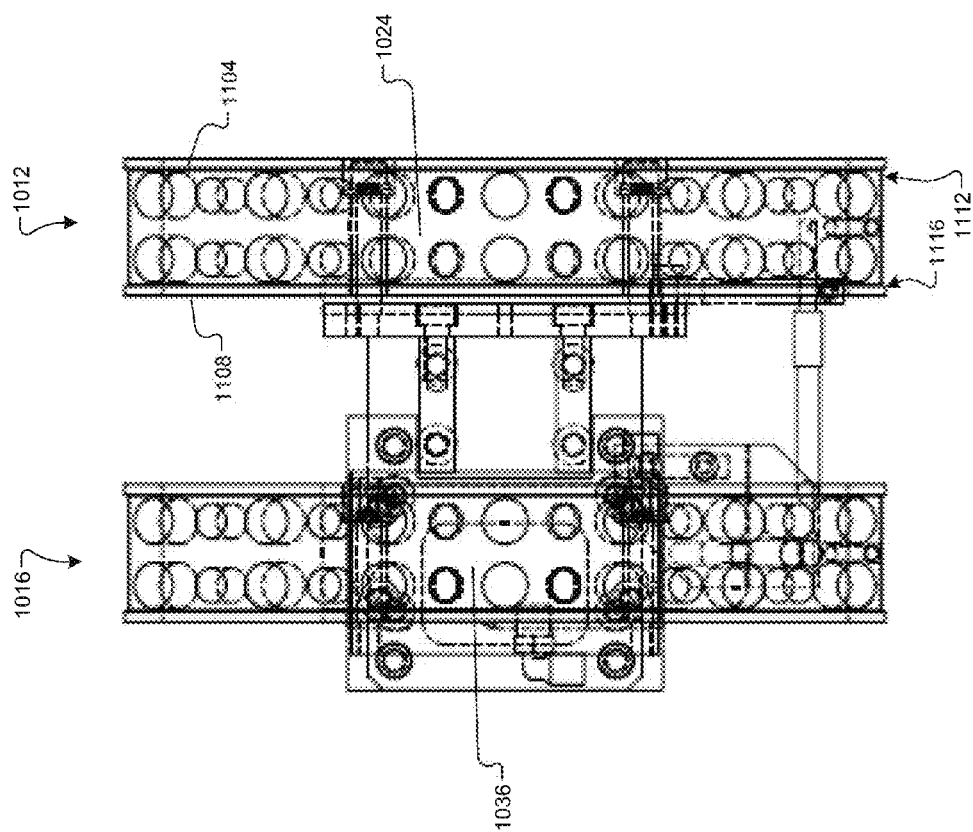
Figure 11B:
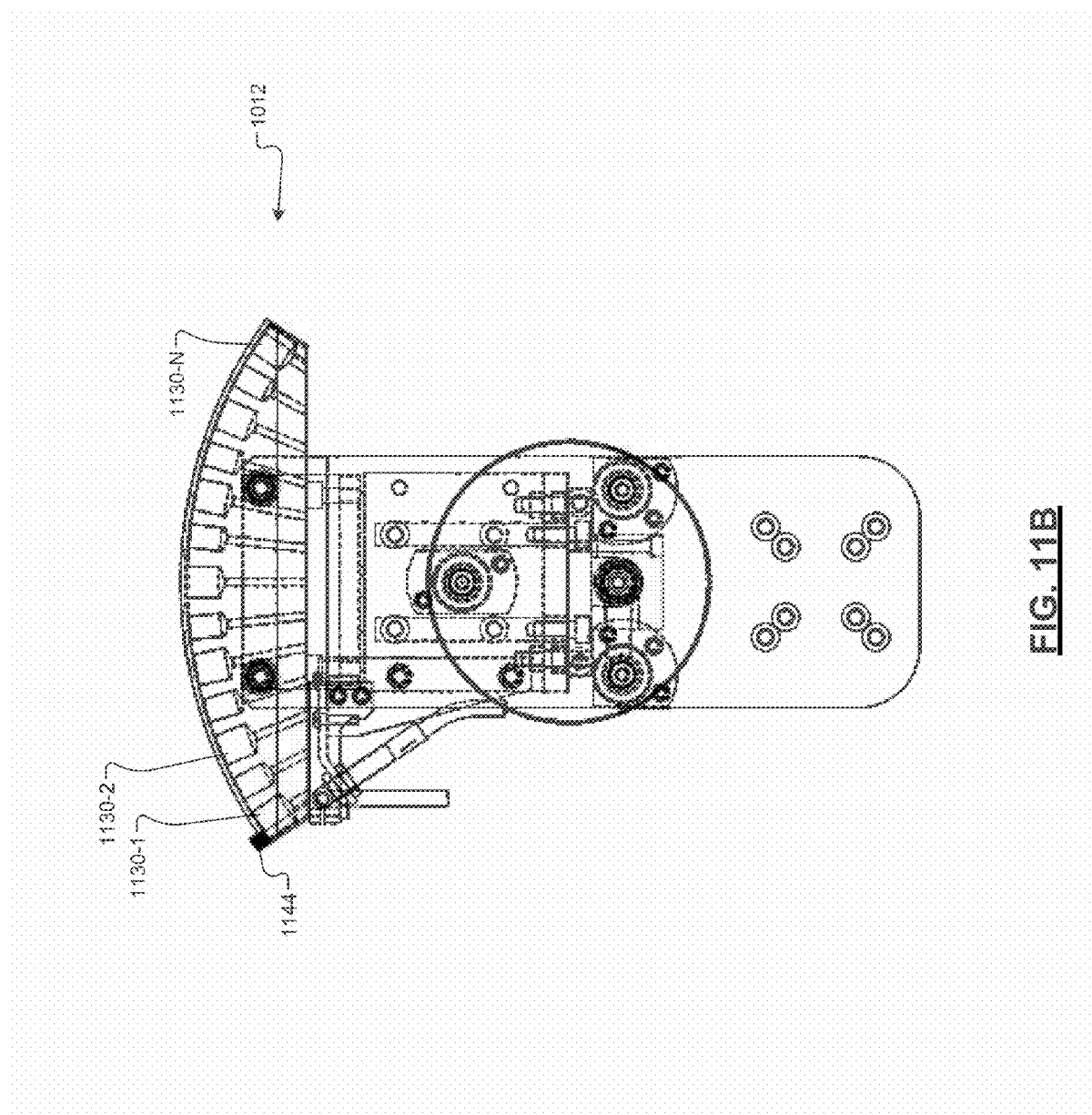
Figure 11C:
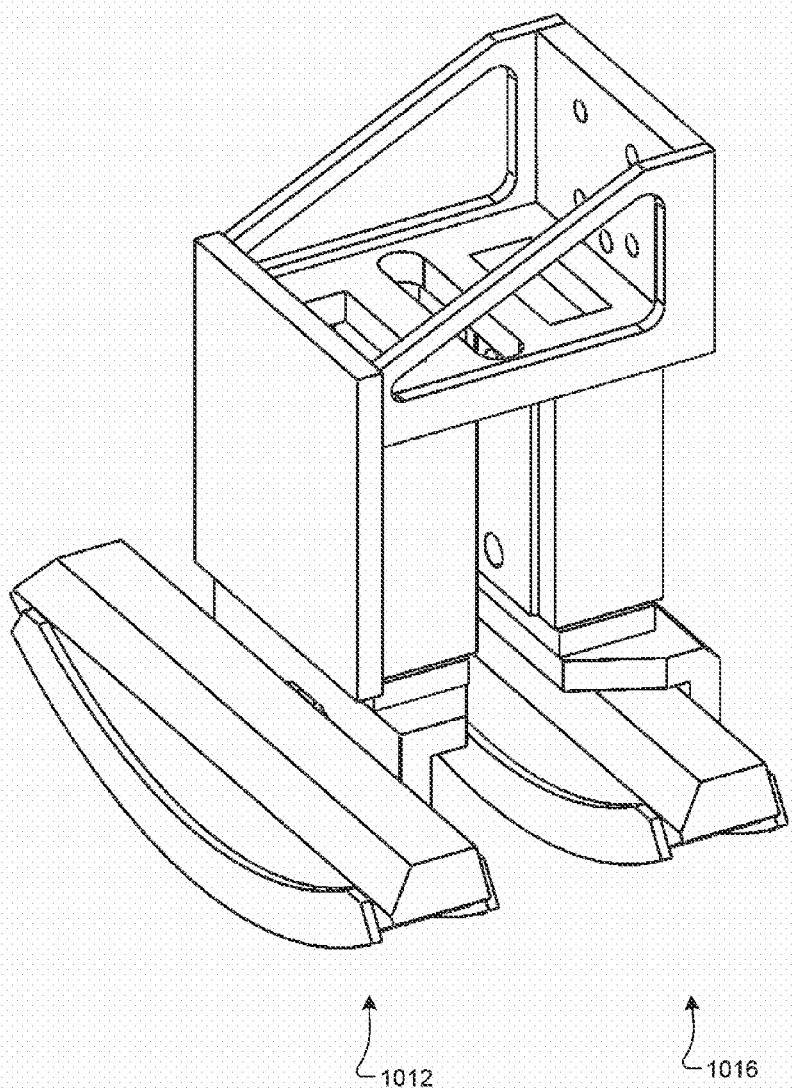

Referring now to FIGS. 11A-11C, the first wet out tool 1012 may be made of a urethane or another suitable material that provides a suitable amount of elasticity. The suitable amount of elasticity may enable the first wet out tool 1012 to deform by at least a predetermined amount (e.g., 4 degrees) to accommodate a maximum possible change in the radius of the wheel present between the inner and outer planes of the midplane of the wheel. In various implementations, the first wet out tool 1012 may be made of another suitable material that is less elastic than urethane, and one or more flexible members (e.g., springs) may be provided with the first wet out tool 1012 to enable the first wet out tool 1012 to accommodate the maximum possible change in the wheel radius (see FIG. 11G).

The arc shape (e.g., the radius of the arc) of the arc shaped face 1024 of the first wet out tool 1012 may be selected, for example, to accommodate a smallest possible wheel diameter, such as a 12 inch wheel diameter. In various implementations, the leading edge 1020 of the first wet out tool 1012 may be defined by a metal edge structure (not shown) formed on top of or embedded within the urethane of the first wet out tool 1012. The metal edge structure may provide a suitably rigid surface against which the weight material can be cut and that can be used to form the slit with the cutting apparatus edge 924.

The first wet out tool 1012 may also include first and second side faces 1104 and 1108. The arc shaped face 1024 may be defined by the leading and trailing edges 1020 and 1028 of the first wet out tool 1012 and by the first and second faces 1104 and 1108. The first and second faces 1104 and 1108 may extend past the arc shaped face 1024 to create first and second flanges 1112 and 1116, respectively, of the first wet out tool 1012. The first and second flanges 1112 and 1116 prevent lateral movement of weight material on the first wet out tool 1012. In various implementations, one or both of the first and second flanges 1112 and 1116 may be omitted.

The width of the arc shaped face 1024 (e.g., between the first and second flanges 1112 and 1116) may be chosen based upon the width of the strip 102. For example only, the width of the arc shaped face 1024 between the first and second flanges 1112 and 1116 may be slightly (e.g., a predetermined amount) larger than the width of the strip 102. The distance between the first and second flanges 1112 and 1116 being only slightly larger than the width of the strip 102 may provide lateral support for the first piece 1044 of the weight material.

The height of the first and second flanges 1112 and 1116 above the arc shaped face 1024 may be selected based upon the height of the strip 102. For example only, the height of the first and second flanges 1112 and 1116 above the arc shaped face 1024 may be (e.g., a predetermined amount) less than the height of the strip 102. Fast movement of the arm 1004 may be performed in a direction that is perpendicular to the first and second flanges 1112 and 1116 to prevent a piece of material from slipping off of the arc shaped face 1024 during the movement.

The first wet out tool 1012 includes one or more magnetic devices, such as magnetic devices 1130-1, 1130-2, ..., 1130-N (collectively referred to as magnetic devices 1130). The magnetic devices 1130 may help attract ferrous material present in the weight material toward the arc shaped face 1024 of the first wet out tool 1012. In various other implementations, vacuum and/or grippers may additionally or alternatively be used.

The magnetic devices 1130 may be natural magnets, such as rare earth magnets, or another suitable form of magnetic device, such as electromagnets. For example only, the magnetic devices 1130 may include neodymium. The magnetic devices 1130 may create a magnetic field on the arc shaped face 1024 of the first wet out tool 1012. The force of the magnetic field may be sufficient to hold the first piece 1044 stationary on the arc shaped face 1024 of the first wet out tool 1012 during movement of the EOAT 1008. In various implementations, a spacing between the magnetic devices 1130 and/or the characteristics of the magnetic devices 1130 may be chosen to create a desired magnetic field on the arc shaped face 1024 of the first wet out tool 1012. The magnetic force generated by the magnetic devices 1130 is less than the adhesive force holding the first piece 1044 against the wheel when the first piece 1044 is applied to the wheel. In this manner, the magnetic force will be overcome by the adhesive force, and the first piece 1044 will be peeled off of the first wet out tool 1012 as the first piece 1044 is applied (wet out) along the inner surface of the wheel.

One or more apertures may be formed in the first wet out tool 1012 for one or more material presence sensors, such as material presence sensor 1144. While only the material presence sensor 1144 is shown, the first wet out tool 1012 may include one or more additional material presence sensors. The apertures may completely extend through the first wet out tool 1012 or may extend partially through the first wet out tool 1012. The material presence sensors may include, for example, fiber optic sensors that generate signals based on proximity of a surface to the fiber optic sensor. For another example only, the material presence detection sensors may be diffuse type photo-electric sensors. The signals output by the material presence sensors can be used to determine whether weight material is present on the arc shaped face 1024 of the first wet out tool 1012. For example only, the signals output by one or more of the material presence sensors may be used after the first wet out tool 1012 has been moved away from the cutting position to ensure that the first piece 1044 has been deposited on the first wet out tool 1012 and cut.

Referring now to FIGS. 11D-11F, isometric illustrations of the first and second wet out tools 1012 and 1016 are presented. An actuating system 1160 may be included with the second wet out tool 1016. The actuating system 1160 may include one or more linear actuators, such as actuator 1164. The actuator 1164 can be actuated to extend and retract the second wet out tool 1016. For example only, the actuator 1164 may be hydraulically actuated, electrically actuated, or actuated in another suitable manner.

Extension and/or retraction of a wet out tool may be performed to allow pieces of the weight material to be applied individually. For example only, the second wet out tool 1016 may be maintained in a predetermined initial position such that the second piece 1056 of the weight material is not applied while the first piece 1044 of the weight material is being applied. An example of the second wet out tool 1016 in a predetermined initial position is presented in the example of FIG. 11D.

To apply the second piece 1056, the second wet out tool 1016 may be extended past the first wet out tool 1012. For example only, the actuating system 1160 may extend the second wet out tool 1016 past the first wet out tool 1012 by a predetermined distance. The predetermined distance may be based on a greatest possible change in the radius over the distance between the inner plane of the midplane and the inner plane of the lowerplane. Extending the second wet out tool 1016 past the first wet out tool 1012 allows the second piece 1056 to be applied independently of the first piece 1044, which may or may not still be present on the first wet out tool 1012. An example of the second wet out tool 1016 extended past the first wet out tool 1012 is presented in the example of FIG. 11E.

In various implementations, the actuating system 1160 or another actuating system may be included with the first wet out tool 1012. The actuating system 1160 may include one or more additional linear actuators, such as actuator 1168 and actuator 1172. The actuator 1168 may extend and retract the first wet out tool 1012 relative the second wet out tool 1016. The actuator 1172 may actuate to change the spacing between the first and second wet out tools 1012 and 1016. An example illustration of the actuator 1172 extended to change the spacing between the first and second wet out tools 1012 and 1016 is presented in the example of FIG. 11F. The spacing between the first and second wet out tools 1012 and 1016 may be changed, for example, in situations where the EOAT may come into contact with the mounting surface of a wheel in during an attempt to align the first wet out tool 1012 with the curbside plane of the wheel.

Figure 11G:
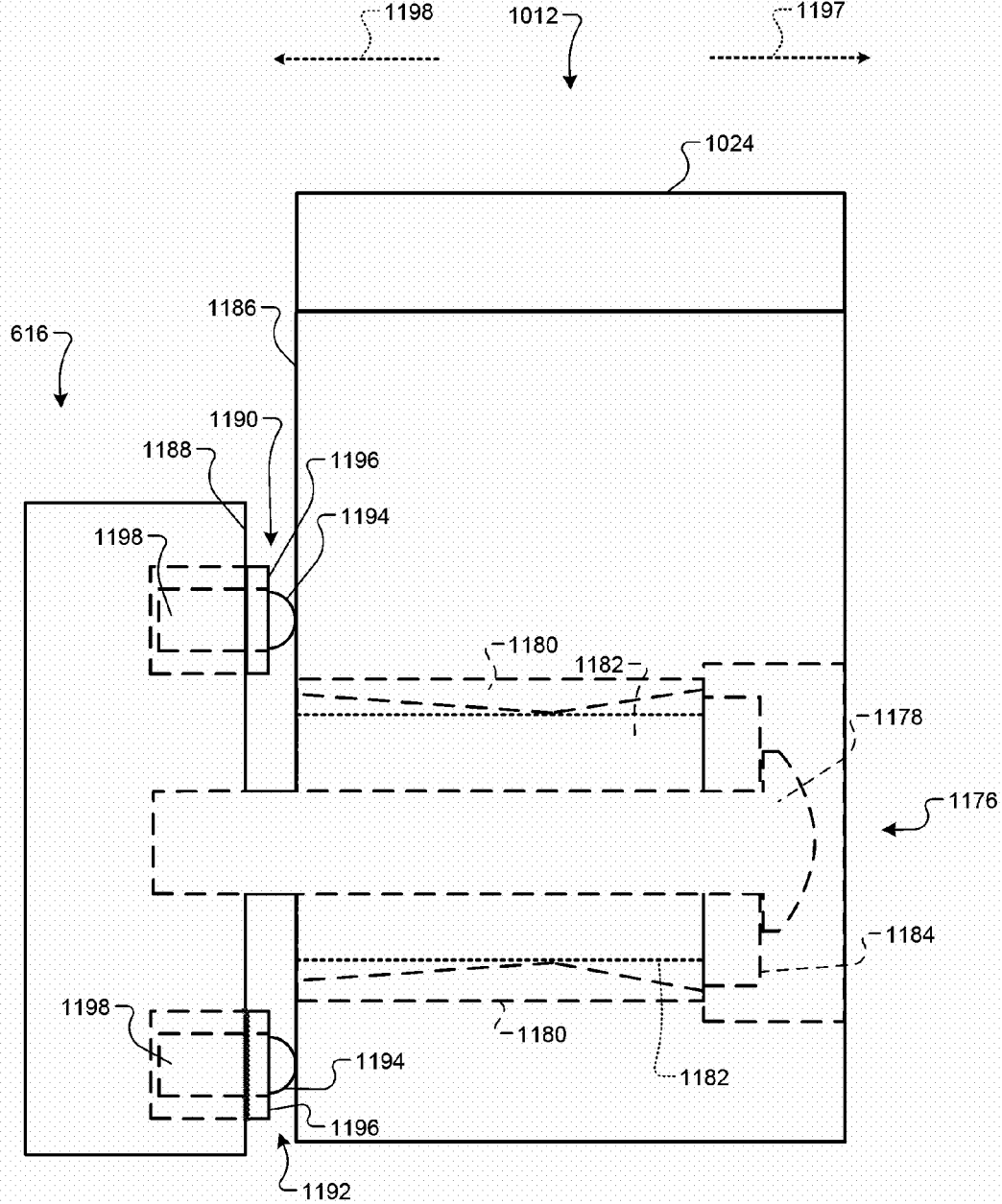

Referring now to FIG. 11G, an example cross-sectional illustration of the first wet out tool 1012 is presented. As stated above, the first wet out tool 1012 may be made of a urethane or another suitable material that provides a suitable amount of elasticity. In various implementations, such as the example of FIG. 11G, flexible structures may provide additional compliance. In such implementations, the first wet out tool 1012 may be made of another suitable material that is less elastic than urethane. One or more flexible members (e.g., coil springs) may be provided with the first wet out tool 1012 to enable the first wet out tool 1012 to accommodate the maximum possible change in the wheel radius.

The first wet out tool 1012 may be secured to arm and EOAT 616 via a securing assembly 1176. For example only, the securing assembly 1176 may include a fastener 1178 (e.g., a threaded bolt), a sleeve 1180, a bushing 1182, and a compressible washer 1184. An inner portion of the sleeve 1180 may be tapered radially inwardly toward the fastener 1178 from ends of the sleeve 1180. For example only, a cross-section of the sleeve 1180 may have a butterfly shape as illustrated in the example of FIG. 11G. The bushing 1182 is implemented concentrically within the sleeve 1180. The fastener 1178 extends through a lateral face 1186 of the first wet out tool 1012, the bushing 1182, and a lateral face 1188 of the EOAT to secure the first wet out tool 1012 to the EOAT. For example only, the sleeve 1180 and the bushing 1182 may include copper.

First and second resilient members 1190 and 1192 are located radially outwardly from the fastener 1178. The first and second resilient members 1190 and 1192 apply a biasing force against the lateral wall 1186 of the first wet out tool 1012. For example only, the first and second resilient members 1190 and 1192 may each include a ball 1194, a ball stop 1196, and a biasing source 1198. The biasing source 1198 may bias the ball 1194 against the ball stop 1196 where the ball 1194 will generally be in contact with the lateral wall 1186 of the first wet out tool 1012. For example only, the biasing source 1198 may include a spring, air, a hydraulic fluid, or another suitable biasing member.

When the front face 1024 of the first wet out tool 1012 contacts the inner surface of a wheel where the wheel radius is changing, the first and second resilient members 1190 and 1192 allow the first wet out tool 1012 to pivot to accommodate the changing wheel radius. More specifically, a changing wheel radius may force the first wet out tool 1012 to pivot and apply a force that is greater than the biasing force to one of the balls 1194. For example only, the first wet out tool 1012 may pivot in a first direction 1197 and apply a force to the ball 1194 of the second resilient member 1192. The first wet out tool may pivot in a second direction 1198 and apply a force to the ball 1194 of the first resilient member 1190. The application of a force to one of the balls 1194 forces the one of the balls 1194 away from the associated one of the ball stops 1196, thereby allowing the first wet out tool 1012 to pivot. The tapered/butterfly shape of the sleeve 1180 allows the bushing 1182 to pivot within the sleeve 1180.

Figure 12:
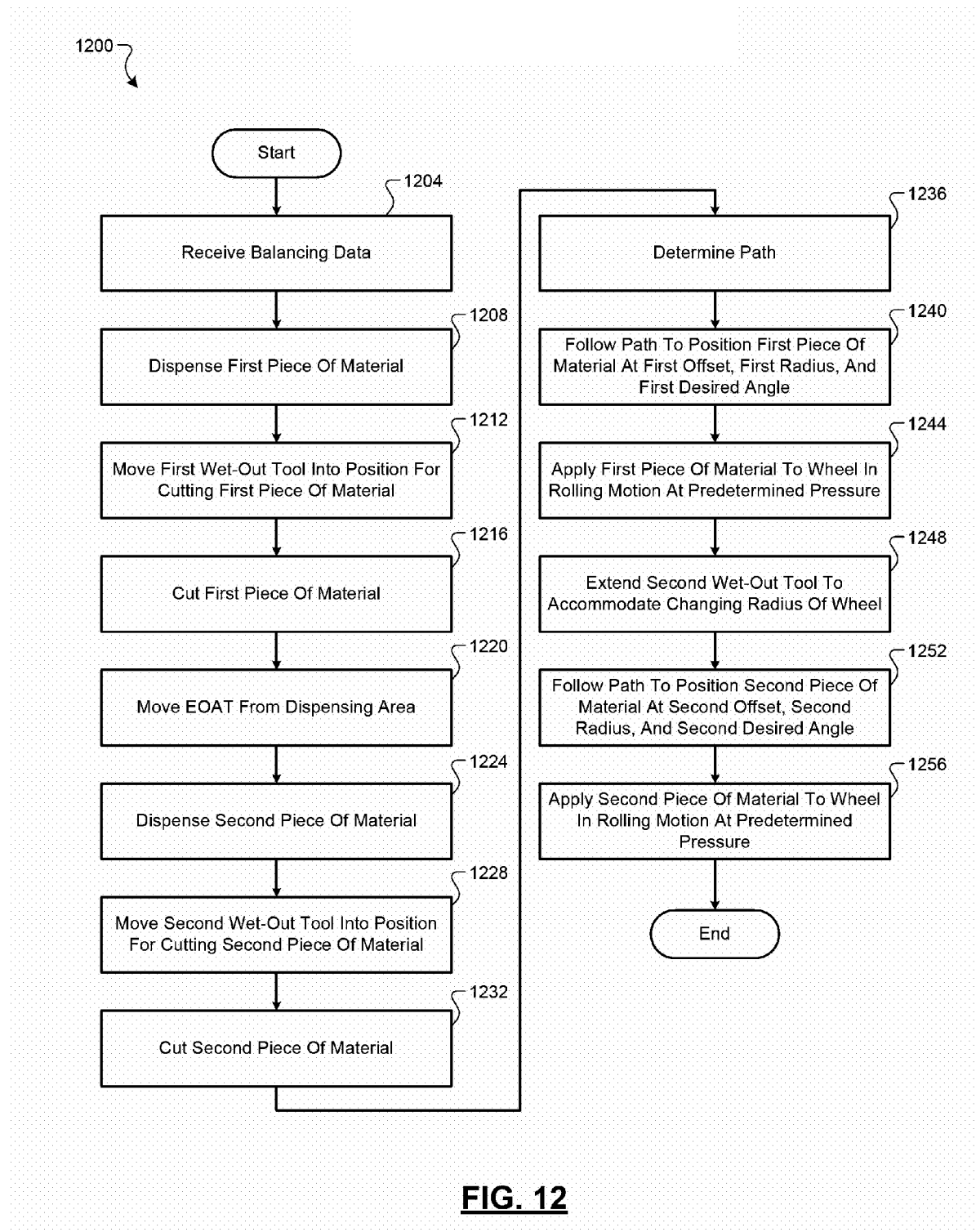
FIG. 12 is a flowchart depicting an example method of balancing a wheel using the cutting apparatus, the arm, and the EOAT according to the principles of the present disclosure.

Referring now to FIG. 12, a flowchart depicting an example method 1200 of balancing a wheel is presented. Control begins at 1204, where control receives balancing data. For example only, the balancing data includes the first and second offsets, the first and second radii, the first and second angles, and the first and second desired weights. The balancing data may also include the lengths of the first and second pieces.

While not shown, control may determine whether either of the first and second pieces need to be applied based on the balancing data. If neither piece needs to be applied, such as if the weights are zero or are below a minimum threshold, control may return to 1204 and wait for the balancing data of the next wheel to arrive. If only the second piece needs to be applied, control may transfer to 1224. Otherwise, control continues at 1208.

At 1208, the cutting apparatus 106 dispenses the first piece 1044 of the weight material past the cutting apparatus edge 924. The first piece 1044 of the weight material corresponds to the desired weight to be applied within the midplane of the wheel, with the midpoint of the first piece 1044 being located at the first angle. The first piece 1044 is dispensed while the first wet out tool 1012 is away from the cutting position. If the first piece 1044 was dispensed while the first wet out tool 1012 was in the cutting position or the final cutting position, the magnetic force of the magnetic devices 1130 may cause the first piece 1044 to lay undesirably upon the arc shaped face 1024 of the first wet out tool 1012. For example only, the first piece 1044 may not lay flatly upon the arc shaped face 1024.

At 1212, control moves the first wet out tool 1012 into the final cutting position. For example only, the leading edge 1024 of the first wet out tool 1012 may first be moved to the cutting position at the predetermined distance away from the cutting apparatus edge 924. Second, control may rotate the first wet out tool 1012 about the leading edge 1024 to position the first wet out tool 1012 in the final cutting position. Moving the first wet out tool 1012 into the final cutting position in this manner may allow the first piece 1044 of the weight material to be drawn towards the magnetic devices 1130 of the first wet out tool such that the first piece 1044 lays flatly along the arc shaped face 1024 of the first wet out tool 1012 between the first and second flanges 1112 and 1116.

Alternatively, the first wet out tool 1012 could be moved into position prior to the first piece 1044 of the weight material being dispensed. If the weight material has adequate rigidity, the first piece 1044 may slide along the face 1024 of the first wet out tool 1012, without arching (i.e., creating a gap between the first piece 1044 and the face 1024 of the first wet out tool 1012). This approach may require less time, as the first wet out tool 1012 can be moved directly to the dispense location instead of being moved and then rotated into place.

At 1216, the cutting apparatus 106 cuts the first piece 1044 from the strip 102. More specifically, the blade 210 is lowered to cut the first piece 1044 using the slit that is defined by the cutting apparatus edge 924 and the leading edge 1024 of the first wet out tool 1012. The EOAT 1008 may be moved away from the cutting position so the second piece 1056 can be dispensed at 1220.

While not shown, control may determine the second piece is to be applied based on the balancing data. If true, control may proceed with 1224; if false, control may proceed to 1236, which is discussed further below. The second piece 1056 of the weight material is dispensed past the cutting apparatus edge 924 at 1224. At 1228, the second wet out tool 1016 is moved into the final cutting position. For example only, the leading edge 1032 of the second wet out tool 1016 may first be moved to the cutting position at the predetermined distance away from the cutting apparatus edge 924. Second, control may rotate the second wet out tool 1016 about the leading edge 1032 to position the second wet out tool 1016 in the final cutting position. The second wet out tool 1016 may be moved in a path that is similar or identical to the path taken in moving the first wet out tool 1012 into the final cutting position. Alternatively, the second wet out tool 1016 may be moved to the final cutting position prior to dispensing of the second piece 1056 of wheel weight material.

The second piece 1056 is cut using the slit defined by the cutting apparatus edge 924 and the leading edge 1032 of the second wet out tool 1016 at 1232. At 1236, control may determine a path to take in applying the first and/or second pieces 1044 and 1056. Control may determine the path based on the first and second offsets, the first and second angles, and the first and second radii. Control may determine the path further based on the reference angle, the mounting plane, the reference axis, and/or one or more other suitable parameters.

At 1240, control actuates the arm 1004 based on the path to position the leading edge 1020 of the first wet out tool 1012 at a first desired angle and to position the arc shaped face 1024 of the first wet out tool 1012 within the midplane of the wheel. The first desired angle corresponds to the angle at which the newly cut edge of the first piece 1044 should begin such that the midpoint of the first piece 1044 is applied at the first angle. While not shown, control may determine whether the first piece is present on the first wet out tool 1012. If true, control may proceed with 1244; if false, control may proceed to 1248, which is discussed further below.

Control actuates the arm 1004 to apply the first piece 1044 in a rolling motion, from the leading edge 1020 toward the trailing edge 1028 at 1244. Applying a piece in the rolling motion may be referred to as wetting out the piece. Wetting out may be defined as applying the piece such that the adhesive on the piece flows to create a maximum contact area between the adhesive and the bonding surface, thereby maximizing the attractive forces between the adhesive and the bonding surface. Control actuates the arm 1004 to apply the first piece 1044 at a predetermined pressure at 1244. For example only, the predetermined pressure may be approximately 15 pounds per square inch (PSI).

By applying the first piece 1044 in the rolling motion, the partial circle (i.e., arc) shape of the arc shaped face 1024 ensures that the adhesive surface of the first piece 1044 contacts the wheel as much as possible. The rolling motion may be from the leading edge 1020 to the trailing edge 1028 or from the leading edge 1020 to a point on the arc shaped face 1024 between the leading and trailing edges 1020 and 1028. For example only, the point may be a point on the arc shaped face 1024 between the trailing edge 1028 and the previously cut end 1048 of the first piece 1044.

While not shown, control may determine whether the second piece is present on the second wet out tool 1016. If true, control may proceed with 1248; if false, control may end and start over when balancing data is received for a next wheel.

Control extends the second wet out tool at 1248 to accommodate the maximum possible change in the radius of the wheel. Control extends the second wet out tool 1016 past the first wet out tool 1012. After the first piece 1044 is applied to the wheel, control may move the EOAT 1008 including the first and second wet out tools 1012 and 1016 away from the interior surface of the wheel before extending the second wet out tool 1016 as to not inadvertently apply the second piece 1056 of the weight material.

Control actuates the arm 1004 based on the path to position the leading edge 1032 of the second wet out tool 1016 at a second desired angle and to position the arc shaped face 1036 of the second wet out tool 1016 within with the lowerplane of the wheel at 1252. The second desired angle corresponds to the angle at which the newly cut edge of the second piece 1056 should begin such that the midpoint of the second piece 1056 is applied at the second angle. Control actuates the arm 1004 to apply the second piece 1056 in the rolling motion, from the leading edge 1036 toward the trailing edge 1040 at 1256. Control actuates the arm 1004 to apply the second piece 1056 at the predetermined pressure. Control may then end.

Figure 13:
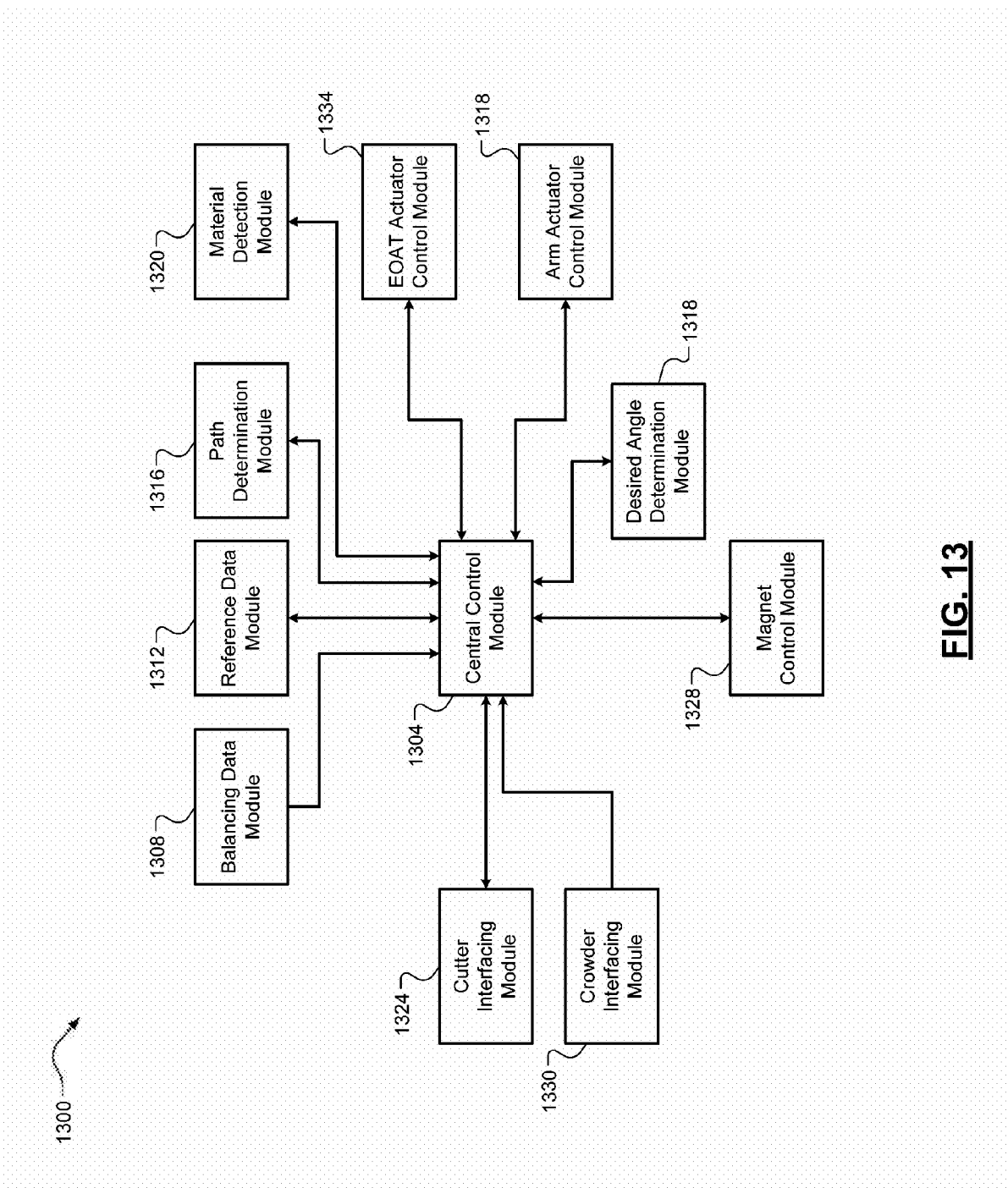
FIG. 13 is a functional block diagram of an example control system of the arm and the EOAT according to the principles of the present disclosure.

Referring now to FIG. 13, a functional block diagram of an example control system 1300 of the arm 1004 and the EOAT 1008 is presented. A central control module 1304 may receive the balancing data for a wheel from a balancing data module 1308. More specifically, the central control module 1304 may receive the first and second offsets, the first and second radii, and the first and second angles. The central control module 1304 may also receive the desired weights of the first and second pieces and/or the lengths of the first and second pieces.

The balancing data module 1308 may receive the first and second offsets, radii, and angles from the balancer 608. For example only, the balancing data module 1308 may receive the balancing data over a serial interface, a parallel interface, a factory control network, a local area network, or a direct electrical interface. For example only, support and communication protocols may include Ethernet, data highway plus (DH plus), controller area network (CAN), and DeviceNet. In various implementations, the balancing data may be transferred to the balancing data module 1308 via another mechanism, such as by a conveyer control system, an upper-level system, a plant management system, and/or a data tracking system.

In various implementations, the balancing data module 1308 may include a conversion front end (not shown) and a reference interface, such as RS-232. The conversion front end converts an incoming interface to the reference interface. In this way, the conversion front end can be replaced when a new external interface is used, while retaining RS-232 for internal communication. In various implementations, the balancing data may be provided to the balancing data module 1308 via another suitable input source, such as a user.

A reference data module 1312 may provide the reference data to the central control module 1304. The reference data may include, for example, the distance between the mounting plane and a plane upon which the wheel rests, the reference angle, the reference axis, and/or one or more other suitable pieces of reference data. The plane upon which the wheel rests may be referred to as a reference plane.

In various implementations, the reference data may be predetermined data. In various other implementations, one or more pieces of the reference data may be provided by another apparatus. For example only, the distance between the reference plane and the mounting plane of the wheel may be determined and provided to the reference data module 1312 by a mounting plane learning system, described below.

The reference data module 1312 may store data corresponding to each combination of wheel and tire that has been or is expected to be balanced. For a given combination of wheel and tire, the physical characteristics, such as wheel geometry and location of the mounting plane, should be fixed. The wheel geometry includes radii, offsets of planes (including midplane and lowerplane) from the mounting plane, and clearance for maneuvering the robotic arm. The wheel geometry may be determined from the wheel blueprints during installation and pre-programmed into the reference data module 1312. As new wheel types are introduced, the reference data module 1312 can be updated with their characteristics.

The wheel geometry may be independent of the tire mounted to the wheel. However, one parameter that may change depending on selected tire, and even depending on level of inflation of the tire, is the absolute location of the mounting plane. When the wheel and tire combination is resting on a conveyor belt, the tire may lift the wheel higher than if the wheel alone were resting on the conveyor belt. Because generally all wheel geometry is referenced to the mounting plane, the position of the mounting plane should be determined so that balancing weights can be placed accurately.

Assuming that the robotic arm is mounted to a fixed position below the conveyor belt, the vertical position of the conveyor belt with respect to the robotic arm mount is fixed and can be pre-programmed. Then, if the vertical distance between the conveyor belt and the mounting plane can be determined, the absolute position of the mounting plane can be calculated. In various implementations, the amount that the tire lifts the wheel off the conveyor belt may be calculated or measured. Inflation pressure of tires may be standardized, and in some cases, variations in the inflation pressure may result in only negligible changes in how high the wheel is lifted.

Another approach, an example of which is described below in FIG. 14, involves physically measuring the height of the mounting plane, using either the robotic arm or a separate height measuring device. Once the height of the mounting plane is determined or measured for a given wheel and tire combination, that height can be stored, and relied on for each future balancing of that wheel and tired combination. In various implementations, the height may be checked at periodic intervals, such as after a predetermined number of wheels having been balanced, or after a predetermined period of time.

Referring now to FIG. 14, an isometric view of an example implementation of a mounting plane learning system 1400 is presented. A distance learning apparatus 1404 may be used in conjunction with and/or implemented with the arm 1004 and the EOAT 1008. The distance learning apparatus 1404 may be used to determine the distance between a reference plane 1410 and the mounting plane 714.

In various implementations, the distance learning apparatus 1404 may include a pressure switch and a plate implemented on the EOAT 1008. The EOAT 1008 may be extended through the opening 816 with the pressure switch/plate parallel to the mounting surface 712. When the pressure switch is actuated due to contact with the mounting surface 712 of the wheel, the distance between the reference plane 1410 and the mounting plane 714 may be determined. For example only, the distance between the reference plane 1410 and the mounting plane 714 may be determined based on a known location of the reference plane 1410 and how far the distance learning apparatus 1404 had moved past the reference plane 1410 when the pressure switch is actuated.

In various implementations, the distance learning apparatus 1404 may be implemented independently of the EOAT, such as on another robotic arm or simply on a piston. The piston may have to be a multi-stage nested piston to reach the mounting plate while still being able to retract below the surface of the conveyor belt. The distance learning apparatus 1404 may include one or more types of distance learning devices, such as a linear variable distance transducer (LVDT) that determines the distance between the reference plane 1410 and the mounting plane 714. For example only, the LVDT may be calibrated based on a value of zero when the LVDT is at the reference plane 1410.

The LVDT may extend through the opening 816, past the reference plane 1410, until the LVDT makes contact with the mounting surface 712. When the LVDT contacts the mounting surface 712, the distance between the reference plane 1410 and the mounting plane 714 may be determined based on how far the LVDT extended past the reference plane 1410. In various implementations, the distance learning apparatus 1404 may include a linear quadrature encoder and/or an optical measuring system (e.g., a laser measuring system), and/or another suitable apparatus that determines the distance between the reference plane 1410 and the mounting plane 714.

The distance learning apparatus 1404 may be actuated into the opening 816 through which the weight material is applied to the interior surface of the wheel or below the opening 816 when the arm 1004 and the EOAT 1008 are clear of the opening 816. For example only, the distance learning apparatus 1404 may be used to determine the distance while the first and second pieces 1044 and 1056 are being cut.

The distance learning apparatus 1404 may be employed to determine the distance between the reference plane 1410 and the mounting plane 714 selectively. For example only, the distance learning apparatus 1404 may be used to determine a value of the distance between the reference plane 1410 and the mounting plane 714 one or more times for a given type of wheel and tire combination.

The distance learning apparatus 1404 may thereafter be used periodically to verify and/or update the value of the distance while the same type of wheel is being balanced. Using the distance learning apparatus 1404 periodically when one type of wheel is being balanced may increase throughput (i.e., the number of wheels balanced per unit time) while still ensuring accurate placement of the wheel weight material.

In various implementations, the distance between the reference plane 1410 and the mounting plane 714 may be a predetermined distance. The predetermined distance may be set based on the distance between the carside plane 1414 of the wheel and the mounting plane 714. The distance between the carside plane 1414 and the mounting plane 714 may be provided by, for example, a wheel manufacturer, the balancer 608, or another suitable source of the characteristics of the wheel.

However, a tire mounted on the wheel may cause the carside plane 1414 of the wheel to sit above the reference plane 1410. Bulging 1418 of the tire may cause the carside plane 1414 of the wheel to be different than the reference plane 1410. Accordingly, if the predetermined distance is set to the distance between the carside plane 1414 and the mounting plane 714, the predetermined distance may be inaccurate by an amount approximately equal to the height of the bulge 1418. In some implementations, this amount may be negligible or may be mitigated by adjusting (i.e., increasing) the predetermined distance by a predetermined amount. The predetermined amount may be set based on half of the height of the bulge 1418 in various implementations. In various implementations, the height of the bulge 1418 may be estimated, previously determined or measured, estimated, etc.

Referring back to FIG. 13, a path determination module 1316 determines a path for receiving and cutting the first and second pieces 1044 and 1056 using the EOAT 1008. An example path is described above in conjunction with FIGS. 10A-10H. An arm actuator control module 1318 selectively controls movement of the arm 1004 based on the path.

A material detection module 1320 may indicate to the central control module 1304 when a piece of the weight material is present on a wet out tool. A cutter interfacing module 1324 may communicate with the central control module 302 to coordinate the operation of the cutting apparatus 106 with the operation of the arm 1004 and the EOAT 1008.

For example only, the central control module 302 may wait for an EOAT clear signal from the cutter interfacing module 1324 before dispensing the first piece 1044 of the weight material for cutting. The central control module 1304 may generate the EOAT clear signal when the EOAT is away from the cutting apparatus edge 924 such that dispensed material will not contact or be drawn into contact with a wet out tool. The central control module 302 may transmit a first material dispensed signal to the central control module 1304 when the first piece of material has been dispensed for cutting.

After receiving the first material dispensed signal, the central control module 1304 may actuate the arm 1004 to follow the path determined by the path determination module 1316. The path may include first bringing the leading edge 1024 of the first wet out tool 1012 into the cutting position and, second, rotating the first wet out tool 1012 up about the leading edge 1024 to position the first wet out tool 1012 in the final cutting position. In implementations where the magnetic devices 1130 are electromagnetic devices, a magnet control module 1328 may control the operation of the magnetic devices 1130. For example only, the central control module 1304 may operate the magnetic devices 1130 after the first material dispensed signal is received. The central control module 1304 may selectively disable the magnetic devices 1130 after one or more of the first and second weights 1040 and 1056 have been applied.

The central control module 302 may wait to receive a cut signal from the cutter interfacing module 1324 before cutting the first piece 1044 from the strip 102. The central control module 1304 may generate the cut signal once the first wet out tool 1012 is in the final cut position. The cutter apparatus 106 cuts the first piece 1044 of the weight material from the strip 102 in response to the cut signal.

After moving the EOAT 1008 away from the cutting apparatus edge 924, the central control module 1304 may determine whether the first piece 1044 is present on the first wet out tool 1012. For example only, the material detection module 1320 may indicate that the first piece 1044 is present on the first wet out tool 1012 when the presence of the first piece 1044 is detected based on the signals generated by the one or more presence detection sensors implemented with the first wet out tool 1012. The first piece 1044 not being present after the EOAT 1044 has been moved away from the cutting apparatus edge 924 may indicate that the first piece 1044 slid off of the first wet out tool 1012, that the first piece 1044 was not cut as expected, and/or that one or more other faults may be present. For example only, the first piece 1044 not being present may indicate that the blade 210 is dull and should be replaced. The cutting apparatus 106 and/or the central control module 1304 may take one or more remedial actions accordingly.

The central control module 1304 may (for a second time for the wheel) transmit the EOAT clear signal to the central control module 302 once the EOAT is moved away from the cutting apparatus edge 924. The central control module 302 may dispense the second piece 1056 of the weight material for cutting when the EOAT clear signal is received. The central control module 302 may transmit a second material dispensed signal to the central control module 1304 once the second piece 1056 has been dispensed for cutting.

After the second material dispensed signal is received, the central control module 1304 may actuate the arm 1004 to follow the path determined by the path determination module 1316. The path may include first bringing the leading edge 1032 of the second wet out tool 1016 into the cutting position and, second, rotating the second wet out tool 1016 up about the leading edge 1032 to position the second wet out tool 1016 in the final cutting position.

The central control module 302 may wait to receive the cut signal (for a second time for the wheel) from the cutter interfacing module 1324 before cutting the second piece 1056 from the strip 102. The central control module 1304 may generate the cut signal when the second wet out tool 1016 is in the final cut position. The cutter apparatus 106 cuts the second piece 1056 of the weight material from the strip 102 in response to the cut signal.

After moving the EOAT 1008 away from the cutting apparatus edge 924 again, the central control module 1304 may determine whether the second piece 1056 is present on the second wet out tool 1016. For example only, the material detection module 1320 may indicate that the second piece 1056 is present on the second wet out tool 1016 when the presence of the second piece 1056 is detected based on the signals generated by the one or more presence detection sensors implemented with the second wet out tool 1016.

The path determination module 1316 also determines the path to follow in applying the first and second pieces 1044 and 1056 to the wheel. The path determination module 1316 may determine the path based on the first and second offsets, the first and second radii, and the first and second angles. The path determination module 1316 may determine the path further based on one or more pieces of the reference data and/or other suitable data.

The path may include first moving the EOAT 1008 to the reference axis. Once there, the arm actuator control module

1318 may position the leading edge 1020 of the first wet out tool 1012 at the first desired angle and position an edge of the arc shaped face 1024 at the first offset and the first radius within the midplane of the wheel.

A desired angle determination module 1318 may determine the first and second desired angles based on the reference angle, the first and second angles, the length of the first and second pieces, respectively, and/or other suitable data. For example only, the desired angle determination module 1318 may determine an angular distance within the midplane that corresponds to half of the length of the first piece. The desired angle determination module 1318 may set the first desired angle by adjusting the first angle toward the reference angle by the angular distance. Similarly, the desired angle determination module 1318 may determine the second desired angle based on an angular distance within the lowerplane corresponding to half of the length of the second piece and set the second desired angle by adjusting the second dangle toward the reference angle by the angular distance.

Before applying the first and/or second weights 1044 and 1056 (e.g., before positioning the EOAT 1008 within the wheel cavity), the central control module 1304 may wait for a crowder done signal from the crowder 624. The central control module 1304 may communicate with the crowder 624 via a crowder interfacing module 1330. The crowder 624 may transmit the crowder done signal to the central control module 1304 when the crowder 624 has centered the wheel about the reference axis and the crowder 624 is holding the wheel (and/or tire).

An EOAT actuator control module 1334 controls extension and retraction of the second wet out tool 1016. Prior to the application of the first piece 1044, the EOAT actuator control module 1334 may retract the second wet out tool 1056 to a predetermined initial position. When in the predetermined initial position, the second wet out tool 1016 may be retracted with respect to the first wet out tool 1012 or aligned with the first wet out tool 1012. The retraction of the second wet out tool 1016 to the predetermined position may prevent the second piece 1056 from inadvertently being applied without being first correctly positioned.

The arm actuator control module 1318 applies the first piece 1044 starting at the leading edge 1020 of the first wet out tool 1012 (which is positioned at the first desired angle) and rolling the first wet out tool 1012 toward the trailing edge 1028 of the first wet out tool 1012. The arm actuator control module 1318 applies the first piece 1044 in the rolling motion at the predetermined pressure. The arm actuator control module 1318 may roll the first wet out tool 1012 all the way to the trailing edge 1028 of the first wet out tool 1012 or to a location between the trailing edge 1028 and the previously cut end 1048 of the first piece 1044.

The EOAT actuator control module 1334 may extend the second wet out tool 1016 to a predetermined extended position after the first piece 1044 is applied. For example only, the EOAT actuator control module 1334 may extend the second wet out tool 1016 while the EOAT is moved toward the second desired angle, offset, and radius. When in the predetermined extended position, the arc shaped face 1036 of the second wet out tool 1016 is extended past the arc shaped face 1024 of the first wet out tool 1012. The predetermined extended position may be a predetermined distance past the position of the first wet out tool 1012. The predetermined distance may be based on the maximum possible change in the radius of the wheel over the distance between the first and second wet out tools 1012 and 1016.

Once the second wet out tool 1016 is extended, the arm actuator control module 1318 positions the leading edge 1032 of the second wet out tool 1016 at the second desired angle and positions the arc shaped face 1036 of the second wet out tool 1016 within the lowerplane of the wheel. The arm actuator control module 1318 applies the second piece 1056 starting at the leading edge 1032 of the second wet out tool 1016. The arm actuator control module 1318 rolls the second wet out tool 1016 from the leading edge 1032 toward the trailing edge 1040 of the second wet out tool 1016. The arm actuator control module 1318 applies the second piece 1056 in the rolling motion at the predetermined pressure. The arm actuator control module 1318 may roll the second wet out tool 1016 all the way to the trailing edge 1040 of the second wet out tool 1016 or to a location between the trailing edge 1040 and the previously cut end 1060 of the second piece 1056. The second piece 1056 may be applied by rolling the second wet out tool 1016 similar to how the first piece 1044 is applied. The rolling motion wets out the pieces.

Figure 15A:
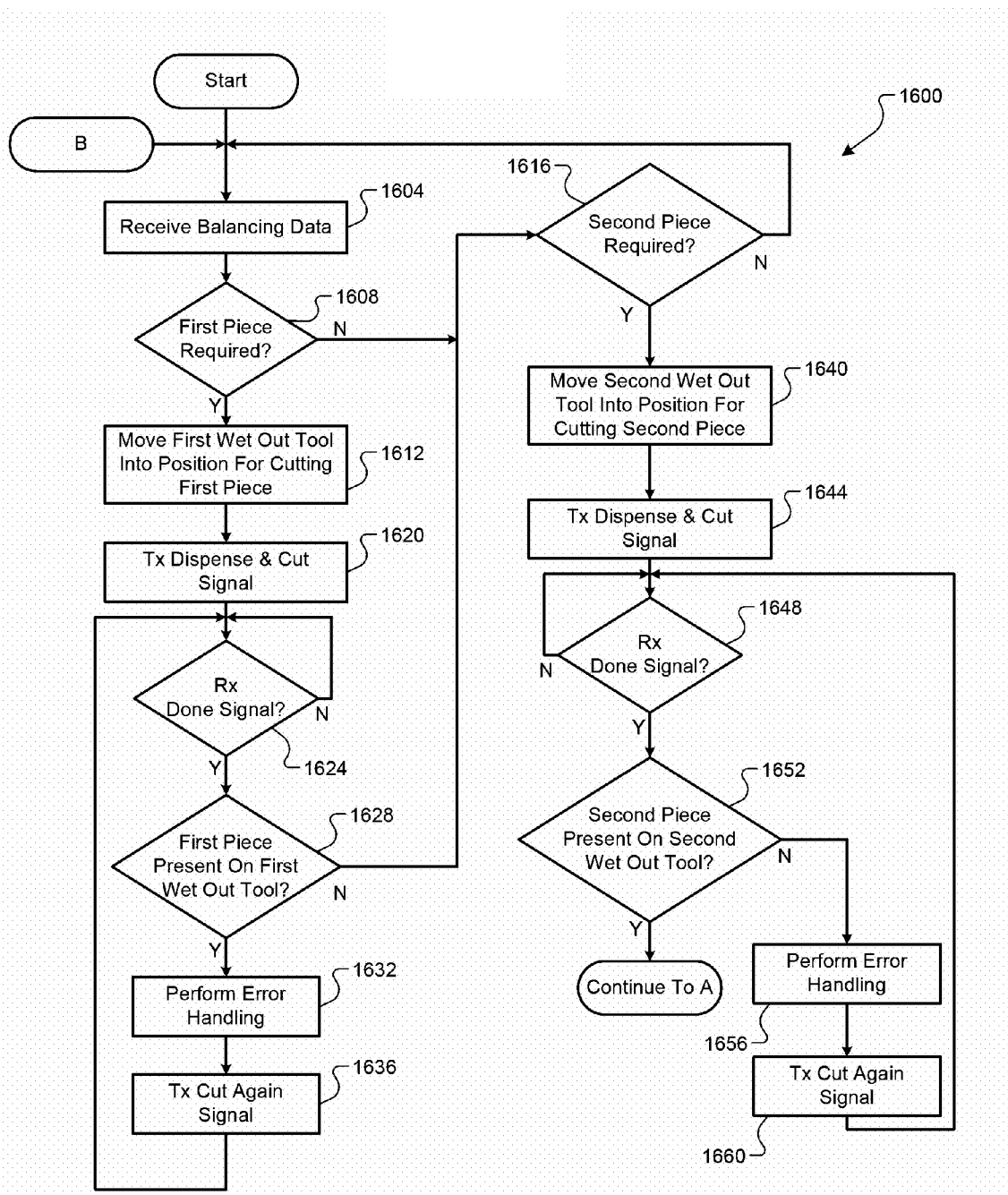
FIGS. 15A-15B are a two-part flowchart depicting an example method of controlling the arm and the EOAT according to the principles of the present disclosure.
Figure 15B:
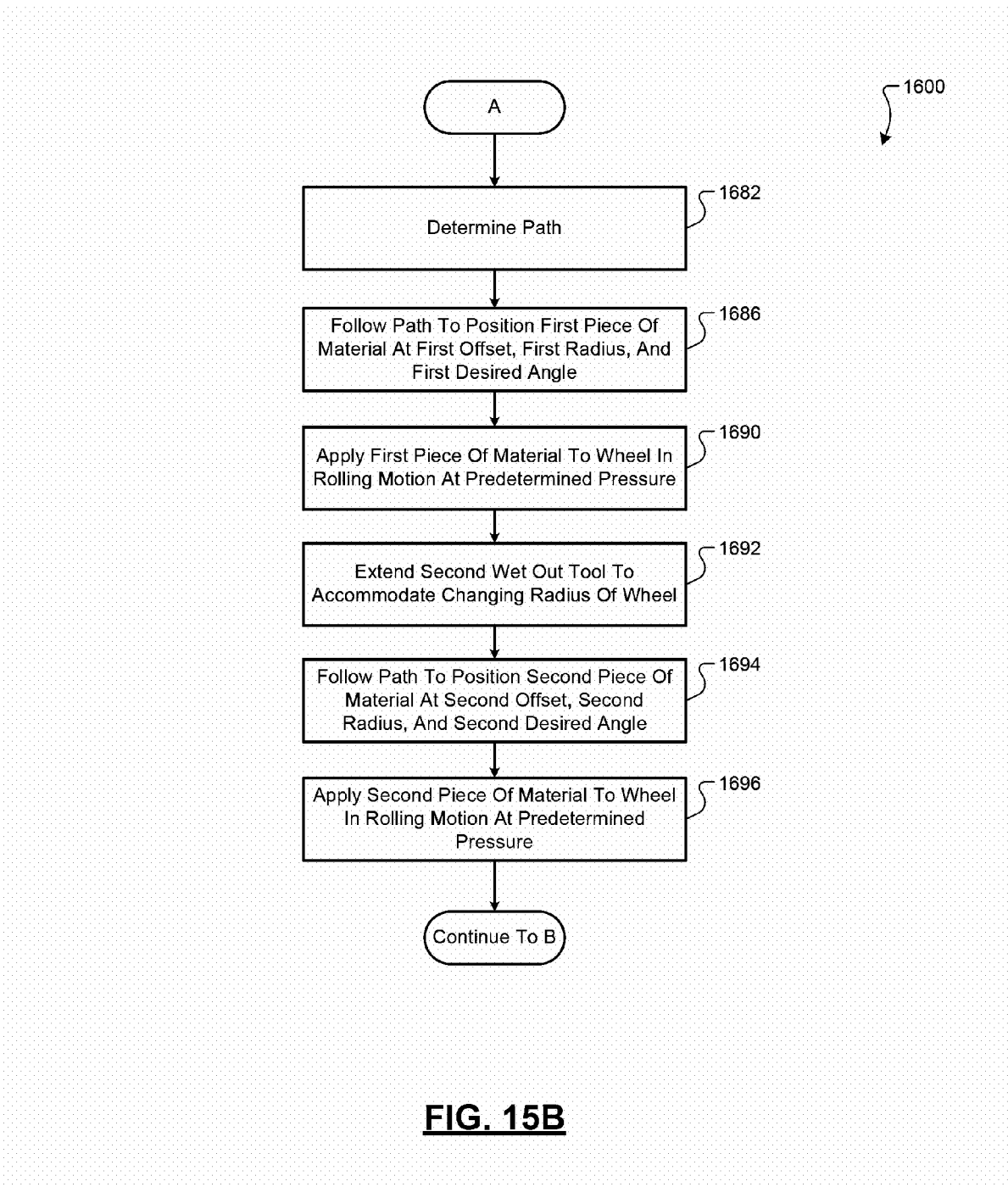

Referring now to FIGS. 15A-15B, a flowchart depicting an example method 1600 of controlling the arm 1004 and the EOAT 1008 is presented. Control begins at 1604, where balancing data is received. At 1608, control determines, based on the balancing data, whether application of a first piece is necessary. If so, control continues at 1612; otherwise, control transfers to 1616.

At 1612, controls positions the first wet out tool in the final cutting position. Control continues at 1620, where a dispense and cut signal is sent to the cutting system, such as the central control module 302 of FIG. 3. Control continues at 1624 and waits until a done signal is received before proceeding to 1628. At 1628, control determines whether the first piece 1044 is present on the first wet out tool 1012 based on feedback received from the one or more sensors implemented with the first wet out tool 1012. If the piece is present, control transfers to 1616; otherwise, control transfers to 1632.

At 1632, control performs error handling. This may stop the automated balancing process and wait for operator intervention. Alternatively, the robot may initiate a cleaning process, such as wiping the face of the EOAT on an absorbent blotting material to remove accumulated grease or other lubricating elements. Control may then request the piece to be re-cut at 1636, and control returns to 1624. When the error handling 1632 is reached frequently, such as more than twice during a predetermined timeframe, balancing may be halted until an operator reviews the problem and affirmatively restarts the balancing process.

At 1616, control determines whether the second piece is required. If so, control continues at 1640; otherwise, control returns to 1604. At 1640, control moves the second wet out tool into the final cutting position. Control continues at 1644, where the dispense and cut signal is sent to the cutting system. Control continues at 1648 and waits until a done signal is received before continuing at 1652. At 1652, control determines whether the second piece 1056 is present on the second wet out tool 1016. If so, control continues to FIG. 15B; otherwise, control transfers to 1656. At 1656, control performs error handling. Once the error has been addressed and/or logged, control transmits a cut again signal to the cutting system at 1660. Control then returns to 1648.

At 1682 (FIG. 15B), control may determine the path for applying the first and second pieces 1044 and 1056. Control may follow the path to position the leading edge 1020 of the first wet out tool 1012 at the first desired angle and to position the arc shaped face 1024 of the first wet out tool 1012 within the midplane at 1686. Control may also retract the second wet out tool 1016 at 1686. Control applies the first piece 1044 by rolling the first wet out tool 1012 along the midplane of the wheel from the leading edge 1020 toward the trailing edge 1028 of the first wet out tool 1012 at the predetermined pressure at 1686.

Once the first piece 1044 has been applied, control extends the second wet out tool 1016 to the predetermined extended position at 1692. Control may follow the path to position the leading edge 1032 of the second wet out tool 1016 at the second desired angle and to position the arc shaped face 1036 of the second wet out tool 1016 within the lowerplane at 1694. In various implementations, control may extend the second wet out tool 1016 while control is moving the second wet out tool 1016 into position at 1694. Control applies the second piece 1056 by rolling the second wet out tool 1016 along the lowerplane of the wheel from the leading edge 1032 toward the trailing edge 1040 of the second wet out tool 1016 at the predetermined pressure at 1696. Control then returns to 1604 of FIG. 15A.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An apparatus for balancing a wheel, the apparatus comprising:
    a tool that is mechanically coupled to an arm and that includes a leading edge, a trailing edge, and a face surface that forms an arc between the leading and trailing edges;
    an arm control module that actuates the arm to position the leading edge of the tool a predetermined distance from an edge of a deck of a cutting apparatus to receive a piece of wheel weight material,
    wherein a blade of the cutting apparatus passes between the edge of the deck and the leading edge of the tool to cut the piece from the wheel weight material; and
    at least one sensor that indicates whether the piece is present on the face surface within a second predetermined distance of the leading edge of the tool.

2. The apparatus of claim 1 wherein the arm control module positions the leading edge of the tool parallel to the edge of the deck and coplanar with a surface of the deck.

3. The apparatus of claim 1 further comprising a cutter interfacing module that selectively outputs an in-position signal when the leading edge of the tool is the predetermined distance from the edge of the deck.

4. A system comprising:
    the apparatus of claim 3; and
    a cutter actuator control module that passes the blade between the edge of the deck and the leading edge of the tool in response to the in-position signal.

5. The apparatus of claim 1 further comprising at least one of a magnetic device, a vacuum source, and a gripper that retains the piece on the face surface.

6. A system comprising:
    the apparatus of claim 1; and
    a cutter actuator control module that selectively generates a fault indicator when the sensor indicates that the piece is not present after the blade of the cutting apparatus passes between the edge of the deck and the leading edge of the tool.

7. The apparatus of claim 1 further comprising at least one flexible member that is associated with the tool and that enables an orientation of the face surface of the tool to change with a change in a wheel radius.

8. The apparatus of claim 1 wherein the face surface of the tool comprises a flexible material, and wherein the leading edge is defined by a rigid material.

9. The apparatus of claim 1 wherein the tool further includes first and second flanges that abut the face surface,
    wherein the first and second flanges are separated by a distance that is greater than a width of the wheel weight material, and
    wherein a height of the first and second flanges is less than a height of the wheel weight material.

10. An apparatus for balancing a wheel, the apparatus comprising:
    a tool that is mechanically coupled to an arm and that includes a leading edge, a trailing edge, and a face surface that forms an arc between the leading and trailing edges; and
    an arm control module that actuates the arm to position the leading edge of the tool a predetermined distance from an edge of a deck of a cutting apparatus to receive a piece of wheel weight material,
    wherein a blade of the cutting apparatus passes between the edge of the deck and the leading edge of the tool to cut the piece from the wheel weight material, and
    wherein, after the piece is cut, the arm control module actuates the arm to rollingly apply the piece to the wheel along a first plane of the wheel starting at the leading edge.

11. The apparatus of claim 10 wherein a second plane is defined by a mounting surface of the wheel and wherein the first plane is parallel to the second plane.

12. The apparatus of claim 10 wherein the arm control module actuates the arm to rollingly apply an entire length of the piece to the wheel along the first plane.

* * * * *